United States Patent
Clevorn et al.

(10) Patent No.: US 10,050,343 B2
(45) Date of Patent: Aug. 14, 2018

(54) RADIO COMMUNICATION DEVICES AND METHODS FOR CONTROLLING A RADIO COMMUNICATION DEVICE

(71) Applicant: Intel Deutschland GmbH, Neubiberg (DE)

(72) Inventors: Thorsten Clevorn, Munich (DE); Christian Drewes, Germering (DE); Pablo Herrero, Munich (DE); Juergen Kreuchauf, San Francisco, CA (US); Jan-Erik Mueller, Ottobrunn (DE)

(73) Assignee: Intel Deutschland GmbH, Neubiberg (DE)

( * ) Notice: Subject to any disclaimer, the term of this patent is extended or adjusted under 35 U.S.C. 154(b) by 79 days.

(21) Appl. No.: 15/181,608

(22) Filed: Jun. 14, 2016

(65) Prior Publication Data

US 2016/0285163 A1  Sep. 29, 2016

Related U.S. Application Data

(63) Continuation of application No. 13/763,770, filed on Feb. 11, 2013, now Pat. No. 9,391,368.

(51) Int. Cl.
*H01Q 3/26* (2006.01)
*H01Q 3/24* (2006.01)
*H01Q 3/34* (2006.01)
*H04W 88/02* (2009.01)
*H04W 88/08* (2009.01)

(52) U.S. Cl.
CPC ............ *H01Q 3/24* (2013.01); *H01Q 3/2605* (2013.01); *H01Q 3/34* (2013.01); *H04W 88/02* (2013.01); *H04W 88/08* (2013.01)

(58) Field of Classification Search
CPC ........... H01Q 3/00; G01S 19/05; G01S 19/07; G01S 19/11; G01S 19/21; G01S 19/45; G01S 19/48
USPC ........................................................ 342/372
See application file for complete search history.

(56) References Cited

U.S. PATENT DOCUMENTS

2013/0095846 A1*  4/2013  Brisebois .............. H04W 16/28
455/456.1

* cited by examiner

*Primary Examiner* — Harry K Liu
(74) *Attorney, Agent, or Firm* — Viering, Jentschura & Partner mbB

(57) ABSTRACT

A device a radio communication device may be provided. The radio communication device may include: a movement characteristics determination circuit configured to determine a movement characteristics of the radio communication device; a beam pattern determination circuit configured to determine a beam pattern based on the determined movement characteristics; and an antenna controller configured to control an antenna to operate using the determined beam pattern.

20 Claims, 28 Drawing Sheets

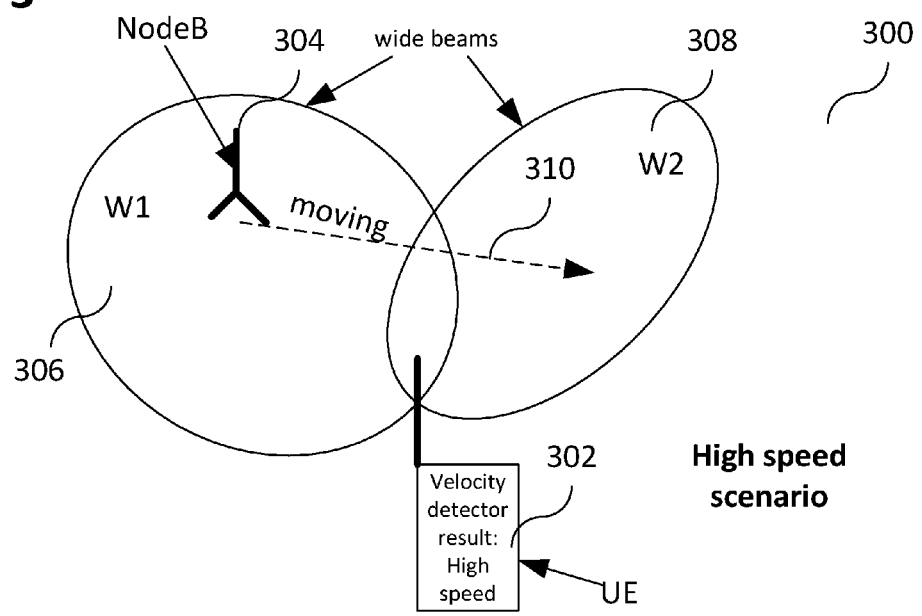
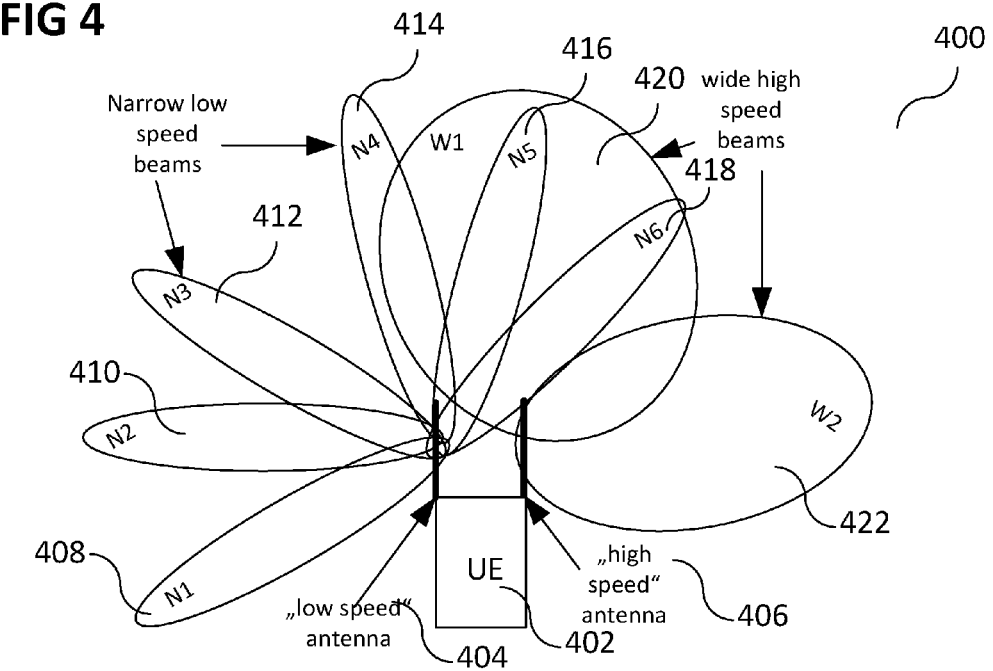

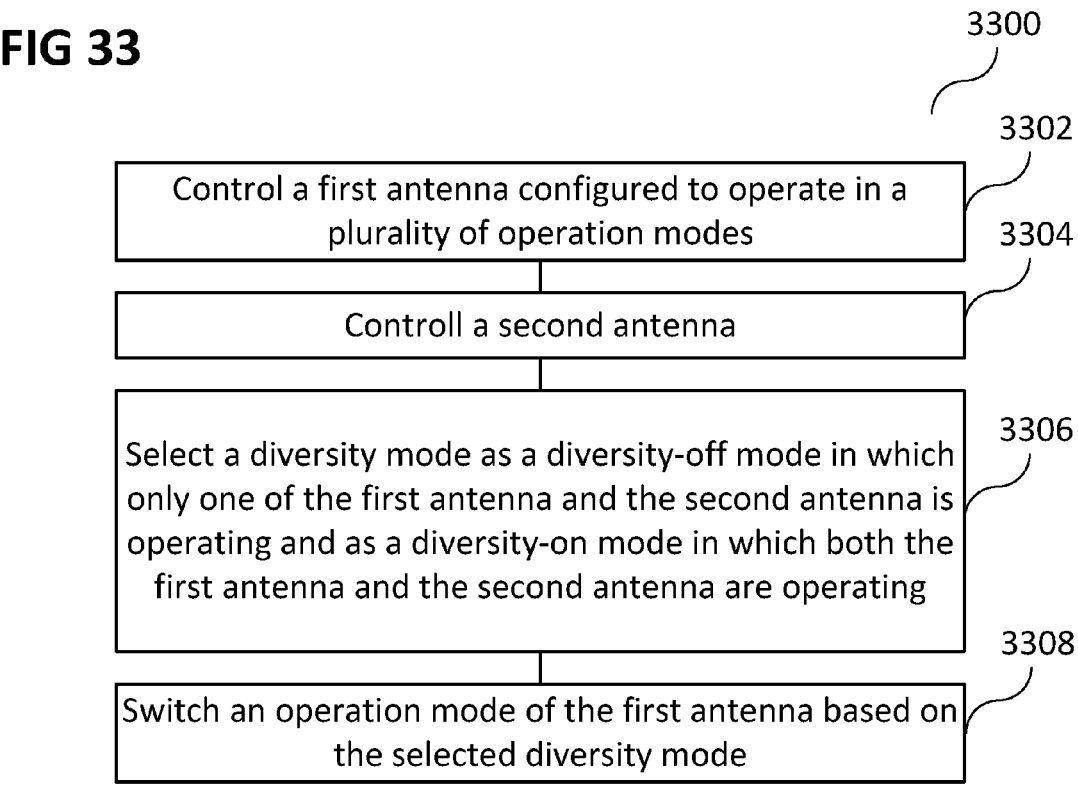
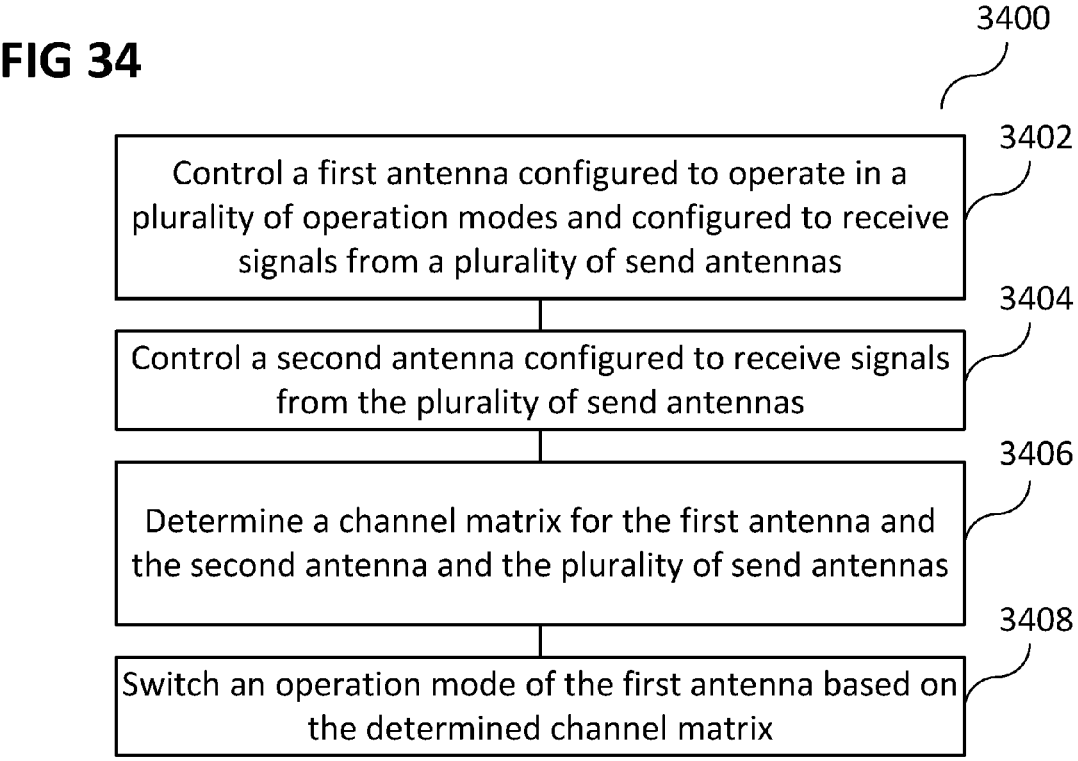

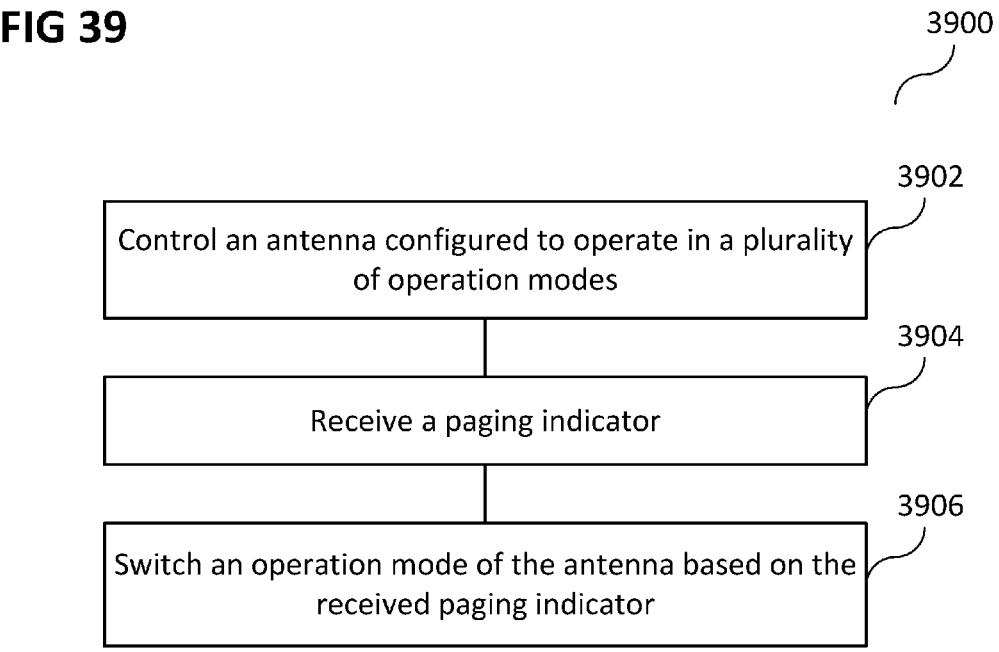
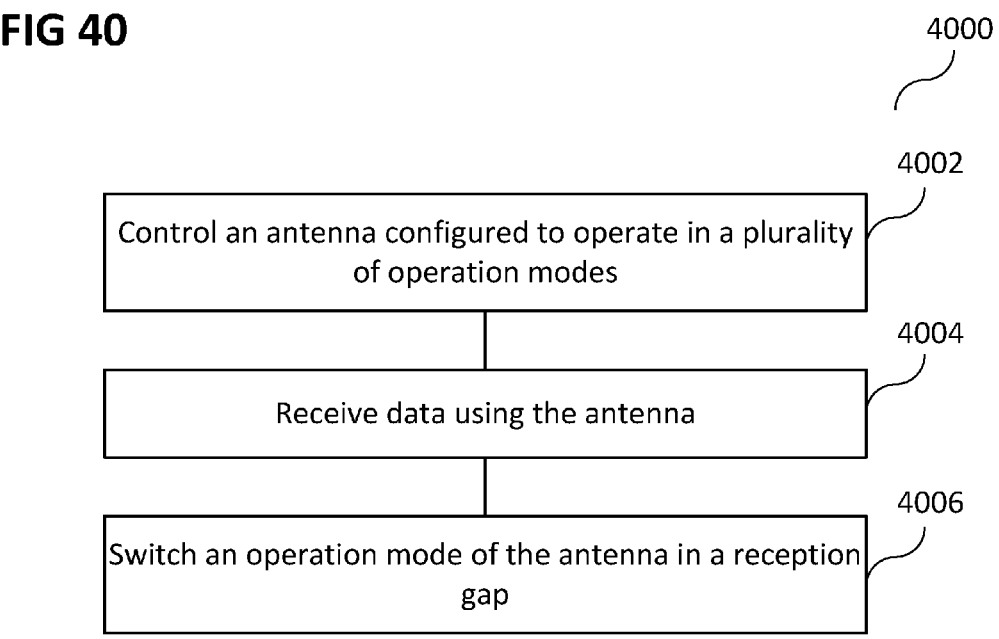

RADIO COMMUNICATION DEVICES AND METHODS FOR CONTROLLING A RADIO COMMUNICATION DEVICE

CROSS-REFERENCE TO RELATED APPLICATION

This application is a Continuation and claims priority to U.S. application Ser. No. 13/763,770 filed on Feb. 11, 2013, which is incorporated by reference herein in its entirety.

TECHNICAL FIELD

Aspects of this disclosure relate generally to radio communication device and methods for controlling a radio communication device.

BACKGROUND

A radio communication device may communicate with a base station, for example wirelessly. The radio communication device may operate in a plurality of operation modes, and the radio communication device may desire to find the best operation mode. For finding a good operation mode, the radio communication device may have to switch from a presently used operation mode, because the radio communication device may be able to use only one operation mode at the same time. Thus, in case the radio communication device changes the operation mode in a situation of bad transmission quality or reception quality, there is a risk of even further decreasing the quality by trying to find a better operation mode. Therefore, care has to be taken which criterion to use for switching an operation mode, and when to perform a switching of an operation mode.

SUMMARY

A radio communication device may be provided. The radio communication device may include: a movement characteristics determination circuit configured to determine a movement characteristics of the radio communication device; a beam pattern determination circuit configured to determine a beam pattern based on the determined movement characteristics; and an antenna controller configured to control an antenna to operate using the determined beam pattern.

A method for controlling a radio communication device may include: determining a movement characteristics of the radio communication device; determining a beam pattern based on the determined movement characteristics; and controlling an antenna to operate using the determined beam pattern.

A radio communication device may include an antenna controller configured to control an antenna to operate using a beam pattern determined based on a movement characteristics of the radio communication device.

A method for controlling a radio communication device may include controlling an antenna to operate using a beam pattern determined based on movement characteristic of the radio communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 3 shows a communication system illustrating wide beams;

FIG. 4 shows a radio communication device with an antenna for narrow beams and an antenna for wide beams;

FIG. 33 shows a flow diagram illustrating a method for a dual-antenna radio communication device;

FIG. 34 shows a flow diagram illustrating a method for a dual-receive antenna radio communication device with a channel matrix determination circuit;

FIG. 39 shows a flow diagram illustrating a method for a radio communication device with a paging indicator receiver;

FIG. 40 shows a flow diagram illustrating a method for a radio communication device configured to perform a switching of an operation mode in a reception gap;

DESCRIPTION

Figure 1:
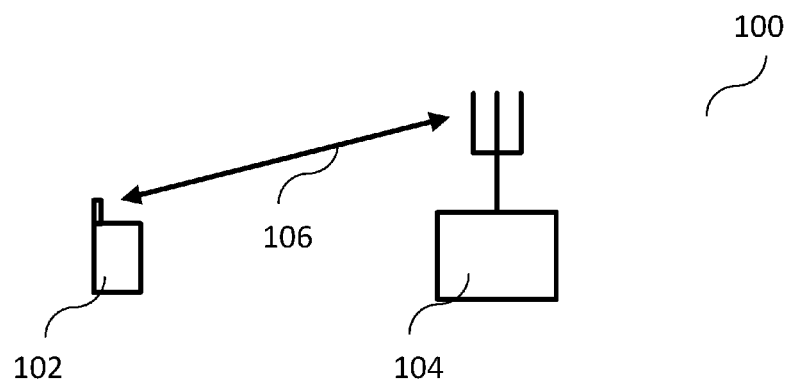
FIG. 1 shows a mobile radio communication system.

The following detailed description refers to the accompanying drawings that show, by way of illustration, specific details and aspects of the disclosure in which the invention may be practiced. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The expression "at least one of A, B, or C" is to be understood as "only A", or "only B", or "only C", or any combination of A, B, and C (for example "A and B", or "B and C", or "A and C", or "A and B and C"). It will be understood that this correspondingly holds true for only two elements (for example A, B) or more than three elements (for example A, B, C, D).

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

Various operation modes may include operation modes using different beam patterns, for example beam patterns with beams of different width.

The term "protocol" is intended to include any piece of software, that is provided to implement part of any layer of the communication definition.

A communication end device (which may also be referred to as end device) as referred to herein may be a device configured for wired communication, for example a desktop computer or laptop, or for wireless communication, for example a radio communication device. Furthermore, a radio communication device may be an end-user mobile device (MD). A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a mobile radio communication system 100. A radio communication device 102 may communicate with a base station 104, for example wirelessly like indicated by arrow 106. The radio communication device 102 may operate in a plurality of operation modes, e.g. with respect to different radiation patterns or different directional multipath or channel responses, and the radio communication device may desire to find the best operation mode.

The antenna of a radio communication device may be a key component in the demodulation performance of a wireless device. Therefore, there may be a lot of activities to improve the antenna. One way is to do a kind of beam forming of the antenna pattern towards the direction of the incoming or outgoing signal. The antenna may be directed to a certain number of modes (in other words: operation modes or antenna patterns) by active impedance matching.

One critical task may then be to select the best (or at least a good) mode. The problem may be that to check which mode is good, all modes may be desired to be tested and the antenna may only operate in one mode at a time. Thus, during the test phase, the device may also operate on bad modes and thus experience a performance loss. It will be understood that for testing, a mode switching circuit may switch an operation mode of the antenna (in other words: a mode switching circuit may perform switching of an operation mode of the antenna one time or more often for testing, and again once the new operation mode of the antenna, in which the radio communication device should be operated has been determined).

For example in a moving device, the best mode may also change frequently, thus the selected best mode may be outdated very fast.

A way to solve this problem may be to monitor the CQI (Channel Quality Indicator)/SNR (signal-to-noise ratio) from the current mode and start testing other modes only when the CQI/SNR of used mode drops below a certain threshold. This may mean that during the test phase for the mode, no compensation may be done for potentially bad performance. Furthermore, it may even happen that the used mode may be still the best mode but the CQI/SNR drops because of a general degradation of the radio conditions. In this case, an even more severe performance loss may be seen (as the radio communication device may only test worse modes) with no benefit, because the previously used mode may be used again.

Like will be described below, devices and methods may be provided which consider DPCH (Dedicated Physical Channel) and HSDPA (High-Speed Downlink Packet Access) interactions and antenna mode testing strategies for DPCH. Devices and methods may be provided which may consider a receive diversity (RxDiv) resp. MIMO (Multiple Input Multiple Output) UE and possible ideas for smart antenna mode testing strategies. Devices and methods may be provided which consider the TX (transmission) of the UE and antenna mode testing strategies for it. Devices and methods may be provided for measurements, e.g. related cell selection. The devices and methods described herein may also be applied to any other radio communication technology, for example LTE (Long Term Evolution) or WiFi.

For example, instead of the different antenna modes taken as granted and only optimizing the selection, beam patterns may be designed for the different modes according to different usage types and respective control algorithms may be provided.

In the design of the beam patterns for the antenna modes, different types of beam patters may be generated. On the one hand, very narrow beams, which may provide very high gains, may be designed. One the other hand, wide beams, which may have a good reception in a wide angle, may be designed.

Despite their high gains, the narrow beams may have the disadvantage that they may be very focused. Thus, if the direction of arrival changes fast, e.g. due to movement (for example driving in a car, or holding the phone in the hand and turning it), it may be hard to control the mode selection (for example the beam selections).

Thus, the UE may have two different operations modes:

1) When there is no frequent change of antenna mode, the UE may use the narrow beams and get the maximum gain;

2) When fast changing of modes is detected, the UE may switch to the wider beams to avoid too frequent antenna mode switching and risking missing the sweet spot with the narrow beam.

It will be understood that although in various examples two levels of beam width are described, of course there may be more than two levels of beam width mapping.

In each operation mode, the optimizations described below may be applied to or may be combined with the antenna mode selection.

Parameters which may control the operation mode may be e.g.

1) A frequency with which an antenna mode control circuit changes the antenna mode; if the change rate is above a certain (for example fix or variable) threshold, the UE may switch to an operation mode with wider beams;

2) Velocity (or speed) of the UE, for example provided by GPS information or some wireless receiver velocity estimator; for high speed, an operation mode with wider beams may be selected.

Figure 2:
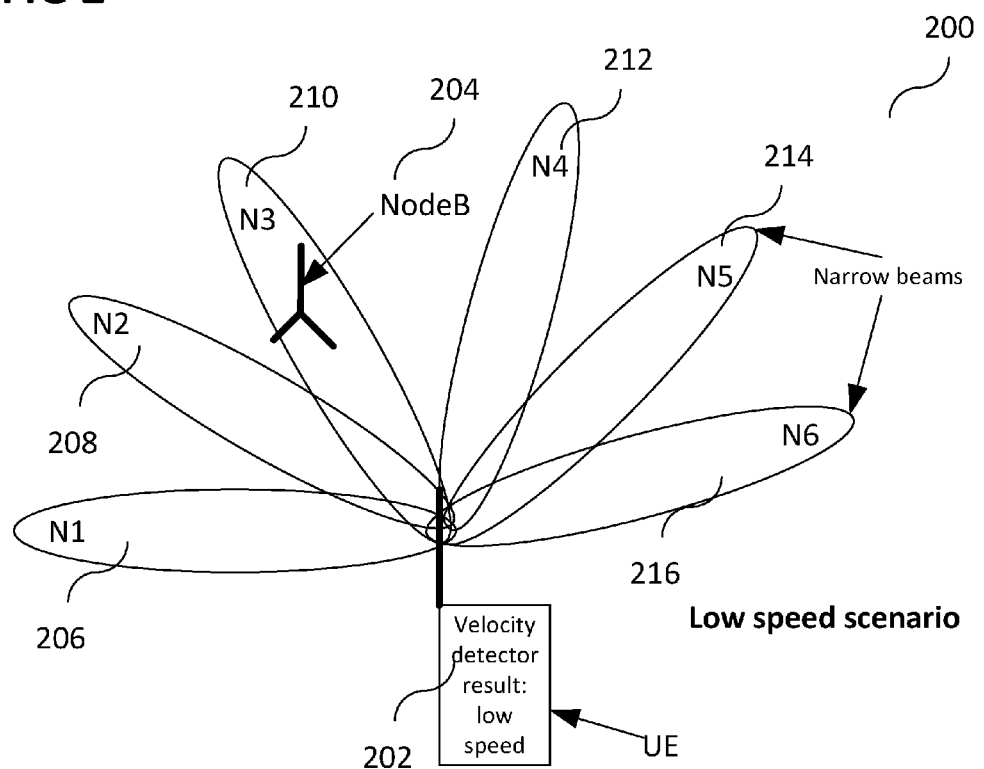
FIG. 2 shows a communication system illustrating narrow beams.

FIG. 2 and FIG. 3 show communication systems illustrating a simplified example for narrow beams (for example at low speeds) and wide beams (for example at high speeds).

FIG. 2 shows a communication system 200 illustrating a simplified example for narrow beams, for example at low speeds. A radio communication device 202, for example a UE, may detect that it is moving a low speed with respect to a base station 204, for example a NodeB. Thus, for the low speed scenario, the radio communication device 202 may use one or more narrow beams for communication with the base station 204, for example one or more of a first narrow beam 206 (N1), a second narrow beam 208 (N2), a third narrow beam 210 (N3), a fourth narrow beam 212 (N4), a fifth narrow beam 214 (N5), and a sixth narrow beam 216 (N6). At one time instance, only one beam pattern out of the available set of beam patterns may be used.

FIG. 3 shows a communication system 300 illustrating a simplified example for narrow beams, for example at high speeds. A radio communication device 302, for example a UE, may detect that it is moving a high speed with respect to a base station 304, for example a NodeB. It will be understood that FIG. 3 is illustrated from the perspective of the radio communication device, and thus the base station may be considered to be moving, like illustrated by arrow 310. Thus, for the high speed scenario, the radio communication device 302 may use one or more wide beams for communication with the base station 304, for example one or more of a first wide beam 306 (W1) and a second wide beam 308 (W2).

It will be understood that the respective number of narrow beams in FIG. 2 and wide beams in FIG. 3 is just exemplary, and any number of narrow beams or wide beams may be used. It will also be understood that for example the number of wide beams may be smaller than the number of narrow beams, for example because the fewer wide beams than narrow beams may be enough to cover all desired communication directions.

When doing the antenna mode or beam design with narrow and wide beams like described above, there may be a correlation between the beam patterns of wide beams and narrow beams, which could be used for the following:

1) The correlation may be used for a pre-selection of the new beam (for example antenna mode), when switching between different operation modes.

2) The correlation may be used for prioritization of certain antenna modes in the search for the optimal antenna mode.

For example, with reference to FIG. 2 and FIG. 3, when being on narrow beam 206 N1 and the operation mode is changed to wide beams, the first antenna mode which may be used for the wide beams may be the mode corresponding to beam W1 306 (for example because the first wide beam W1 306 covers the area covered by the first narrow beam N1 206). When being on wide beam W2 308, and the operation mode is changed to narrow beams, the UE may select one of the antenna modes of beams N4 212, N5 214, and N6 216 as first antenna mode for narrow beams, and prioritize N4 212, N5 214, and N6 216 in the search for the optimal antenna mode (for example because the narrow beams N4 212, N5 214, and N6 216 all are providing an area which is overlapping with the area of the second wide beam W2 308).

Searching for the optimal antenna mode taking prioritizations into account may be performed like described further below.

During initialization, the radio communication device may use wide beams. Once the radio communication device has selected an optimum wide beam, the radio communication device may select a narrow beam that correlates to the specific wide beam (for example like described above).

Such an initialization phase may take place, for example:
whenever RAT or frequency bands change due to handovers or reselections;
during IRAT (inter radio access technology) or inter-frequency measurements;
during search in compressed mode gaps;
during call setups;
when waking up from idle mode; and/or
after a certain time interval elapsed More than two beam granularities may be possible. The radio communication device may switch the mode then correspondingly from wider towards narrower beam widths.

After successful initialization, the radio communication device may enter a tracking state. Whenever a narrow beam degrades, the radio communication device may first search the neighboring narrow beams, for instance with a gradient-like algorithm.

When a UE has more than one antenna, the different beam widths may be "distributed" to the different antennas (in other words: different antennas may provide different beam widths).

For examples, with two antennas, one antenna may have narrow beams for lower speeds, and the other antenna may have wider beams for higher speeds, like shown in FIG. 4.

FIG. 4 shows an illustration 400 of a radio communication device 402, for example a UE. The radio communication device 400 may have a first antenna 404, which for example may provide narrow beams, and which for example may be used for communication at low speeds. The radio communication device 400 may further have a second antenna 406, which for example may provide wide beams, and which for example may be used for communication at high speeds. For example, the first antenna 404 may provide a first narrow beam 408 (N1), a second narrow beam 410 (N2), a third narrow beam 412 (N3), a fourth narrow beam 414 (N4), a fifth narrow beam 416 (N5), and a sixth narrow beam 418 (N6). For example, the second antenna 406 may provide a first wide beam 420 (W1) and a second wide beam 422 (W2).

Figure 5:
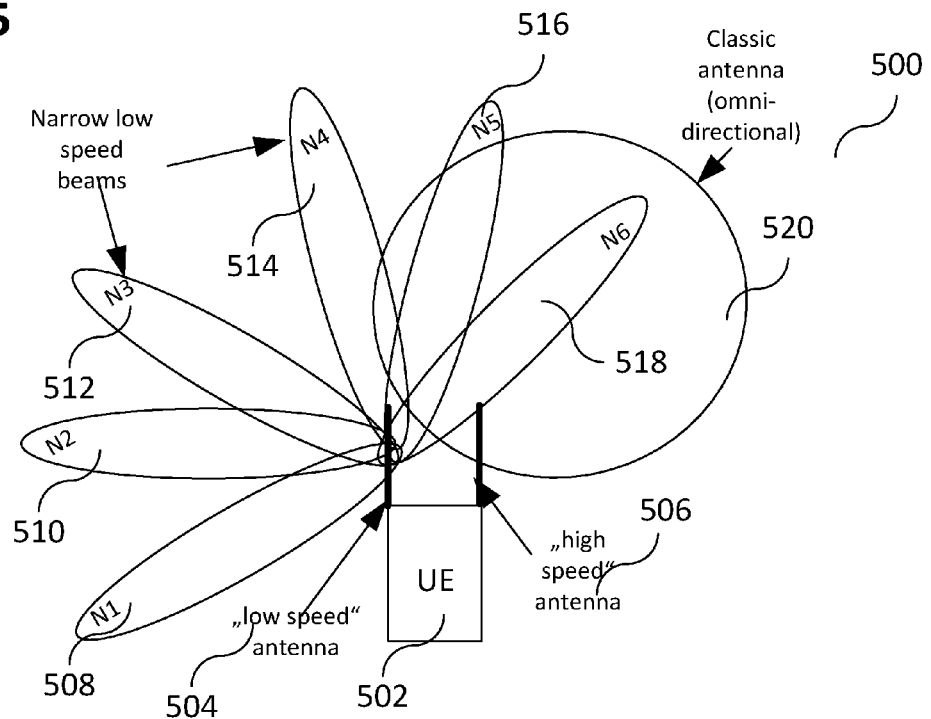
FIG. 5 shows a radio communication device with an antenna for narrow beams and a commonly used antenna.

In another example, only one of the antennas may be an advanced antenna with controllable multiple beams and the other antenna may be a classical mainly omnidirectional antenna, like shown in FIG. 5. Here, the latter one may cover the high speeds and the first one may provide a gain in lower speeds.

FIG. 5 shows an illustration 500 of a radio communication device 502, for example a UE. The radio communication device 500 may have a first antenna 504, which for example may provide narrow beams, and which for example may be used for communication at low speeds. The radio communication device 500 may further have a second antenna 506, which for example may provide omnidirectional coverage (in other words: no beam may be provided), and which for example may be used for communication at high speeds. For example, the first antenna 504 may provide a first narrow beam 508 (N1), a second narrow beam 510 (N2), a third narrow beam 512 (N3), a fourth narrow beam 514 (N4), a fifth narrow beam 516 (N5), and a sixth narrow beam 518 (N6). For example, the second antenna 506 may provide omnidirectional coverage 520 (for example like a commonly used antenna).

Distributing the different beam widths to different antennas may simplify the design of the antennas, because less and more similar beams may be need per antenna.

Figure 6:
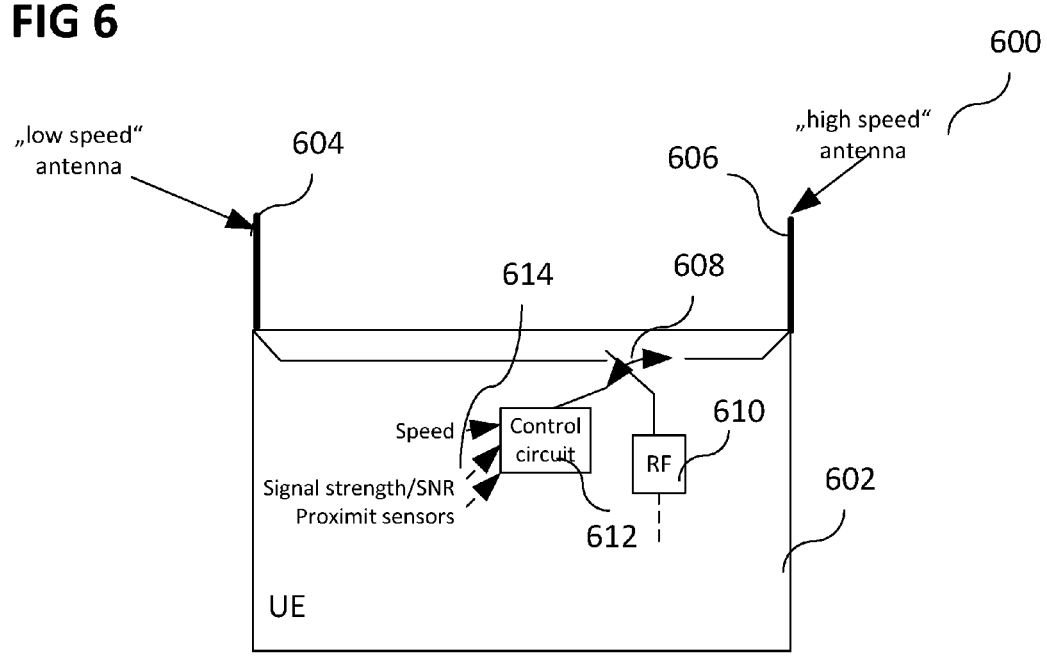
FIG. 6 shows a radio communication device with two antennas and a switch for switching between the antennas.

The UE then may possess an antenna switch controller, which, for example depended on the speed and potentially other parameters, may switch between the antennas, like shown in FIG. 6.

FIG. 6 shows an illustration 600 of a radio communication device 602. The radio communication device 602 may include a first antenna 604, for example an antenna which provides narrows beams, for example for communication at low speed. The radio communication device 602 may further include a second antenna 606, which may provide wide beams or omnidirectional coverage, for example for communication at high speed. A RF (radio frequency) circuit 610 may provide its output to a switch 608. The switch 608 may connect the output of the RF circuit 610 to the first antenna 604 or to the second antenna 606, based on a control of a control circuit 612. The control circuit 612 may determine how to control the switch 608 based on input 614, for example a movement characteristic of the radio communication device, a speed or velocity of the radio communication device, or other parameters. The other parameters (which may for example be referred to as communication conditions) may be for example an SNR or a signal strength showing that the selected advanced antenna (in other words: the antenna which may provide different beams or beam patterns or operation modes) for whatever reason may not provide a good antenna mode, or the results of proximity sensors showing that the selected (for example due to speed) antenna is covered by hand or head and may perform significantly worse.

The switch 608 may be active only when only a single antenna is in use of the multiple antennas, e.g. because the UE has dynamic RxDiv and the conditions are in general that good that only one antenna needs to be active. If dynamic RxDiv triggers that both (or all) antennas are active, the radio communication device may use other respective control algorithms, like described below.

In the following, an example of beam width classification will be given.

Figure 7:
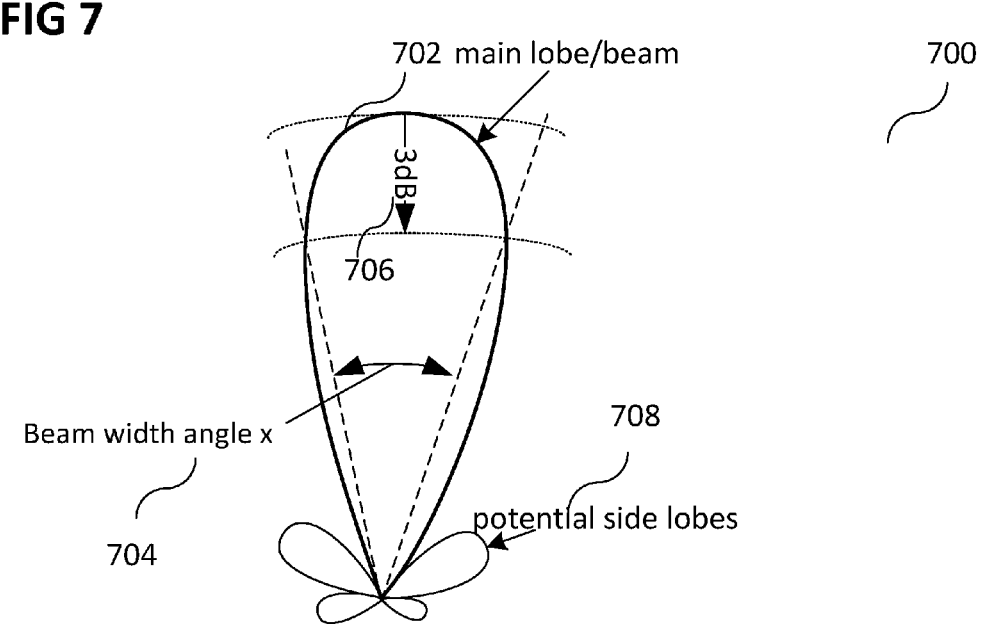
FIG. 7 shows an illustration of a definition of a beam width.

FIG. 7 shows an illustration 700 which gives an exemplary definition of the beam width. The beam width may be defined as the angle x 704 between the points, at which the power (for example radiated or received) is reduced by e.g. 3 dB (like indicated by arrow 706) compared to the maximum of the main beam (or lobe) 702. Only the main lobe may be considered and not the side lobe (or side lobes) 708.

Table 1 gives an exemplary classification of the beam width.

TABLE 1

Exemplary classification of beam width

|  | Narrow beam | Wide beam | No beam |
|---|---|---|---|
| Beam width x | 0° < x <= 60° | 60° < x <= 180° | x > 180° |
| Potential use case | low-speed, rural, . . . | High-speed, city, . . . | Very high speed, IRAT, acquisition, . . . |

Figure 8:
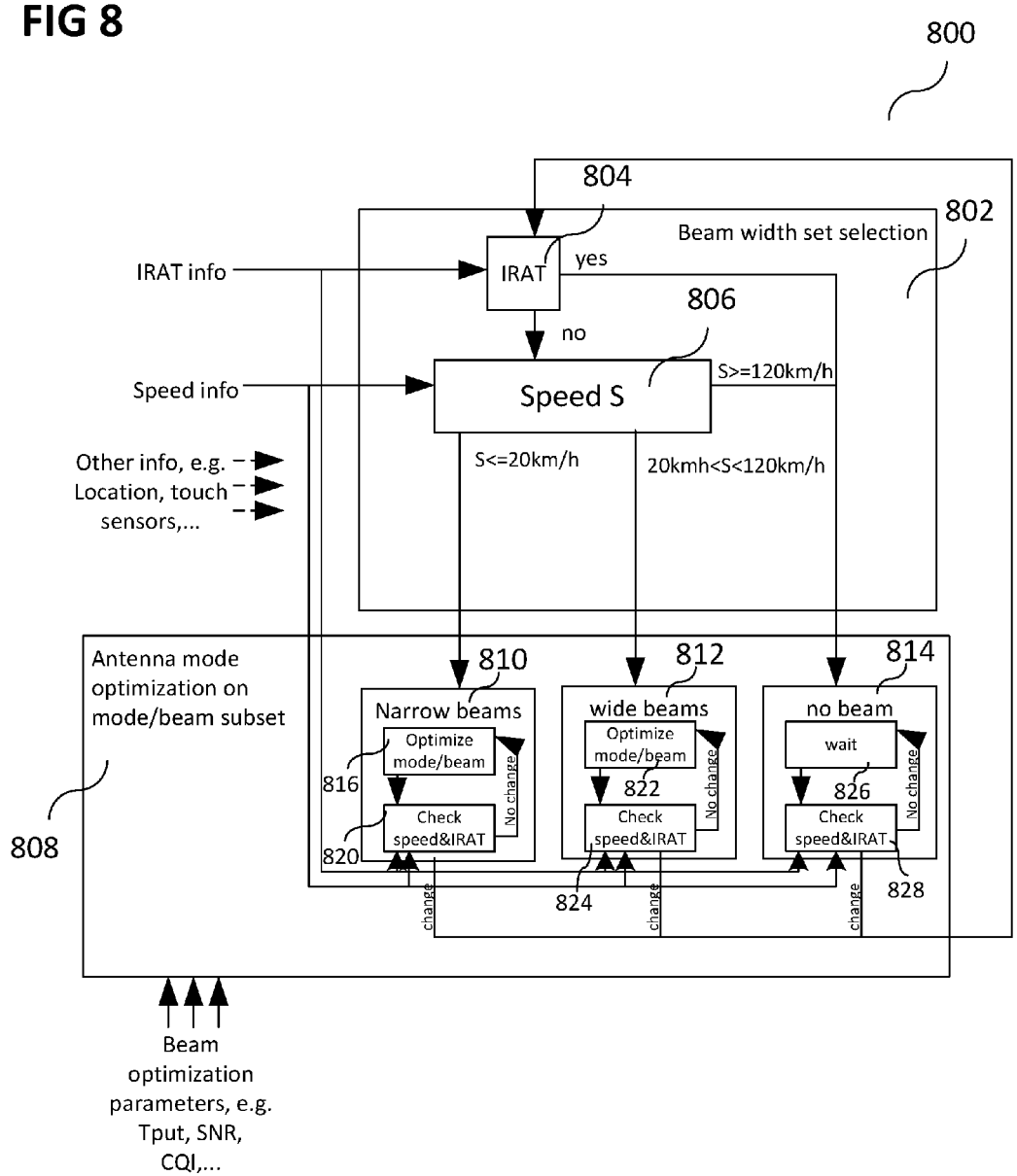
FIG. 8 shows a flow diagram illustrating a method for a decision for a beam pattern.

FIG. 8 shows an illustration 800 of an exemplary flow diagram for a decision based on the example described in FIG. 7 and Table 1. In this example, the radio communication device may use only IRAT and speed as decision criteria. It will be understood that this may be extended by other decision criteria.

In FIG. 8, the beam width set selection 800 may include determination whether IRAT is used in 804. If the radio communication device determines in 804 that IRAT is used, the radio communication device may proceed processing in 814. If the radio communication device determines in 804 that IRAT is not used, the radio communication device may proceed processing in 806. In 806, the radio communication device may determine a speed of the radio communication device. In case the determine speed is equal to or below than a pre-determined first threshold, for example 20 km/h, the radio communication device may continue processing in 810. In case the determined speed is equal to or below than a pre-determined second threshold, for example 120 km/h, but above the pre-determined first threshold, the radio communication device may continue processing in 812. In case the determined speed is equal to or above the pre-determined second threshold, the radio communication device may continue processing in 814. Other information besides the speed, for example a location of the radio communication device, or information from one or more touch sensors may be used in 806 for determining how to proceed. In 810, the radio communication device may perform processing for narrow beams. In 812, the radio communication device may perform processing for wide beams. In 814, the radio communication device may perform processing for no beams (for example for omnidirectional coverage, for example for commonly used antennas). In 816 (as a sub-processing in 810), the radio communication device may optimize the mode or the beam. In 820 (as a sub-processing in 810), the radio communication device may check the speed and IRAT. In case the radio communication device determines no change in 820, the radio communication device may proceed in 816. In case the radio communication device determines a change in 820, the radio communication device may proceed in 804.

In 822 (as a sub-processing in 812), the radio communication device may optimize the mode or the beam. In 824 (as a sub-processing in 812), the radio communication device may check the speed and IRAT. In case the radio communication device determines no change in 824, the radio communication device may proceed in 822. In case the radio communication device determines a change in 824, the radio communication device may proceed in 804.

In 826 (as a sub-processing in 814), the radio communication device may wait, for example for a pre-determined period of time, for example 1 s. In 828 (as a sub-processing in 814), the radio communication device may check the speed and IRAT. In case the radio communication device determines no change in 828, the radio communication device may proceed in 814. In case the radio communication device determines a change in 828, the radio communication device may proceed in 804.

Processing in 810, 812 and 814 may be summarized as antenna mode optimization 808 on a mode subset or beam subset. Input to 808 may furthermore be beam optimization parameters, for example Tput (throughput), SNR, and/or CQI.

Devices and methods may be provided based on designing an antenna with different beams of different widths and pre-selecting groups of beams with certain width based on some parameter, e.g. velocity.

Devices and methods may be provided for pre-selecting and prioritizing a certain beam or a group of beams when switching the beam width.

Devices and methods may be provided for initialization and tracking modes.

Devices and methods may be provided with different beam width on different antennas (with multiple antennas) and for switching between antennas based e.g. on velocity.

It will be understood that although velocity is mainly used in the description, there may be are also other factors which may influence the beam width decisions, for example propagation conditions, proximity of hand (or head) blocking certain parts, and/or initialization (like described above).

Figure 9:
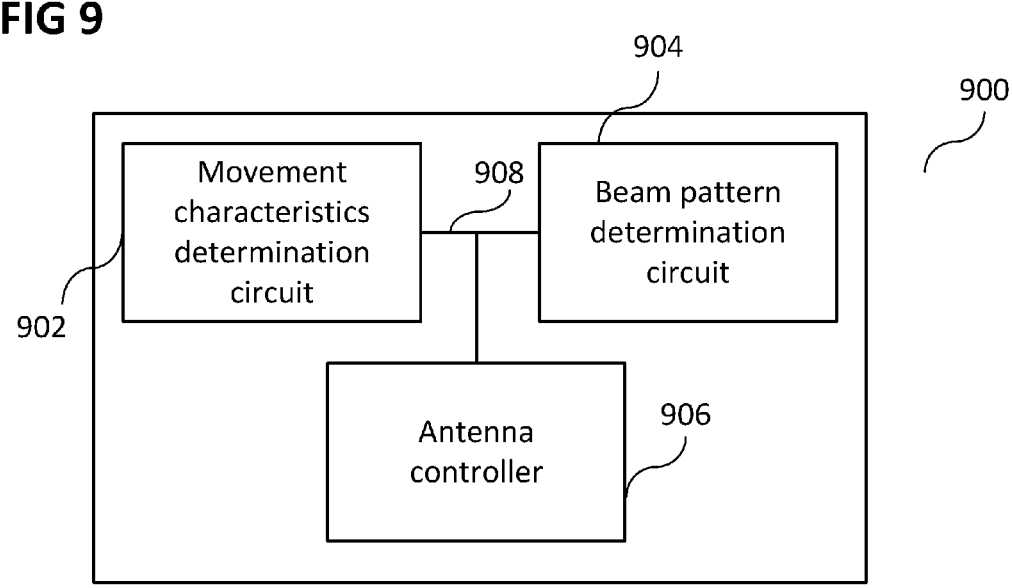
FIG. 9 shows a radio communication device with a movement characteristics determination circuit, a beam pattern determination circuit, and an antenna controller.

FIG. 9 shows a radio communication device 900. The radio communication device 900 may include a movement characteristics determination circuit 902 configured to determine a movement characteristics of the radio communication device 900. The radio communication device 900 may further include a beam pattern determination circuit 904 configured to determine a beam pattern based on the determined movement characteristics. The radio communication device 900 may further include an antenna controller 906 configured to control an antenna to operate using the determined beam pattern. The movement characteristics determination circuit 902, the beam pattern determination circuit 904, and the antenna controller 906 may be coupled with each other, for example via a connection 908, for example an optical connection or an electrical connection, such as for example a cable or a computer bus or via any other suitable electrical connection to exchange electrical signals.

The beam pattern determination circuit 904 may determine the beam pattern from a plurality of beam patterns, the plurality of beam patterns including at least one of a narrow beam pattern, a wide beam pattern, or a omnidirectional coverage pattern.

The movement characteristics may include or may be at least one of a speed of the radio communication device, information indicating whether the orientation of the radio communication device is changed, or information indicating whether the location of the radio communication device is changed.

The beam pattern determination circuit may determine the beam pattern based on information indicating whether the radio communication device has previously moved from using a first beam pattern to using a second beam pattern, and information indicating a ratio at which the radio communication device has previously moved from using a first beam pattern to using a second beam pattern.

Figure 10:
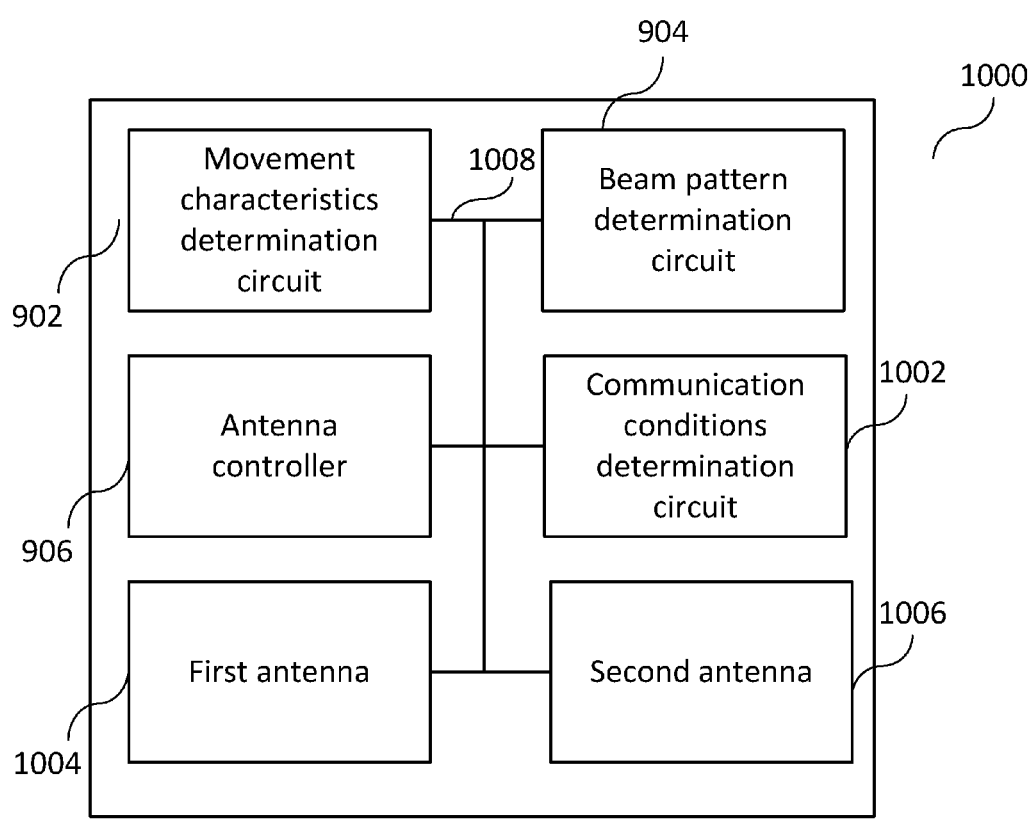
FIG. 10 shows a radio communication device with a movement characteristics determination circuit, a beam pattern determination circuit, an antenna controller, a communication conditions determination circuit, a first antenna, and a second antenna.

FIG. 10 shows a radio communication device 1000. The radio communication device 1000 may, similar to the radio communication device 900 of FIG. 9, include a movement characteristic determination circuit. The radio communication device 1000 may, similar to the radio communication device 900 of FIG. 9, further include a beam pattern determination circuit 904. The radio communication device 1000 may, similar to the radio communication device 900 of FIG. 9, further include an antenna controller 906. The radio communication device 1000 may further include a communication conditions determination circuit 1002, like will be described below. The radio communication device 1000 may further include a first antenna 1004, like will be described below. The radio communication device 1000 may further include a second antenna 1006, like will be described below. The movement characteristics determination circuit 902, the beam pattern determination circuit 904, the antenna controller 906, the communication conditions determination circuit 1002, the first antenna 1004, and the second antenna 1006 may be coupled with each other, for example via a connection 1008, for example an optical connection or an electrical connection, such as for example a cable or a computer bus or via any other suitable electrical connection to exchange electrical signals.

The communication conditions determination circuit 1002 may determine a communication conditions under which the radio communication device operates. The beam pattern determination circuit 904 may determine the beam pattern further based on the determined communication condition.

The antenna controller 906 may control the antenna to switch operation from using a presently used beam pattern to using the determined beam pattern.

The beam pattern determination circuit 904 may determine the beam pattern further based on the presently used beam pattern.

The beam pattern determination circuit 904 may to determine, if the presently used beam pattern uses a wide beam, a narrow beam pattern corresponding to a narrow beam which at least partially overlaps the wide beam.

The beam pattern determination circuit 904 may determine, if the presently used beam pattern uses a narrow beam, a wide beam pattern corresponding to a wide beam which overlaps the narrow beam.

The antenna controller 906 may control the antenna to operate using at least one of a wide beam pattern or an omnidirectional coverage pattern upon start of a communication.

The radio communication device may further include the antenna. For example, the radio communication device may include the first antenna 1004 and the second antenna 1006.

The beam pattern determination circuit 904 may determine the beam pattern from a plurality of beam patterns. The plurality of beam patterns may include or may be at least one of a narrow beam pattern, a wide beam pattern, or a omnidirectional coverage pattern. The first antenna 1004 may provide a narrow beam pattern. The second antenna 1006 may provide at least one of a wide beam pattern, or a omnidirectional coverage pattern.

Figure 11:
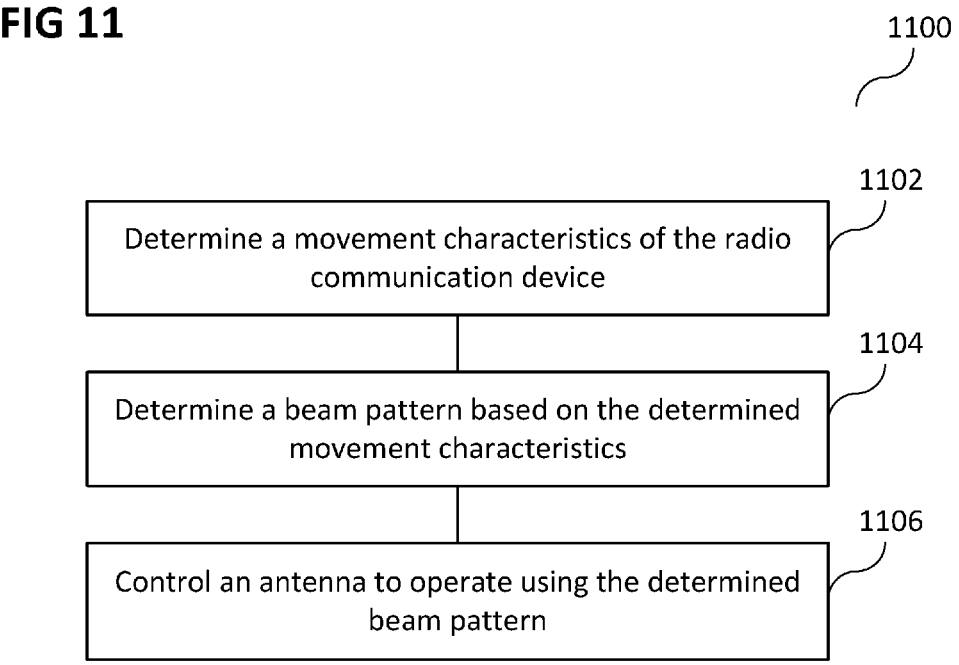
FIG. 11 shows a flow diagram illustrating a method for controlling a radio communication device, for example the radio communication device of FIG. 9.

FIG. 11 shows a flow diagram 1100 illustrating a method for controlling a radio communication device. In 1102, a movement characteristics determination circuit of the radio communication device may determine a movement characteristics of the radio communication device. In 1104, a beam pattern determination circuit of the radio communication device may determine a beam pattern based on the determined movement characteristics. In 1106, an antenna controller of the radio communication device may control an antenna to operate using the determined beam pattern.

The method may further include determining the beam pattern from a plurality of beam patterns, the plurality of beam patterns including at least one of a narrow beam pattern, a wide beam pattern, or a omnidirectional coverage pattern.

The movement characteristics may include or may be at least one of a speed of the radio communication device, information indicating whether the orientation of the radio communication device is changed, or information indicating whether the location of the radio communication device is changed.

The beam pattern determination circuit may determine the beam pattern based on information indicating whether the radio communication device has previously moved from using a first beam pattern to using a second beam pattern, and information indicating a ratio at which the radio communication device has previously moved from using a first beam pattern to using a second beam pattern.

The method may further include: determining a communication conditions under which the radio communication device operates; and determining the beam pattern based on the determined communication condition.

The method may further include controlling the antenna to switch operation from using a presently used beam pattern to using the determined beam pattern.

The method may further include determining the beam pattern further based on the presently used beam pattern.

The method may further include determining, if the presently used beam pattern uses a wide beam, a narrow beam pattern corresponding to a narrow beam which at least partially overlaps the wide beam.

The method may further include determining, if the presently used beam pattern uses a narrow beam, a wide beam pattern corresponding to a wide beam which overlaps the narrow beam.

The method may further include controlling the antenna to operate using at least one of a wide beam pattern or an omnidirectional coverage pattern upon start of a communication.

The radio communication device may include the antenna. For example, the radio communication device may include a first antenna and a second antenna.

The method may further include: determining the beam pattern from a plurality of beam patterns, the plurality of beam patterns including at least one of a narrow beam pattern, a wide beam pattern, or a omnidirectional coverage pattern; controlling the first antenna to provide a narrow beam pattern; and controlling the second antenna to provide at least one of a wide beam pattern, or a omnidirectional coverage pattern.

Figure 12:
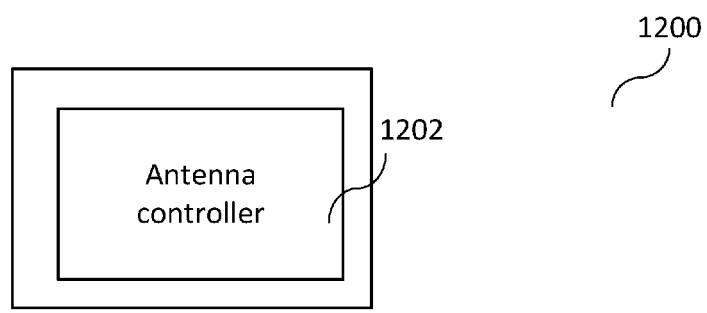
FIG. 12 shows a radio communication device with an antenna controller.

FIG. 12 shows a radio communication device 1202. The radio communication device 1200 may include an antenna controller 1202 configured to control an antenna to operate using a beam pattern determined based on movement characteristics of the radio communication device.

The movement characteristics may include or may be at least one of a speed of the radio communication device, information indicating whether the orientation of the radio communication device is changed, or information indicating whether the location of the radio communication device is changed.

Figure 13:
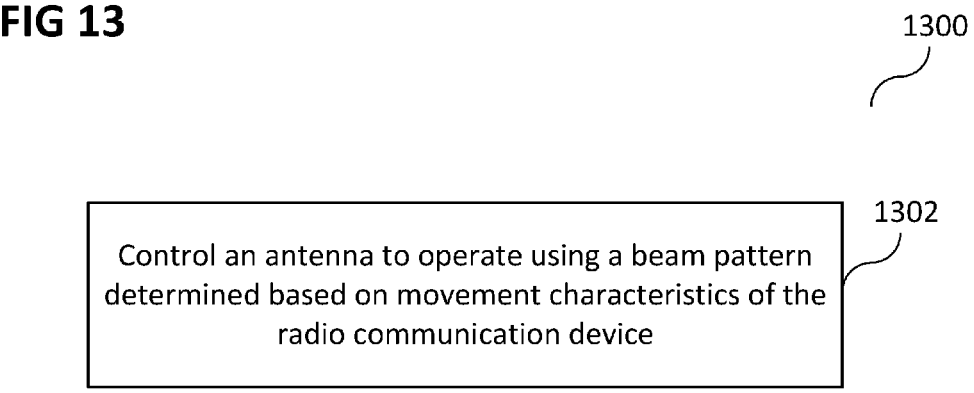
FIG. 13 shows a flow diagram illustrating a method for controlling a radio communication device, for example the radio communication device of FIG. 12.

FIG. 13 shows a flow diagram 1300 illustrating a method for controlling a radio communication device. In 1302, an antenna controller of the radio communication device may control an antenna to operate using a beam pattern determined based on movement characteristics of the radio communication device.

The movement characteristics may include or may be at least one of a speed of the radio communication device, information indicating whether the orientation of the radio communication device is changed, or information indicating whether the location of the radio communication device is changed.

It will be understood that a "narrow" beam or a "wide" beam does not necessarily have to provide the beam in a horizontal plane, but also may provide a cone (a "narrow" cone or a "wide" cone), or a beam with different sizes to the vertical direction (like a "low" beam or a "high" beam; for example a low beam may provide for communication between UEs, which may be at about the same height above ground, while a high beam may provide for communication between a UE and a base station, where the base station may be provided higher above the ground than the UE.

Devices and methods described above may be combined, for example depending on other additional parameters like described below, with devices and methods described below, for example with a certain priority assigned to certain mechanisms.

It will be understood that the radio communication device may include the antenna, or that the radio communication device may make use of an external antenna, for example an antenna which is installed in a car.

In 3G (Third Generation; or 3GPP, Third Generation Partnership Project), there may exist mainly two different options for receiving data, the DPCH (Dedicated Physical Channel; "Rel99", mainly for voice calls) and HSDPA (High-Speed Downlink Packet Access; mainly for data connections). They may differ by DPCH being a dedicated power controlled channel and HSDPA using a shared (for example not directly power controlled) channel. HSDPA may desire always a DPCH (or a fractional DPCH) running in parallel.

It may be differentiated between different receiver types for priority regarding antenna mode selection.

The performance of different antenna modes may not necessarily be the same for DPCH and HSDPA. The radio communication device may receive the HSDPA downlink from only one base station (or cell) while it may receive the DPCH from all cells in the active set, which may be up to 6 cells. Thus, for example the direction of arrival of the best signal may be different for HSDPA and DPCH. Furthermore, as DPCH and HSDPA may employ different receiver types (for example Rake vs. equalizer), for some cases (for example for some path profiles) it may happen that DPCH and HSDPA prefer different antenna modes, for example because the antenna profile from one direction may be very suited for one receiver but detrimental for the other (for example, a delay spread larger than the equalizer length, for example from a repeater).

Then a priority decision may be desired to be made, which mode to use. As the DPCH may be power controlled and usually may include streaming services (for example a voice call) with a target BLER (Block Error Rate) mapped to it, there may be no immediate desire for the user equipment (UE) to optimize its performance in normal conditions. Thus, in normal conditions, the priority may be at maximizing the HSDPA throughput. Only when the UE detects very bad conditions for the DPCH, which may result in a call drop (which may also terminate the HSDPA link), the UE may give the priority to the DPCH. To detect the bad conditions, the UE may use DPCH related parameters, for example the DPCH SNR (DPCH signal-to-noise ratio) and its relation to the SNR (signal-to-noise ratio) target (like for dynamic RxDiv (receive diversity)), or CPICH (Common Pilot Channel) related parameters like RSSI (Received Signal Strength Indication), RSCP (Received Signal Code Power), or an EcIo (carrier-to-noise ratio).

It may be understood that the priorities described above may also be used as a weighted criterion of the single criteria.

Smart trigger thresholds for antenna mode testing beside CQI, may be provided, for example for 3G DPCH.

For HSDPA, the optimization criterion may be the CQI (Channel Quality Indicator). For DPCH, the radio communication device may use CPICH related parameters like RSSI, RSCP, EcIo or DPCH related criteria like DPCH SNR. For HSDPA, the radio communication device may trigger a mode search if the CQI drops below a threshold. For DPCH thresholds may be defined for the SNR. As the DPCH may be power controlled and not the SNR but the relation of the SNR to the SNR target may be relevant, the radio communication device may trigger the mode search if the SNR drops below the target for some time, similar to dynamic RxDiv triggers known as such. Also the approach of the out-of-sync threshold or a high number of CRC (cyclic redundancy check) errors may serve as criterion. It will be understood that, several criteria may be combined (for example by Boolean operations like AND or OR), potentially with weighting and priorities.

A regular antenna mode testing scheme (for example for a power controlled reception) and smart switching off and on of the regular measurement scheme may be provided.

As the DPCH may be power controlled, small variations in the antenna performance may have no effect on the demodulation performance because they may be compensated very fast by the power control, as long as the UE is inside the power budget of the NodeB. Only when the NodeB cannot allocate all the downlink power requested by the UE anymore, the demodulation performance may get critical for the UE. It is to be noted that for the network (NW), an improved demodulation performance may always be beneficial for the downlink power budget. To trigger the mode search only when the UE is in very bad conditions may be too late and during the search, the demodulation performance may even further be degraded by testing a bad antenna mode.

Thus, as an option, the radio communication device may do the mode scanning in regular intervals to make sure that the mode selection (for example for using the best mode) may be up-to-date when the UE enters degrading conditions. When the UE enters the degrading conditions, the mode searching (and thus the switching of an operation mode of the antenna) may even be stopped (for example to avoid a further degradation, like described above) until the conditions get such critical, that a call drop on the current mode may be unavoidable (for example because out-of-sync may already be triggered). Then, testing the other modes cannot make things worse and the radio communication device may search if another mode gets the UE out of the out-of-sync state.

The radio communication device may block antenna mode testing (in other words: the mode switching blocking circuit may prevent a switching of an operation mode of the antenna) in (or for) certain critical system events or states.

As described above, there may be phases in which it may be counterproductive to start antenna mode testing, because the risk with testing a possible even worse mode (in other words: the risk with switching an operation mode of the antenna to an even worse operation mode) may be too high. The above described focuses on the radio conditions, for example degrading conditions. There may also exist for example system states, where the mode switching blocking circuit may block antenna mode testing.

For example, during the reception of important control messages (for example cell updates, reconfigurations, or similar messages) on the signaling radio bearer (SRB), it may be dangerous to lose performance, as missing one of these messages may have severe effects, for example a call drop. Thus, during SRB traffic or when the reception of SRB messages may be expected for the near future (for example the length of the antenna mode testing), antenna mode testing may be forbidden.

A similar system state may be compressed mode (CM), where it may be also not desired to risk a performance loss due to antenna mode testing and the radio communication device may block it. Again, there may be then an event like the one mentioned above (for example out-of-sync or close to it), which may override the decision.

The selection of criteria and combing or prioritization may depend also on additional parameters. For example:

The decision on priority between DPCH and HSDPA may be based on the signal strength (RSSI (Received Signal Strength Indication), RSCP (Received Signal Code Power)). For good signals, HSDPA may have priority, for bad signals DPCH.

Also frequency offset or velocity may influence the priority.

Frequency offset or velocity may also determine the time between the testing of the antenna modes.

Based on velocity, number of active set cells, and/or number of neighbor cells the radio communication device may decide to perform the regular mode testing or do an event driven mode testing.

Figure 42:
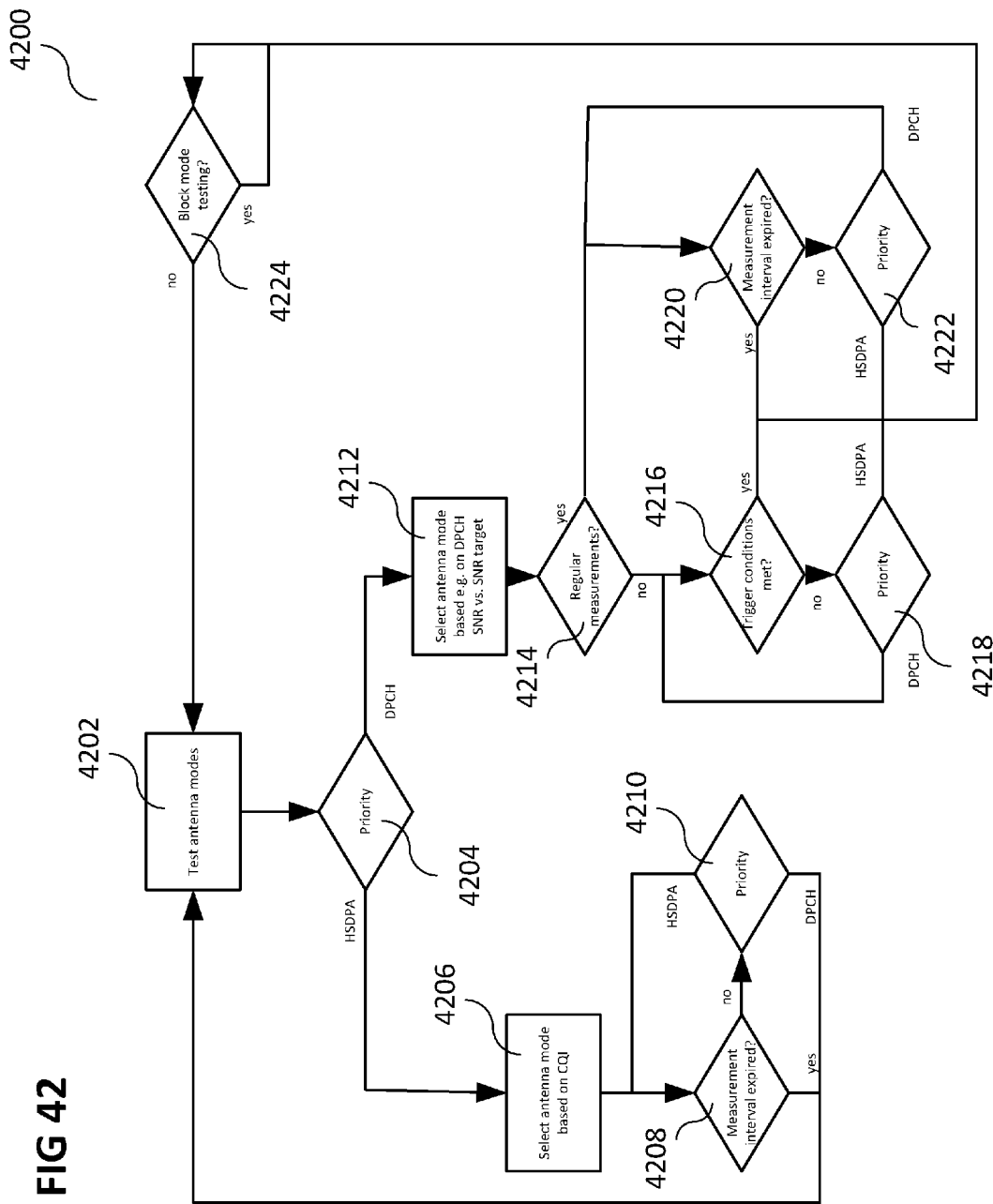
FIG. 42 shows a flow diagram illustrating a method for a radio communication device which may switch an operation mode based on a received first channel signal or based on a received second channel signal.

FIG. 42 shows a flow diagram 4200 illustrating a method for a radio communication device. The flow diagram 4200 shows an exemplary simplified block diagram for a possible combination of what will be described below. In 4202, the radio communication device may test antenna modes. In 4204, the radio communication device may check which channel signal has priority. In case HSDPA has priority, processing may proceed in 4206. In 4206, the radio communication device may select an antenna mode based on CQI. In 4208, the radio communication device may check, whether a measurement interval has expired. In case the measurement interval has expired, processing may proceed in 4202. In case the measurement interval has not expired, processing may proceed in 4210. In 4210, the radio communication device may check which channel signal has priority. In case HSDPA has priority, processing may proceed in 4208. In case DPCH has priority, processing may proceed in 4202. In case in 4204 the radio communication device may determine, that DPCH has priority, processing may proceed in 4212. In 4212, the radio communication device may select an antenna mode, based for example on DPCH SNR vs. SNR target. Then processing may proceed in 4214, where the radio communication device may determine, whether regular measurements shall be carried out. In case regular measurements shall be carried out, processing may proceed in 4220. In 4220, the radio communication device may determine, whether a measurement interval has expired. In case the measurement interval has expired, processing may proceed in 4224. In case the measurement interval has not expired, processing may proceed in 4222. In 4222, the radio communication device may check which channel signal has priority. Is case HSDPA has priority, processing may proceed in 4224. In case DPCH has priority, processing may proceed in 4220. In case the radio communication device determines in 4214 that no regular measurements shall be carried out, processing may proceed in 4216. In 4216 the radio communication device may check, whether trigger conditions are met. In case the trigger conditions are met, processing may proceed in 4224. In case the trigger conditions are not met, processing may proceed in 4218. In 4218, the radio communication device may check which channel signal has priority. In case DPCH has priority, processing may proceed in 4216. In case HSDPA has priority, processing may proceed in 4224. In 4224 the radio communication device may determine, whether mode testing is to be blocked (in other words: whether the radio communication device may is to prevent switching of an operation mode of the antenna). In case mode testing is not to be blocked, processing may proceed in 4202. In case mode testing is to be blocked, processing may continue in a loop of 4204, until in mode testing is no longer to be blocked.

In 4204, the radio communication device may apply the below-described. For example, usually HSDPA (if active) may have priority, except when DPCH detects bad conditions.

In 4216, the radio communication device may apply trigger conditions for DPCH like described.

In 4214, the radio communication device may perform regular measurements in normal operation, but not in bad conditions.

In 4224, the radio communication device may block mode testing for example while a SRB (signaling radio bearer) message is ongoing.

It is to be noted that the above described above may refer to 3G with HSDPA and DPCH, however, the radio communication device may apply it may be applied in general also to other wireless standards (and respective UEs with advanced antennas).

In the above, DPCH and HSDPA interactions and antenna mode testing strategies for DPCH have been described.

In the following, devices and methods will be described to overcome the problems outlined above. For example, a receive diversity (RxDiv) device with several (for example two) receive antennas (or receiver paths) will be described.

In an RxDiv device, only one of the two antennas may be an advanced steerable antenna or both. Depending on that, the following may be applied respectively, for example the antenna mode scanning may apply obviously only to the advanced antennas.

As RxDiv significantly may increase the current consumption and/or power consumption due to the second receive path, dynamic RxDiv may be a key feature for RxDiv. With dynamic RxDiv, the second receive path may be switched on only when needed. In 3G, the criterions may differ for HSDPA and DPCH. For HSDPA, RxDiv may always be on as long as packets are received, because the shortened download time due to higher throughput may outweigh the increased power consumption. In the downlink power controlled DPCH, RxDiv may most of the time be off. Only in very degrading conditions it may be switched on to give a boost for the demodulation performance and to avoid a call drop.

It will be understood that what is described below may also be applied to receivers with more than two antennas.

The radio communication device may alternate antenna mode testing in case multiple antennas are in use anyway.

In the case of RxDiv constantly switched on, for example due to ongoing HSDPA traffic or because static RxDiv is configured, the antenna modes may not be tested at the same time but rather alternating. Thus, there may always be one antenna with a stable performance, which may avoid too large performance drops in case a bad antenna mode is tested.

The mode testing may be continuously, for example as soon as one antenna is finished, the radio communication device may start testing the other one, or in certain measurement intervals.

In case multiple antennas are in use, the radio communication device may select the worst performing antenna for antenna mode testing.

The antenna for which the modes are tested (in other words: the antenna, for which the operation mode of the antenna is changed) may also not (or not only) be chosen alternating as described herein, but the radio communication device may choose the antenna, which has at the decision time the worse performance, for example a lower SNR, CQI, or RSSI. For this worse antenna, the chance may be higher to find a better mode and the effect of hitting an even worse mode during testing may not be as severe as hitting a bad mode with the originally better antenna, which had the higher contribution to the reception quality, for example the throughput.

The radio communication device may perform antenna mode testing in idle period of bursty HSDPA traffic.

As described above, for HSDPA, dynamic RxDiv may switch RxDiv usually ON when HSDPA packets are received, and OFF if no packets are received for a predetermined time. The latter may not mean the HSDPA radio bearer gets removed; it may be for example just because of the used application, for example bursty traffic like push email or browsing.

Thus, according to various embodiments and devices, the antenna modes may not be tested during active HSDPA traffic or only in longer intervals here, but the radio communication device may test the antenna modes as soon as the HSDPA traffic stops. Then, there may be no risk of throughput degradation as no packets are received anyway. And the underlying DPCH may be power controlled, so the impact of testing bad modes may be limited or compensated by other mechanism described herein.

For DPCH with dynamic RxDiv, but currently single-Rx, the radio communication device may switch on RxDiv for a phase of antenna mode testing.

For DPCH (for example a voice call), RxDiv may be switched most of the time OFF by dynamic RxDiv, because for the power controlled DPCH, the RxDiv performance gain may only be needed in degrading conditions. Drive tests have shown that the RxDiv usage for DPCH with dynamic RxDiv is usually very low, for example less than 2%. Thus, the increase in power consumption compared to a single-Rx UE may be negligible.

As very short RxDiv periods may not hurt the overall power consumption, RxDiv may be switched on also briefly for the antenna mode testing. Thus, a performance drop due to a bad antenna mode may be (over-)compensated by the RxDiv gain. Thus, when in certain intervals the antenna modes are tested, RxDiv may be switched on for the test period. If several advanced antennas exist, the radio communication device may test them in parallel or consecutively. The latter one may be on the safer side for the performance, but on the other hand may increase the RxDiv on time, and thus may increase the power consumption.

At the end of the measurement period, the radio communication device may choose the best antenna mode (from all available or tested antennas), when switching back to single-Rx operation.

The radio communication device may adapt dynamic RxDiv triggers during antenna mode test phase.

When a dynamic RxDiv UE is in single-RX reception, for example during a DPCH voice call, there may exist the mechanism of switching RxDiv on as a safeguard for a performance drop. Thus, the radio communication device may do the antenna measurement in the single-RX mode on the one active antenna, but it may be ensured that in case the demodulation performance drops too low because of a very bad antenna mode, that immediately RxDiv may be switched on to compensate. The RxDiv trigger mechanism may work very fast, but in this case with the knowledge of an upcoming possible degraded performance, it may be adapted to further speed up its activation.

Rxdiv may be switched on briefly at antenna mode switches to avoid performance glitches.

When switching the antenna modes, very short "glitches" in the demodulation performance may occur, because for example channel estimation or path delay profile may need a short time to adapt since they won't change smoothly but "jump" abruptly to the values from the new mode. To avoid negative effects by the "glitches", RxDiv may be switched on for these very short periods. This may not mean for the complete test phase (here for example power control may compensate), but only for the initial settling period of an antenna mode.

With dynamic RxDiv, when switching from 2-Rx to single Rx, the radio communication device may measure and choose the best antenna mode.

Dynamic RxDiv for DPCH may trigger RxDiv on if the performance of a single antenna is not sufficient. To switch RxDiv off again, the radio communication device may check if a single antenna delivers sufficient performance again. With the advanced antennas (in other words: with the antennas configured to operate in a plurality of operation modes), this may be extended such that after RxDiv is switched on, the radio communication device may check all possible antenna modes (on all antennas) if there is a certain mode on a certain antenna, which may be good enough for single-Rx operation. Thus, the radio communication device may extend the search from antennas to the individual modes of the antennas.

As the antennas in a multiple antenna (for example RxDiv) UE may not be spaced that far apart due to the constraints of the form factor, there may be dependencies between the antenna modes of different antennas. Thus, if a certain mode is the best one on one antenna, a certain mode may be most likely the best one on another antenna. This may be considered in the antenna mode testing, for example:
test the expected better modes first;
only test modes which are predicted to be good; and/or
do not test modes which are predicted to be bad.

Due to the environment, for example a user holding the phone, the dependencies may change. Thus, not only factory design dependencies may be considered, but also the results of the past antenna mode test on the different antennas, which were triggered by some other mechanism.

Furthermore, sensors on the phone (for example a proximity sensor or a touch sensor) may give information, which may influence the antenna mode selection, for example which modes to test preferably (in other words: to which operation modes the radio communication device may switch preferably).

What has been described above may be combined, for example depending on other additional parameters (for example like will be described below) or with a pre-determined priority assigned to pre-determined mechanisms.

It is to be noted that the description above may refer to 3G with HSDPA and DPCH, however, what is described herein may be applied in general also to other wireless standards (and respective UEs with advanced antennas).

In the above, a receive diversity (RxDiv) UE and aspects for smart antenna mode testing strategies have been described.

In wireless standards such as LTE (Long Term Evolution) and HSDPA (High-Speed Downlink Packet Access), MIMO (Multiple Input Multiple Output) transmission schemes may be defined to further improve the throughput. MIMO may combine multiple antennas at the transmitter (for example at the base station) and multiple antennas at the receiver (for example at the UE) with an intelligent mapping of the data, so that parallel data streams can be transmitted orthogonally via the same connection.

In the following, exploitation of advanced antennas in combination with MIMO will be described.

For example, the radio communication device may use the rank of the channel matrix as optimization criterion for antenna mode optimization. It will be understood that a channel matrix may be a matrix including a plurality of entries, wherein each entry in a certain line and column described the transmission from an antenna corresponding to the number of the line to an antenna corresponding to the number of the column. It will be understood that also a definition leading to the transpose of the previous definition may possible, without changing the rank of the respective channel matrix.

The optimization goal may be the throughput. Thus, the CQI may be chosen again as optimization criterion. But also the rank of the MIMO channel matrix may be chosen as optimization criterion. With a higher rank, more parallel data streams may be transmitted, which usually may relate to a higher throughput. As similar to what has been described above, several receive antennas may exist, different antenna mode testing strategies may be provided.

Based on an analysis of the channel matrix or the CQI, the radio communication device may find out which antenna is currently the worst one, i.e. for which antenna the selection of a different and better antenna mode may yield the most benefit.

Based on stored previous measurement, the radio communication device may calculate what the channel matrix (and for example its rank) would be if a certain other mode on a certain antenna is used. Then, the radio communication device may not necessarily test all possible antenna modes, but it focus on the one(s), which is/are expected to be good.

This may be extended to a round robin like antenna selection process, where each antenna may be tuned to the respective (local) optimum setting. This optimization process may lead to the global optimum (or close to it) in stationary conditions.

Via the requested precoding matrix (which may be applied at the transmitting NodeB), the UE may also influence the transmitter side. This may be also taken into the consideration for optimization of the channel matrix by selecting different antenna modes.

Figure 43:
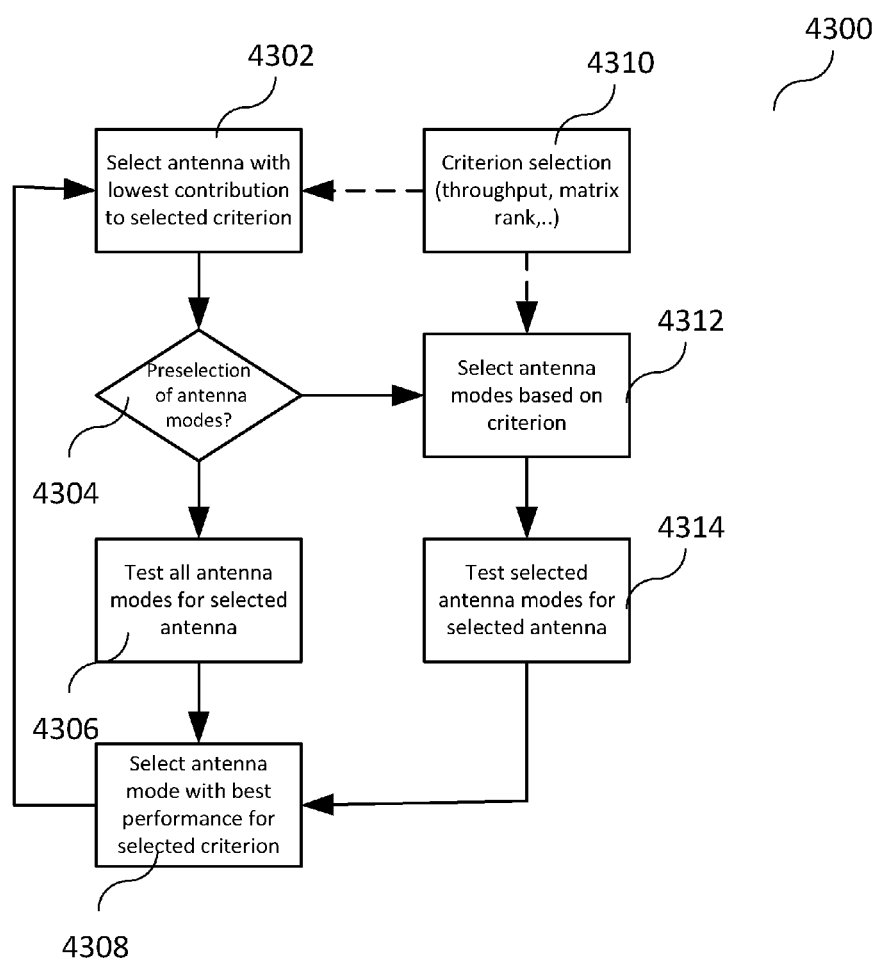
FIG. 43 shows a flow diagram illustrating a method for a radio communication device including a complex scheme for testing a plurality of operation modes.

FIG. 43 shows a flow diagram 4300 illustrating a method (for example a complex scheme) for a radio communication device. In 4302, the radio communication device may select an antenna with a lowest contribution to a selected criterion. In 4304, the radio communication device may determine, whether antenna modes have been preselected. In case antenna modes have been preselected, processing may continue in 4306. In 4306, the radio communication device may test all antenna modes for a selected antenna. In 4308, the radio communication device may select an antenna mode with best performance for the selected criterion. In case it is determined in 4304, that a preselection of antenna modes has not been performed, processing may continue in 4312. In 4312, the radio communication device may select antenna modes based on the criterion. In 4314, the radio communication device may test the selected antenna modes for the selected antenna. As noted by block 4310, the radio communication device may select a selection criterion, for example throughput or maximum rank. The radio communication device may use this criterion in 4302 and 4312.

Figure 44:
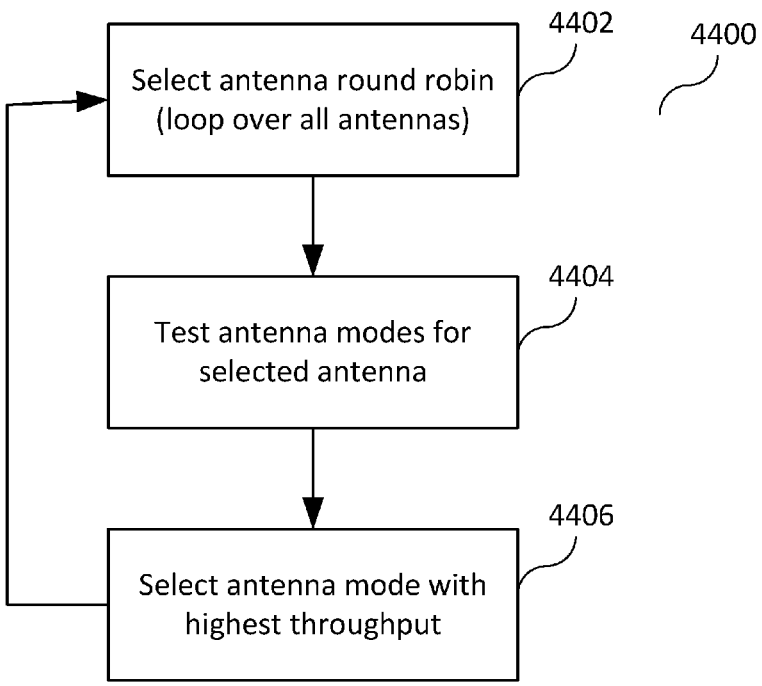
FIG. 44 shows a flow diagram illustrating a method for a radio communication device including a basic round robin scheme for testing a plurality of operation modes.

FIG. 44 shows a flow diagram 4400 illustrating a method (for example a basic round robin scheme) for a radio communication device. In 4402, the radio communication device may select one antenna in a round-robin fashion, for example in a loop over all antennas. In 4404, the radio communication device may test antenna modes for the selected antenna. In 4406, the radio communication device may select the antenna mode with the highest throughput.

The radio communication device may use antenna mode optimization to suppress interference from other users in MU-MIMO (Multi-User MIMO) like will be described in more detail below.

One variant of MIMO may be Multi-User MIMO, where more than one user may share the same physical resource. The different users may spatially be separated and thus may have different channel matrices. Via different precoding, then the base station may transmit separate data streams for the different users. Due to the different channel matrices, each user may mainly "see" his own data stream. But as the channel matrices may not be completely orthogonal, each user may see some interference from other users.

Using or testing different antenna modes, it may according to this not only be tried to receive the best own signal, but also the interference from signals for other users may be reduced. In total, this may improve the own SNR of the user and in general may increase the capacity of the network.

Thus, one optimization criterion during antenna mode testing may be the lowest interference from other users in a MU-MIMO scenario. Again, the precoding matrices at the NodeB may be included into the optimization process.

The radio communication device may optimize the channel matrix (for example by antenna mode selection) not for throughput but for robustness, for example in combination with a pre-determined transmission mode and pre-determined precoding.

Maximizing the throughput may be an important optimization criterion in MIMO systems, which may usually be targeted for high rate data transmissions.

But for some cases, the data rate itself may be of less importance, but the robustness of the transmission may have the focus, for example to transmit at least a small amount of data without errors or retransmissions. Examples for such scenarios may be the reception of important control messages (for example handover information), degrading radio conditions with the UE being close to a connection loss, or voice calls (for example voice over IP (Internet Protocol)). In this case, it may be desired to have a channel matrix which may be more robust (for example with a lower rank and different transmission mode), but may allow less data rate.

Also in these cases, the antenna mode testing or selection may be adapted to better support for example a changed transmission mode.

The radio communication device may make a decision like described below with reference to FIG. 45.

Figure 45:
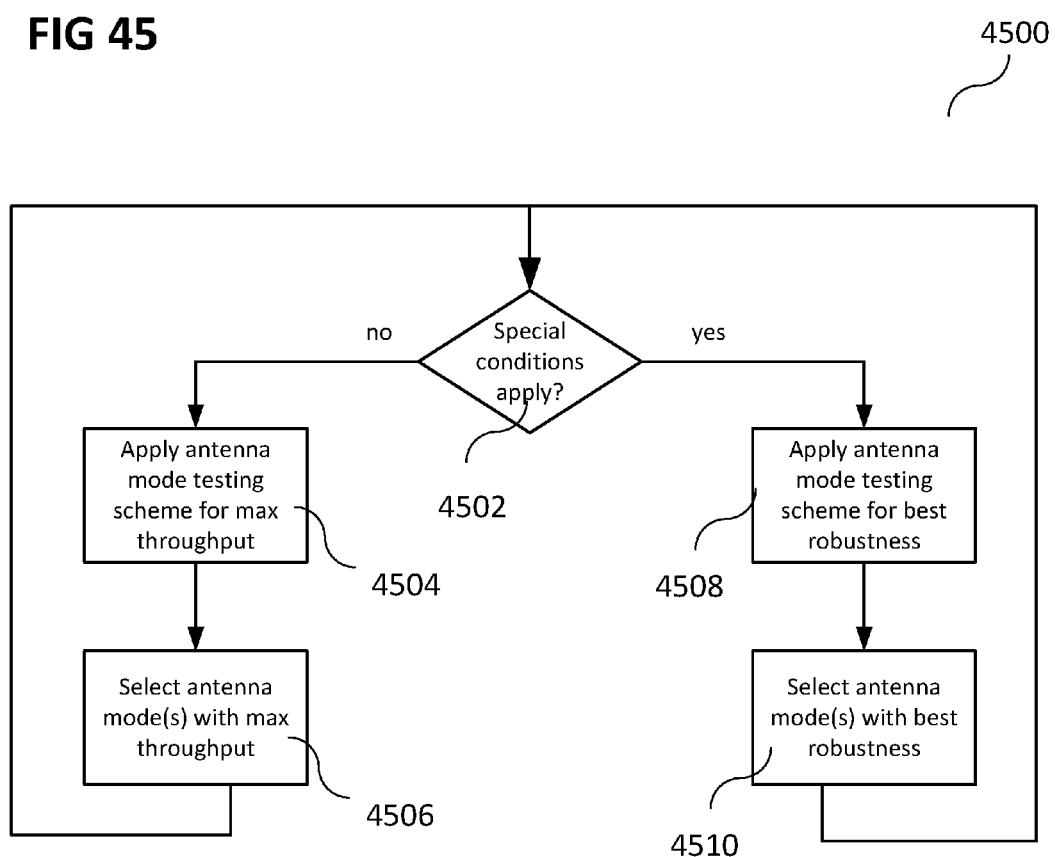
FIG. 45 shows a flow diagram illustrating a method for controlling a radio communication device and deciding between robustness and throughput when selecting an operation mode.

FIG. 45 shows a flow diagram 4500 illustrating a method for controlling a radio communication device. In 4502, the radio communication device may determine, whether special conditions apply. In case special conditions do not apply, processing may continue in 4504. In 4504, the radio communication device may apply an antenna mode testing scheme for maximum throughput. In 4506, the radio communication device may select the antenna mode or the antenna modes with maximum throughput. In case the radio communication device determines in 4502, that special conditions apply, processing may continue in 4508. In 4508, the radio communication device may apply an antenna mode testing scheme for best robustness. In 4510, the radio communication device may select the antenna mode of the antenna modes with best robustness.

It will be understood that what has been described above may be combined, for example depending on other additional parameters like described above or with a pre-determined priority assigned to a pre-determined aspect of the described aspects.

In the above, a receive diversity (RxDiv) and/or MIMO UE and smart antenna mode testing strategies have been described.

In the above, mainly focus has been put on the reception in the downlink, for example throughput or call robustness.

Also the uplink, for example the TX (transmission) in the UE, may be included into the decision, like described in the following.

The best antenna mode for DL (downlink) and UL (uplink) may differ. For example, in the DL, the UE may be connected to only one cell for HSDPA, and to the active set for the DPCH. In the UL, also the active set may be relevant for the DCH, but for HSUPA (High Speed Uplink Packet Access), the EUL (enhanced uplink) active set, which may be only a subset of the DCH active set, may be relevant.

Rx (receive or reception) and Tx (transmission) requests may be combined for antenna mode testing.

It may be assumed that there is an indicator for the best antenna mode seen by the TX (for example according to what has been described below). If there is no Rx indicator, this Tx indicator may serve as single control mechanism for the antenna mode.

If an Rx indicator exists as well, for example like described above, a decision and prioritization between the indicators may be necessary. There may be also several Rx indicators (for example for DPCH and HSDPA) and TX indicators (for example DCH and HSUPA) which may have to be considered. It may be assumed for simplicity that these may be combined separately per Rx and Tx.

Then, when only HSUPA and not HSDPA is active, the Tx indicator may have priority, and when only HSDPA or HSDPA and HSUPA are active, the Rx indicator may have priority. By active it may be referred to either the active reception and/or transmission of packets or just the establishment of the respective HSDPA and HSUPA bearers.

Furthermore, a weighting of the Tx and Rx indicators may be provided, for example based on the amount of data to be transmitted in UL and DL.

Furthermore, Rx and Tx may each have the possibility to override the decision in case of a critical situations, for example close to a call drop, Tx power at maximum, or high TX power generating too much heat.

Figure 46:
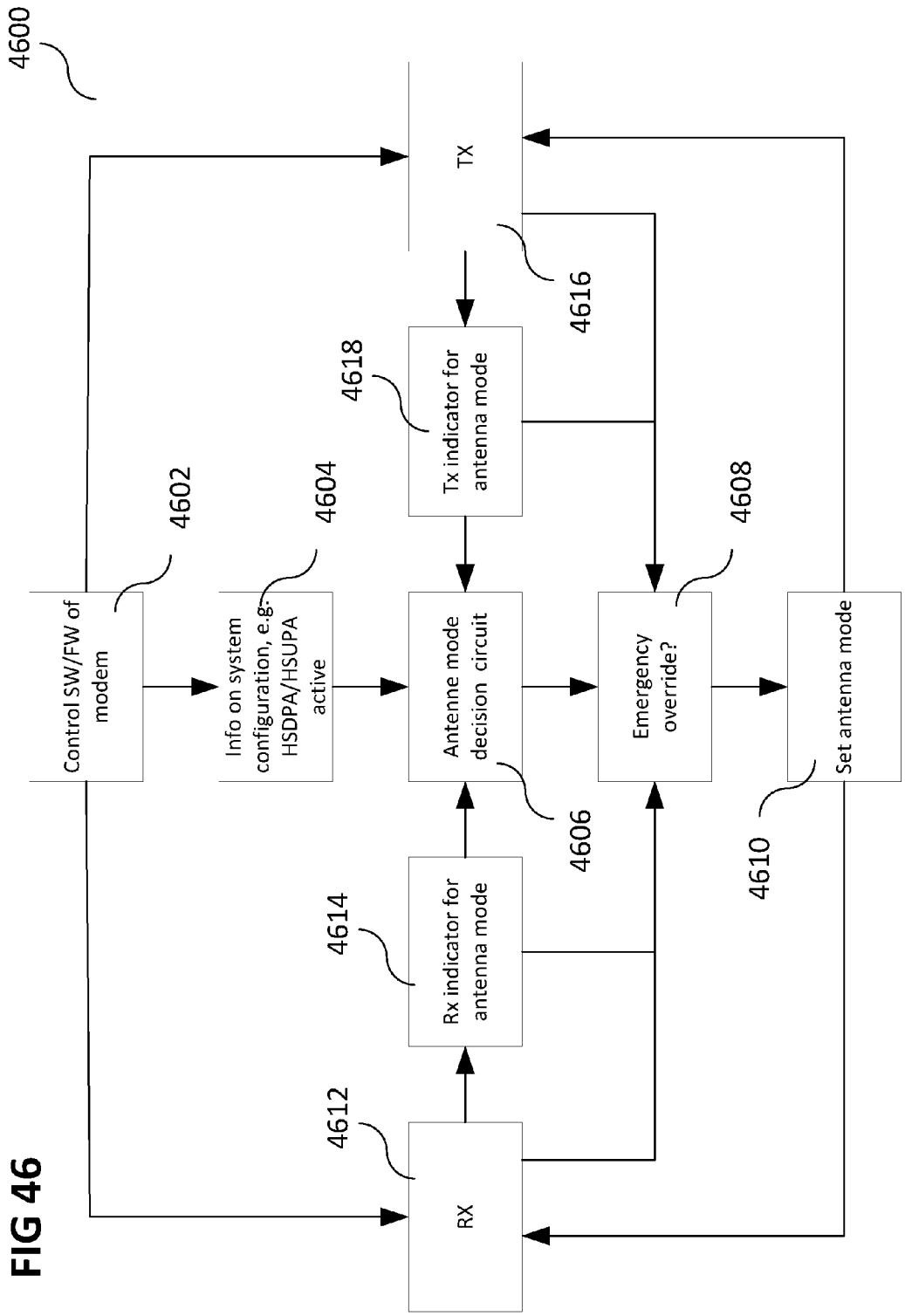
FIG. 46 shows a flow diagram illustrating a method for controlling a radio communication device taking into account both transmission and reception of data when selecting an operation mode.

FIG. 46 shows a flow diagram 4600 illustrating a method for controlling a radio communication device. In 4602, the radio communication device may execute a control software or control firmware of a modem of the radio communication device. In 4612, the radio communication device may perform reception of data. In 4616, the radio communication device may perform transmission of data. In 4604, the radio communication device may determine information on a system configuration, for example information indicating whether HSDPA and/or HSDPA are active. In 4606, the radio communication device may execute an antenna mode decision circuit. In 4614, the radio communication device may indicate an RX indicator for the antenna mode. In 4618, the radio communication device may determine a Tx indicator for the antenna mode. An override indicator the may be transmitted from the receiver, like indicated by an arrow from 4612 to 4608, and from the transmitter, like indicated by an arrow from 4616 to 4608. In 4608, the radio communication device may determine, whether an emergency override should be performed. In 4610, the radio communication device may set an antenna mode. The set antenna mode may have influence on the reception of data, like indicated by an arrow from 4610 to 4612, and on the transmission of data, like indicated by an arrow from 4610 to 4616.

The radio communication device may select (or may switch) an antenna mode according to a lowest transmit power, like will be described in more detail below.

One criterion for selection of antenna mode based on a Tx parameter may be to select the antenna mode, which yields the lowest transmit power. The transmit power in the UE may be controlled by the uplink power control (ULPC). A lower transmit power may mean a better reception of the uplink signal by the respective base stations of the network.

A lower transmit power may have several benefits for the UE and the NW (network): Lower Tx power may mean for example:
  less interference in the uplink for the NW/the other users;
  more headroom towards the max Tx power limit for degrading conditions;

more headroom towards the max Tx power limit for additional throughput; and/or less power used from the battery, which may for example provide longer talk time. High Tx powers may dominate the power consumption.

Figure 47:
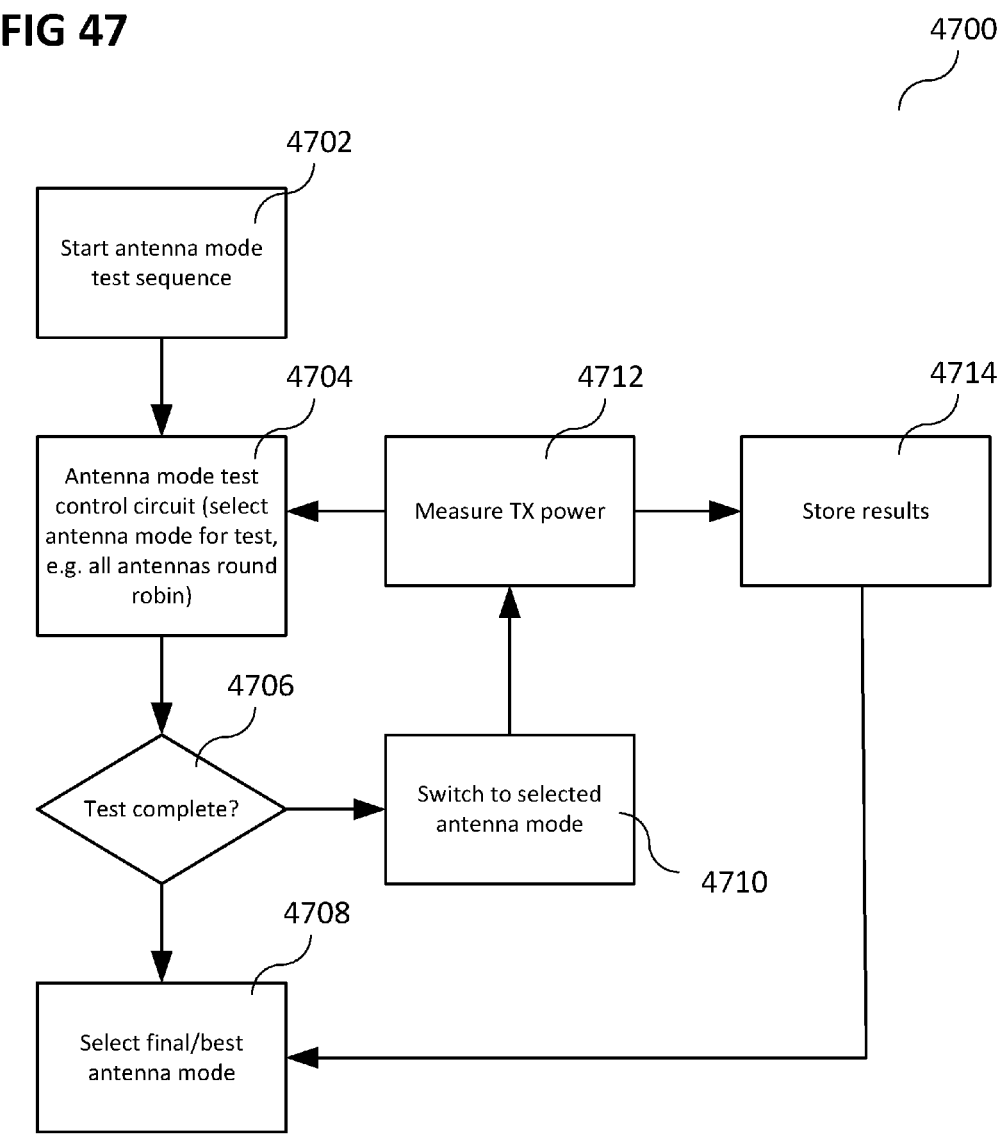
FIG. 47 shows a flow diagram illustrating a method for a radio communication device taking into account transmission power when selecting an operation mode.

FIG. 47 shows a flow diagram 4700 illustrating a method for a radio communication device. In 4702, the radio communication device may start an antenna mode test sequence. In 4704, the radio communication device may operate an antenna mode test control circuit; for example the antenna mode test control circuit may select antenna modes for testing, for example may select all antennas in a round-robin fashion. In 4706, the radio communication device may determine whether the test is complete. In case testing is not complete, processing may proceed in 4710. In 4710, the radio communication device may switch to the selected antenna mode (in other words: to the antenna mode selected for testing). In 4712, the radio communication device may measure the TX power. The radio communication device may store the measurement results in 4714. After 4712, processing may proceed in 4704. In case it is determined in 4706 that testing is complete, processing may proceed in 4708. In 4708, the radio communication device may select the final (in other words: the best found) antenna mode, based on the measurement results, for example based on the results stored in 4714.

A simple scheme may be provided, for example round robin measurements of all modes. Applying what has been described above to the uplink, there may also be provided further schemes, for example to reduce the number of tested modes or to stop testing in certain conditions.

The radio communication device may select an antenna mode considering cell specific information.

As described above, a reduced Tx power may result in a reduced interference and thus increased cell or network capacity. Interference and capacity may also be (implicit) optimization criteria.

The antenna mode with the lowest Tx power may not be the antenna mode with the lowest interference to neighbor cells, because the UE may be connected to several NodeBs in the uplink and one NodeB, for example the one where the antenna mode mainly points to, may dominate the Tx power control.

However, all NodeBs to which the UE is connected in the uplink, may send independent information about their reception quality to the UE, for example in terms of transmit power control (TPC) bits, which may provide information indicating an instruction for power UP or power DOWN (in other words: whether the transmission power for the respective radio communication device should be increased or decreased) and for HSUPA grants for the allowed throughput.

For the best optimization with respect to cell or network capacity, maximization and interference minimization the UE may consider the provided NodeB specific information and may not just consider the single combined TX power value.

The radio communication device may select an antenna mode according to highest uplink throughput or ACK/NACK (acknowledgement/negative acknowledgement) rate.

Besides the TX power as described above, also the throughput may be taken directly as criterion for optimization. For example, the radio communication device may measure the throughput directly during the test phases of the different antennas modes and then may take the antenna mode (in other words: may choose the antenna mode), which showed the highest throughput. Or the radio communication device may monitor the grant (an indicator for allowed HSUPA transmission rate), and may select the antenna mode with the highest grant.

Another indirect criterion may be the ACK/NACK rate for the HARQ (Hybrid Automatic Repeat Request) processes of the uplink packets. The radio communication device may choose the antenna mode with the highest ACK rate, and this may indicate the most reliable uplink transmission, which may yield the most efficient uplink transmission.

Measurement patterns described herein for the downlink may be applied.

For the measurement pattern, in other words for when antenna mode measurements are done and which modes are measured, devices and methods may be applied like in what is described herein. They may also be applied in the uplink. For example, the radio communication device may start antenna mode measurement in the idle phases of HSUPA or the radio communication device may stop antenna mode measurements when an important control message is transmitted on the signaling radio bearer (SRB).

Also for prioritization and combining of potentially more than one indicator from the Tx, similar devices and methods like described above for the downlink may be applied.

It will be understood that the indicators described above may be combined for UL and DL or may be provided in a prioritized combination of UL and DL.

An emergency trigger for antenna mode in TX, for example based on max (maximum) TX power reached, may be provided, like will be described in more detail below.

Like for the downlink, there may be also emergency triggers in the uplink, which may trigger an antenna mode measurement, for example when the UE is in a time interval based measurement mode. Such a trigger may be or may include for example:

reaching max TX power;

too many NACK received and/or too many retransmission;

an indicator by an application that soon a large data packet is transmitted;

if uplink data is indicated as not urgent (for example push email) and the uplink (HSUPA) is otherwise idle, the radio communication device may hold the uplink data until the radio communication device may select the best antenna mode and then may transmit it to use the uplink most efficiently.

An optimized antenna mode for transmit diversity may be provided like for receive diversity described above.

Also for the uplink, diversity schemes like MIMO may be provided. For example, for UMTS (Universal Mobile Telecommunications System), closed-loop transmit diversity (CLTD) may be provided. Schemes like described above may be applied, for example:

Optimizing the two antennas jointly if both are active, for example with respect to transmit power or throughput; and/or If the radio communication device applies a dynamic transmit diversity scheme and only one antenna is required to be active, the radio communication device may choose the best mode of all antennas.

It will be understood that what is described herein may be combined, for example depending on other additional parameters described above, or with a pre-determined priority assigned to pre-determined aspects.

In the above, the TX of the UE and antenna mode testing strategies for it have been described.

What has been described above may for example focus on throughput or call robustness.

In the following, it will be described how the radio communication device may use the advanced antennas (in other words: the antennas which may be configured to operate in a plurality of operation modes) also for measurements. This may be for the measurements during an active connection (for example for searching cells for handovers), which may be called "connected mode" in the following, and while not having an active connection (for example waiting for paging), which may be referred to as "idle mode" (which is not to be confused with the "real" IDLE state of for example UMTS).

PLMN (Public Land Mobile Network) and/or PSSI (physical signal strength indicator) search may be enhanced by applying different antenna modes.

The advanced antennas may be used to improve the speed of PSSI scan/PLMN search, for example the camping on a network after switching on the mobile, crossing a border and the need to find the new network there, or coming back for service recovery.

As an example, when scanning through the frequencies for PSSI/PLMN search, the UE may scan through the antenna modes as well. The details may depend on the used frequency scanning strategy. There may be provided for example the following mechanisms:

a) Whenever the radio communication device scans a frequency, the radio communication device may try all antenna modes round robin.

b) First the radio communication device may try all frequencies on one antenna mode. Only if this was not successful, the radio communication device may start the next round of frequency measurements on the next antenna mode.

c) In each scanned frequency, the radio communication device may do a short round robin scan of all or a selected number of modes to determine the one with the highest energy, and then the radio communication device may do the full scan for this frequency with the best antenna mode.

d) The radio communication device may do a round robin scan of all antenna modes on one frequency and then the radio communication device may apply the best antenna mode also to potentially following scans of nearby frequencies, for example the frequencies in the same frequency band.

e) When the radio communication device found a PLMN, but this is not the desired PLMN (Home PLMN, preferred roaming PLMN, . . . ), then the radio communication device may find the best antenna mode for the found PLMN, and then the radio communication device may continue searching for a preferred PLMN with this antenna mode. Co-location of NodeBs, shielding of the UE, for example by a hand, may make it likely that also for the desired PLMN, this antenna mode may be a good choice.

f) When doing narrowband scans to search for a wideband signal (for example 200 kHz steps for a 5 MHz signal), the radio communication device may switch the antennas round robin for each narrowband step, so that preferably each antenna mode may be covered inside the wideband signal. Then, the radio communication device may select the best antenna mode for the remaining scanning or PLMN reading. The radio communication device may test different modes for different frequencies.

Depending on likeliness that something is found in a specific scan during the PSSI/PLMN search, the search strategy may be adapted also in terms of the antenna modes are scanned or not. For example, if searching on the last frequency the UE was camped on, or searching the frequencies of the provider of the SIM, the chances to find something fast may be high. Thus, the overhead may be spent to scan through the antenna modes, to make sure that these frequencies are covered reliably. On other less likely frequencies, the radio communication device may try only one antenna mode per antenna, for example according to what is described herein.

The radio communication device may search antenna modes according to a smart scheme during idle mode to improve measurements and keep the UE in the same network, like will be described below.

In idle mode, the UE may be camped to a certain cell. When it moves through the network, the UE may have to switch cells. At the edge of the network, the signal may get very week and the UE may try to do a reselection to another network, for example from 3G to 2G (second generation), or from 3G to 3G near a border between countries. This may result in roaming charges, because the UE may leave the home (or preferred) network. To reduce this problem, idle mode RxDiv may be provided. However, this may desire that the UE is RxDiv capable, which cheap and/or small form factor UEs may not be. With the advanced antenna, a similar effect may be achieved for a single antenna UE, and for RxDiv-capable UEs the performance could be further enhanced.

A method may be as follows:

In normal conditions, the UE may scan round robin all antenna modes during the measurement intervals, for example in each measurement, the radio communication device may use one mode, and after the gap at the next measurement instance, the radio communication device may use the next antenna mode.

When the received signal strength drops close to or below a threshold (for example for reselection), the UE may switch to the best antenna mode it had stored from the previous round robin measurements.

Only when it drops below the threshold also with this mode, it may do a quick scan (for example not necessarily waiting for the measurement intervals, but directly in one consecutive mode), across all antenna modes, to see if meanwhile the antenna mode yields a performance above the threshold. If yes, the UE may switch to that antenna mode and may wait again until it drops below the threshold.

Only when no antenna mode with a performance above the threshold is found, the UE may take the action (for example searching for reselection networks) required when dropping below the threshold (here what has been described above for PSSI/PLMN scan may be applied).

The UE may continue to scan round robin on the old network and once one antenna modes pushes the UE above the threshold, it may stick to this mode again and may resume the behavior when being above the threshold.

Once the UE is a certain hysteresis distance above from the threshold, it may switch again to the original round robin scheme in good conditions.

The signal strength could be for example values like RSSI (Received Signal Strength Indication), RSCP (Received Signal Code Power), or an EcIo (carrier-to-noise ratio).

Figure 48:
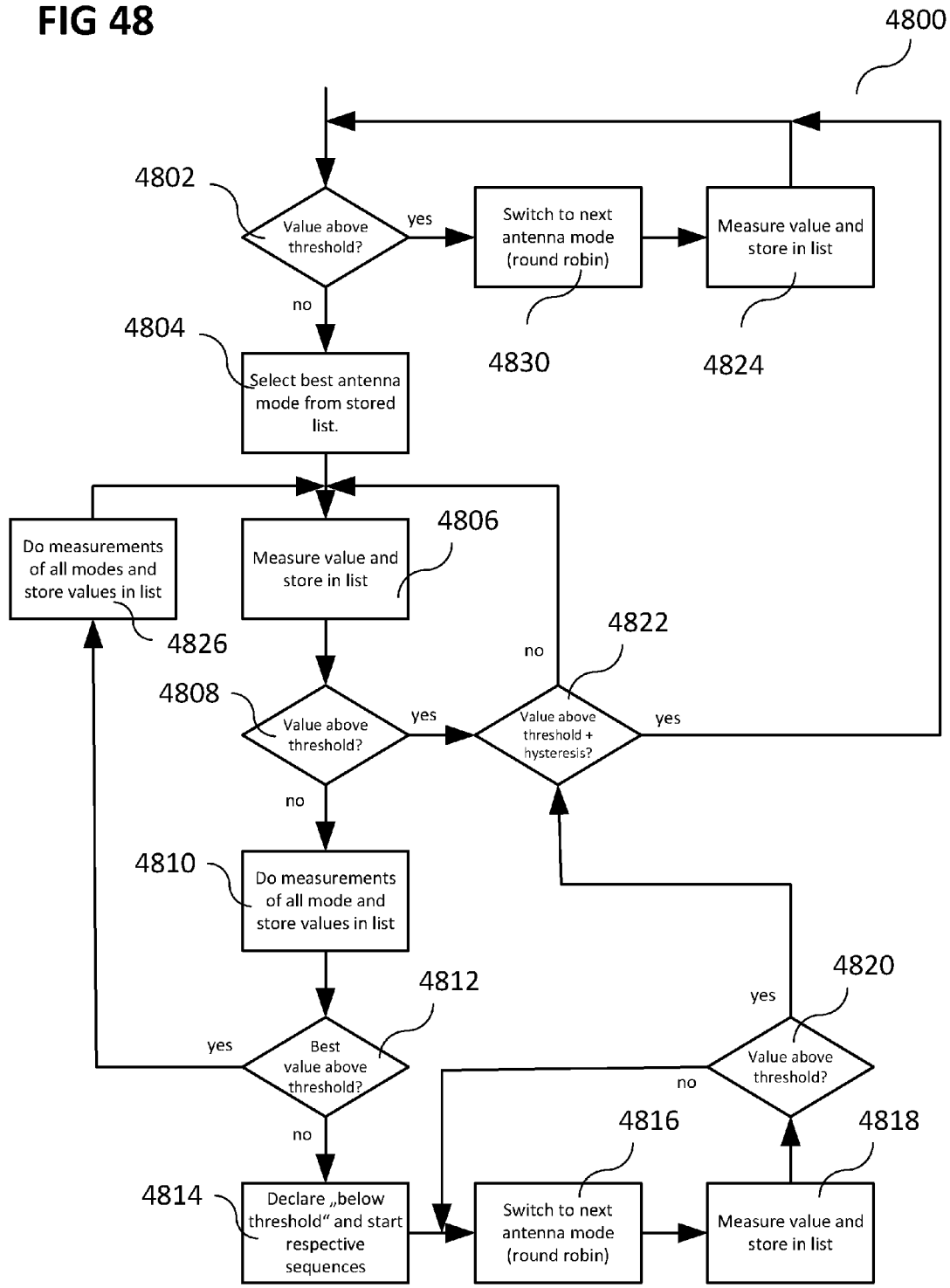
FIG. 48 shows a flow diagram illustrating a method for a radio communication device performing measurements for operation modes for preparation for a hand-over.

FIG. 48 shows a flow diagram 4800 illustrating a method for a radio communication device. In 4802, the radio communication device may determine, whether a value, for example a value indicating a signal strength, is above a pre-determined threshold. In case the value is above the threshold, processing may proceed in 4828. In 4828, the radio communication device may switch to a next antenna mode, for example in a round-robin fashion. In 4824, the radio communication device may measure the value for the antenna mode, and may store it in a list. In case the radio communication device may determines in 4802 that the value is not above the threshold, processing may proceed in 4804. In 4804, the radio communication device may select the best antenna mode from the stored list. In 4806, the radio communication device may measure the value and may store it in the list. In 4808, the radio communication device may determine, whether the value is above a pre-determined threshold. In case the value is above the threshold, processing may proceed in 4822. In 4822, the radio communication device may determine, whether the value is above the sum of the threshold and a pre-determined hysteresis value. In case the value is above the sum of the threshold and the pre-determined hysteresis value, processing may proceed in 4802, otherwise in 4806. In case it is determined in 4808 that the value is not above the threshold, processing may proceed in 4810. In 4810, the radio communication device may perform measurements of all modes and may store the results (in other words: the values) in the list. In 4812, the radio communication device may determine, whether the best value is above the threshold. In case the value is above the threshold, processing may proceed in 4826. In 4826, the radio communication device may perform measurements of all modes and may store the results (in other words: the values) in the list. In case the radio communication device determines in 4812 that the value is not above the threshold, processing may proceed in 4814. In 4814, the radio communication device may declare "below threshold", and may start respective processing (or respective sequences). In 4816, the radio communication device may switch to a next antenna mode, for example in a round-robin fashion. In 4818, the radio communication device may measure the values for the antenna mode to which the radio communication device has been switched in 4816, and may store the measured value in the list. In 4820, the radio communication device may determine whether the best value is above the threshold. In case the value is above the threshold, processing may proceed in 4822, otherwise in 4816.

The radio communication device may switch the antenna modes through to select the best antenna mode for the reception of PICH (paging indicator channel) and/or a PCH (paging channel).

A task of the UE in the idle mode may be to the listen to pagings, for example monitoring the paging indicator channel (PICH) and in case of positive paging indicator (PI) and reading the paging channel (PCH).

A problem may be that there may be false alarms on the PICH or CRC (cyclic redundancy check) errors when reading the PCH. In case of errors, the paging information PICH and PCH may be repeated a few times. To improve the performance, the advanced antenna may be provided with different antenna modes, like will be described below.

Assuming a Negative PI:

During the normal idle mode when no PI is detected, for example the round robin scheme described above for normal conditions may be applied. Or to be more often on the best antenna mode, the radio communication device may use the best antenna mode for a pre-determined time and the radio communication device may start antenna mode measurements only in longer intervals, for example triggered by time or by the signal strength of the used antenna mode dropping by a pre-determined value below the recent maximum value. The radio communication device may do the antenna mode measurements of this update phase at the normal measurement intervals or directly back-to-back, with keeping the receiver on longer at one measurement instance.

Assuming a Positive PI:

If the PCH is decoded correctly, no action may be necessary as well and the UE may switch to the connected state. However, if the time between successful PCH reading and call setup may be large enough, the radio communication device may use this time span to search for better antenna modes to use the best mode at call setup.

If the PCH is not decoded correctly, this may be a false alarm on the PI or bad performance of the PCH. To solve that, the UE may switch to another antenna mode for the next PI instance. Another way is leaving the receiver on a little bit longer to scan all antenna modes in the gap between the PI, and to use the best antenna mode for the next PI/PCH reception. To increase the accuracy further, the radio communication device may do this scan also not after the failed PICH/PCH reception, but directly before the following PICH/PCH reception, for example starting the receiver earlier.

It is to be noted that PI and PCH may refer to UMTS, but that what is described herein may also be applied to other standards. For example, the distance between PI and PCH may be very short. But if a wireless standard has a sufficiently large gap between PI and PCH, the UE may also search for the best antenna mode between PI and PCH. This may depends on how long the antenna mode measurements take.

The radio communication device may determine the optimum antenna mode for neighbor cells to use these cells directly with the best mode after a handover to this cell.

In the connected mode, the UE may be receiving data from one or more cells. In UMTS, for example, the radio communication device may receive the DPCH from all the up to 6 cells in the so-called active set. In LTE (Long Term Evolution), the UE may be connected to only one cell.

As the UE is moving, it may desire to switch to new cells, for example may desire a hard handover to another cell or adding a cell to the active set. To find and select the proper new cell, the UE may be searching and measuring other cells from which it receives a signal. A new cell may usually be considered (for hard handover or addition to the active set) when its signal strength (for example RSSI, RSCP, EcNo) gets above a pre-determined threshold.

To find the best cell, the UE may scan round robin through the antenna modes while measuring the neighbor cells. Also the radio communication device may measure the own active cell or cells to make the proper comparison to the neighbor cells. For all cells, the radio communication device may store the measurements per antenna mode and then the radio communication device may take the best measurement per cell for evaluation, or for example the radio communication device may take the average of the two or some best modes.

It will be understood that, as only one antenna mode at the same time may be active and the radio communication device may perform the measurement in connected mode in parallel to the normal data reception, the swapping of the antenna mode may affect also the main data reception. Thus, if a bad mode is tried, the data reception may degrade. This may be considered. It may be acceptable in some situations (for example in a downlink power controlled system, where the base station may quickly compensate), but may not be acceptable in others (for example close to a call drop), like described in more detail above.

Besides selecting the best cell for the handover, the radio communication device may directly use the new cell with the best antenna mode, as this may have been determined before handover (or addition to the active set). It is to be noted, that, for HSDPA, a handover may also be the switch of the HSDPA serving cell, where the new cell may already be part of the DPCH active set. For example, for this, the antenna modes may not be scanned through the whole time, for example for the measurements, but a measurement of the antenna modes may just be started when the radio communication device adds the new cell. When the UE wants a new cell for downlink reception, it may desire to request it from the network. Between this request transmitted by the UE and the assignment of the new cell by the network, there may be enough time to scan some or all antenna modes. Thus, the antenna modes may not have to be continuously scanned, but just when the new cell is requested to be added, that is when the cell will be definitely used.

The radio communication device may test antenna modes during measurements in compressed mode gaps and may apply the best mode to the ongoing data reception.

In pre-determined situations, for example when the reception is such degraded that a reselection to another frequency or RAT (radio access technologies) is necessary, the UE may be requested to do measurements on other frequencies or RATs. This may not be done in parallel to the ongoing data reception, because the RF (for example the radio frequency circuits) may handle only one frequency. For this, compressed mode (CM) schemes or other techniques may be applied. Here reception gaps may be included by the network in the data reception, which this may allow the UE to measure other frequencies and/or RATs.

While the UE may not employ scanning of the antenna modes in the ongoing data reception (because it may not risk a degradation, like described above), the UE may scan through the antenna modes in the compressed mode measurements, because here there may be no risk for a degradation for the data reception. If the UE finds in the compressed mode measurements a better antenna mode than the one currently used by the data reception, it may apply this found antenna mode to the data reception. The performance of an antenna mode may be heavily influenced by the surrounding of the phone, for example where the hand or a desk is covering the phone. Thus, the best mode found in the compressed mode measurements may have a high likelihood of being the best mode for the data reception. Thus, the risk may be low to have a degraded performance by switching to the new antenna mode.

Figure 14:
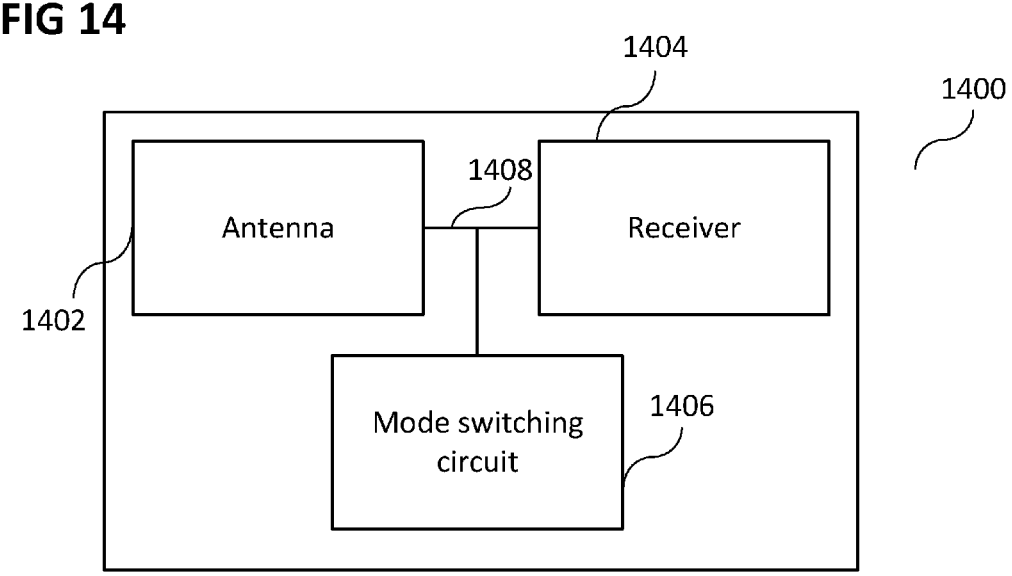
FIG. 14 shows a radio communication device which may switch an operation mode based on a received first channel signal or based on a received second channel signal.

FIG. 14 shows a radio communication device 1400. The radio communication device 1400 may include an antenna 1402 (or an antenna circuit 1402) configured to operate in a plurality of operation modes. The radio communication device 1400 may further include a receiver 1404 (or a receiver circuit 1404) configured to receive a first channel signal and a second channel signal using the antenna 1402. The radio communication device 1400 may further include a mode switching circuit 1406 configured to switch an operation mode of the antenna if the first channel signal fulfills a first channel specific criterion or configured to switch an operation mode of the antenna if the second channel signal fulfills a second channel specific criterion. The antenna 1402, the receiver 1404 and the mode switching circuit 1406 may be coupled with each other, for example via a connection 1408, for example an optical connection or an electrical connection, such as for example a cable or a computer bus or via any other suitable electrical connection to exchange electrical signals.

The antenna 1402 may include or may be an adaptive antenna array.

The antenna 1402 may include or may be a single antenna.

The plurality of operation modes of the antenna 1402 may include a plurality of operation modes of different reception patterns.

The first channel signal may be or may include a signal of a dedicated power controlled channel.

The dedicated power controlled channel may be used for voice calls.

The dedicated power controlled channel may include or may be a Dedicated Physical Channel (DPCH).

The second channel signal may include or may be a signal of a shared channel.

The shared channel may be used for data connections.

The shared channel may be a High-Speed Downlink Packet Access (HSDPA).

The mode switching circuit 1406 may further be configured to switch an operation mode of the antenna 1402 independent of the first channel signal if the second channel signal fulfills the second channel specific criterion.

The mode switching circuit 1406 may further be configured to switch an operation mode of the antenna 1402 from a presently used operation mode to another operation mode independent of the first channel signal if the second channel signal fulfills the second channel specific criterion, when a reception quality of the first channel signal is above a pre-determined threshold, and to switch an operation mode of the antenna 1402 from a presently used operation mode to another operation mode, when reception quality of the first channel signal is below a pre-determined threshold.

The first channel specific criterion may include or may be at least one criterion of the following criteria: a Channel Quality Indicator; a Received Signal Strength Indication; a Received Signal Code Power; a carrier-to-noise ratio; an out-of-sync criterion; number of Cyclic Redundancy Check errors; a power UP request of a transmission power control mechanism; an average of power UP requests of a transmission power control mechanism; a power DOWN request of a transmission power control mechanism; an average of power DOWN requests of a transmission power control mechanism; and a Dedicated Physical Channel signal-to-noise ratio.

The second channel specific criterion may include or may be at least one criterion of the following criteria: a Channel Quality Indicator; a Received Signal Strength Indication; a Received Signal Code Power; a carrier-to-noise ratio; an out-of-sync criterion; and number of Cyclic Redundancy Check errors.

Figure 15:
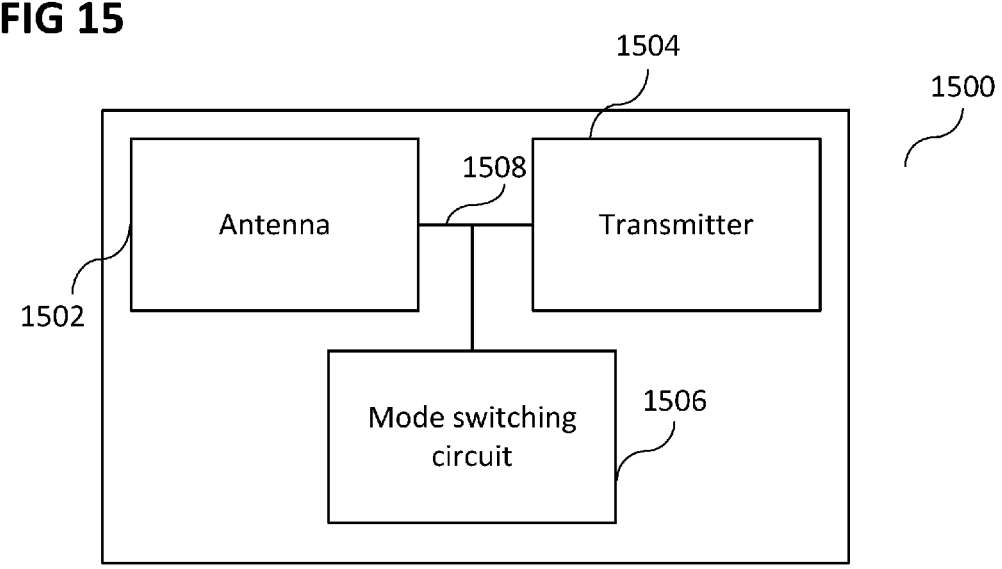
FIG. 15 shows a radio communication device which may switch an operation mode based on a sent first channel signal or based on a sent second channel signal.

FIG. 15 shows a radio communication device 1500. The radio communication device 1500 may include an antenna 1502 (or an antenna circuit 1502) configured to operate in a plurality of operation modes. The radio communication device 1500 may further include a transmitter 1504 (or a transmitter circuit 1504) configured to transmit a first channel signal and a second channel signal using the antenna 1502. The radio communication device 1500 may further include a mode switching circuit 1506 configured to switch an operation mode of the antenna 1502 if the first channel signal fulfills a first channel specific criterion or configured to switch an operation mode of the antenna 1502 if the second channel signal fulfills a second channel specific criterion. The antenna 1502, the transmitter 1504 and the mode switching circuit 1506 may be coupled with each other, for example via a connection 1508, for example an optical connection or an electrical connection, such as for example a cable or a computer bus or via any other suitable electrical connection to exchange electrical signals.

The antenna 1502 may include or may be an adaptive antenna array.

The antenna 1502 may include or may be a single antenna.

The plurality of operation modes of the antenna 1502 may include or may be a plurality of operation modes of different transmitting patterns.

The first channel signal may include or may be a signal of a dedicated power controlled channel.

The dedicated power controlled channel may be used for voice calls.

The dedicated power controlled channel may be a Dedicated Physical Channel (DPCH).

The second channel signal may be or may include a signal of a shared channel.

The shared channel may be used for data connections.

The shared channel may be a High-Speed Downlink Packet Access (HSDPA).

The mode switching circuit 1506 may further be configured to switch an operation mode of the antenna 1502 independent of the first channel signal if the second channel signal fulfills the second channel specific criterion.

The mode switching circuit 1506 may further be configured to switch an operation mode of the antenna 1502 from a presently used operation mode to another operation mode independent of the first channel signal if the second channel signal fulfills the second channel specific criterion, when a reception quality of the first channel signal is above a pre-determined threshold, and to switch an operation mode of the antenna 1502 from a presently used operation mode to another operation mode, when a reception quality of the first channel signal is below a pre-determined threshold.

The first channel specific criterion may include or may be at least one criterion of the following criteria: a Channel Quality Indicator; a Received Signal Strength Indication; a Received Signal Code Power; a carrier-to-noise ratio; an out-of-sync criterion; number of Cyclic Redundancy Check errors; a power UP request of a transmission power control mechanism; an average of power UP requests of a transmission power control mechanism; a power DOWN request of a transmission power control mechanism; an average of power DOWN requests of a transmission power control mechanism; and a Dedicated Physical Channel signal-to-noise ratio.

The second channel specific criterion may include or may be at least one criterion of the following criteria: a Channel Quality Indicator; a Received Signal Strength Indication; a Received Signal Code Power; a carrier-to-noise ratio; an out-of-sync criterion; and number of Cyclic Redundancy Check errors.

Figure 16:
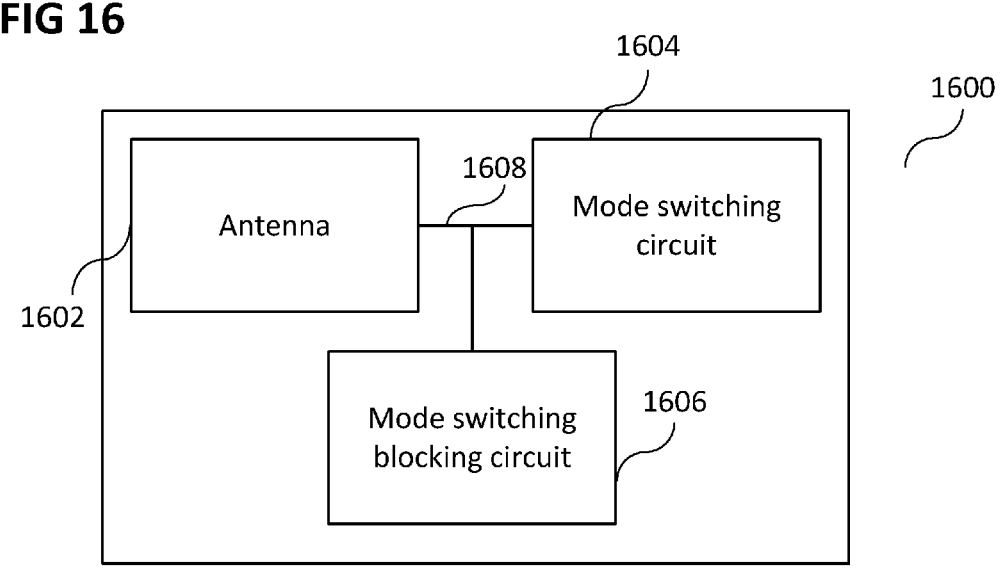
FIG. 16 shows a radio communication device which may prevent operation mode switching.

FIG. 16 shows a radio communication device 1600. The radio communication device 1600 may include an antenna 1602 (or antenna circuit 1602) configured to operate in a plurality of operation modes. The radio communication device 1600 may further include a mode switching circuit 1604 configured to switch an operation mode of the antenna 1602. The radio communication device 1600 may further include a mode switching blocking circuit 1606 configured to prevent switching of the operation mode of the antenna 1602. The antenna 1602, the mode switching circuit 1604, and the mode switching blocking circuit 1606 may be coupled with each other, for example via a connection 1608, for example an optical connection or an electrical connection, such as for example a cable or a computer bus or via any other suitable electrical connection to exchange electrical signals.

The antenna 1602 may include or may be an adaptive antenna array.

The antenna 1602 may include or may be a single antenna.

The plurality of operation modes of the antenna 1602 may include or may be a plurality of operation modes of different reception patterns.

Figure 17:
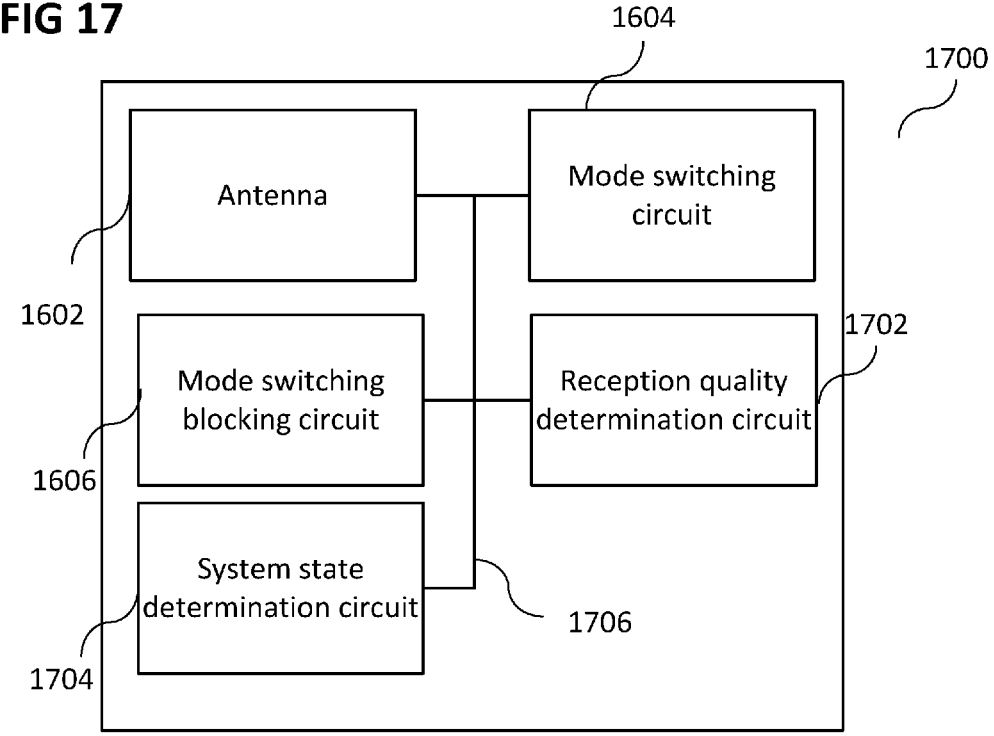
FIG. 17 shows a radio communication device which may prevent operation mode switching based on pre-determined criteria.

FIG. 17 shows a radio communication device 1700. The radio communication device 1700 may, similar to the radio communication device 1600 of FIG. 16, include an antenna 1602 configured to operate in a plurality of operation modes. The radio communication device 1700 may, similar to the radio communication device 1600 of FIG. 16, further include a mode switching circuit 404 configured to switch an operation mode of the antenna 1602. The radio communication device 1700 may, similar to the radio communication device 1600 of FIG. 16, further include a mode switching blocking circuit 1606 configured to prevent switching of the operation mode of the antenna 1602. The radio communication device 1700 may further include a reception quality determination circuit 1702, like will be described in more detail below. The radio communication device 1700 may further include a system state determination circuit 1704, like will be described in more detail below. The antenna 1602, the mode switching circuit 1604, the mode switching blocking circuit 1606, the reception quality determination circuit 1702, and the system state determination circuit 1704 may be coupled with each other, for example via a connection 1706, for example an optical connection or an electrical connection, such as for example a cable or a computer bus or via any other suitable electrical connection to exchange electrical signals.

The reception quality determination circuit 1702 may be configured to determine a quality of reception of data using the antenna 1602.

The mode switching blocking circuit 1606 may further be configured to prevent switching of the operation mode of the antenna 1602 based on the determined quality of reception.

The radio communication device 1700 may further include a transmission quality determination circuit (not shown) configured to determine a quality of transmission of data using the antenna 1602.

The mode switching blocking circuit 1606 may further be configured to prevent switching of the operation mode of the antenna 1602 based on the determined quality of transmission.

The system state determination circuit 1704 may be configured to determine a system state of the radio communication device 1700.

The mode switching blocking circuit 1606 may further be configured to prevent switching of the operation mode of the antenna 1602 based on the determined system state.

Figure 18:
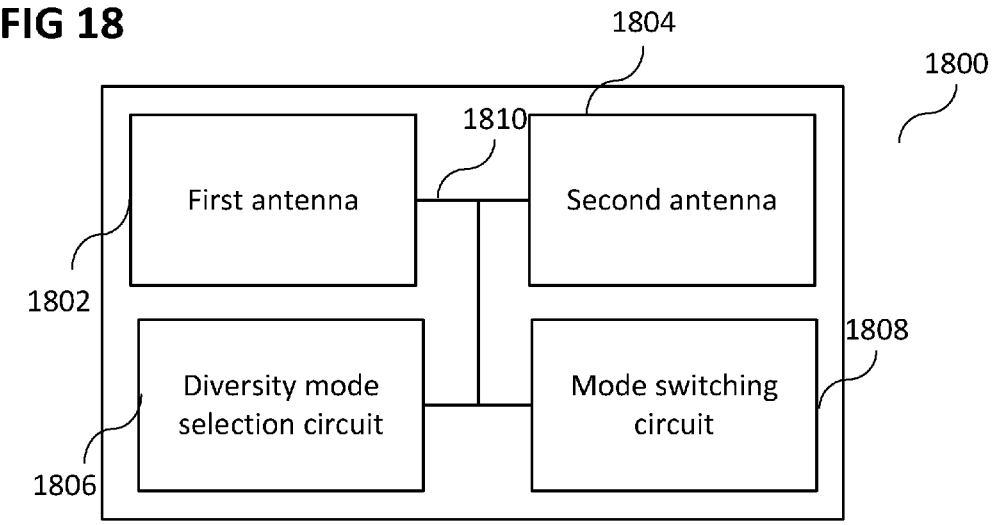
FIG. 18 shows a dual-antenna radio communication device.

FIG. 18 shows a radio communication device 1800. The radio communication device 1800 may include a first antenna 1802 (or first antenna circuit 1802) configured to operate in a plurality of operation modes. The radio communication device 1800 may further include a second antenna 1804 (or second antenna circuit 1804). The radio communication device 1800 may further include a diversity mode selection circuit 1806 configured to select a diversity mode as a diversity-off mode in which one (for example only one) of the first antenna 1802 and the second antenna 1804 is operating and to select a diversity mode as a diversity-on mode in which both the first antenna 1802 and the second antenna 1804 are operating. The radio communication device 1800 may further include a mode switching circuit 1808 configured to switch an operation mode of the first antenna 1802 based on the selected diversity mode. The first antenna 1802, the second antenna 1804, the diversity mode selection circuit 1806, and the mode switching circuit 1808 may be coupled with each other, for example via a connection 1810, for example an optical connection or an electrical connection, such as for example a cable or a computer bus or via any other suitable electrical connection to exchange electrical signals.

The first antenna 1802 may include or may be an adaptive antenna array.

The first antenna 1802 may include or may be a single antenna.

The plurality of operation modes of the first antenna 1802 may include or may be a plurality of operation modes of different reception patterns.

The diversity mode selection circuit 1806 may further be configured to prepare for selecting the diversity mode as the diversity-on mode when the mode switching circuit switches an operation mode of the first antenna 1802.

The diversity mode selection circuit 1806 may further be configured to select the diversity mode as the diversity-on mode when the mode switching circuit switches an operation mode of the first antenna 1802.

The second antenna 1804 may be configured to operate in a plurality of operation modes. The mode switching circuit 1808 may further be configured to switch an operation mode of the second antenna 1804.

The mode switching circuit 1808 may be configured to switch an operation mode of the second antenna 1804 based on the operation mode of the first antenna 1802.

Figure 19:
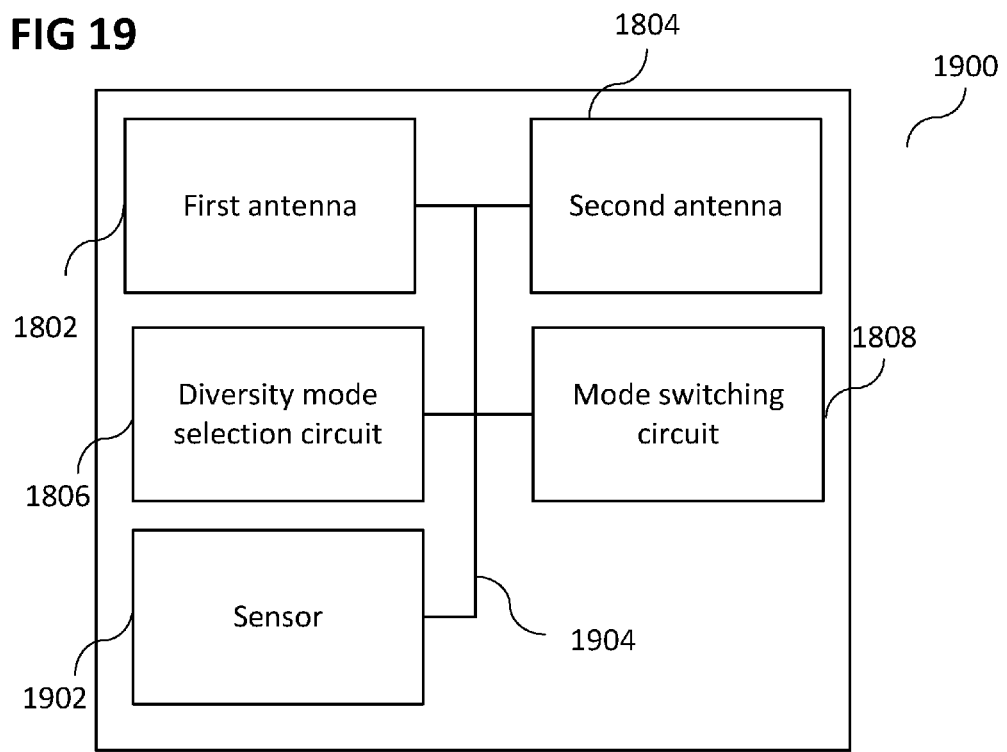
FIG. 19 shows a dual-antenna radio communication device with a sensor configured to determine a usage-scenario.

FIG. 19 shows a radio communication device 1900. The radio communication device 1900 may, similar to the radio communication device 1800 of FIG. 18, include a first antenna 1802 (or first antenna circuit 1802) configured to operate in a plurality of operation modes. The radio communication device 1900 may, similar to the radio communication device 1800 of FIG. 18, further include a second antenna 1804 (or second antenna circuit 1804). The radio communication device 1900 may, similar to the radio communication device 1800 of FIG. 18, further include a diversity mode selection circuit 1806 configured to select a diversity mode as a diversity-off mode in which one (for example only one) of the first antenna 1802 and the second antenna 1804 is operating and to select a diversity mode as a diversity-on mode in which both the first antenna 1802 and the second antenna 1804 are operating. The radio communication device 1900 may, similar to the radio communication device 1800 of FIG. 18, further include a mode switching circuit 1808 configured to switch an operation mode of the first antenna 1802 based on the selected diversity mode. The radio communication device 1900 may further include a sensor 1902 (or a sensor circuit 1902), like will be described in more detail below. The first antenna 1802, the second antenna 1804, the diversity mode selection circuit 1806, the mode switching circuit 1808, and the sensor 1902 may be coupled with each other, for example via a connection 1904, for example an optical connection or an electrical connection, such as for example a cable or a computer bus or via any other suitable electrical connection to exchange electrical signals.

The sensor 1902 may be configured to determine a usage scenario of the radio communication device 1900. The mode switching circuit 1808 may further be configured to switch an operation mode of the first antenna 1802 based on the determined usage scenario.

Figure 20:
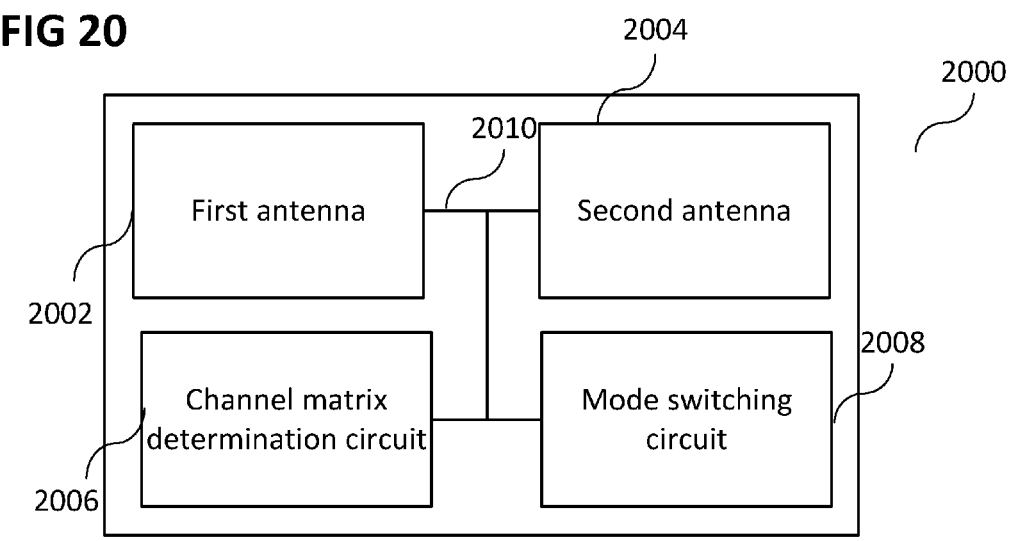
FIG. 20 shows a dual-receive antenna radio communication device with a channel matrix determination circuit.

FIG. 20 shows a radio communication device 2000. The radio communication device 2000 may include a first antenna 2002 (or first antenna circuit 2002) configured to operate in a plurality of operation modes and configured to receive signals from a plurality of send antennas. The radio communication device 2000 may further include a second antenna 2004 (or second antenna circuit 2004) configured to receive signals from the plurality of send antennas. The radio communication device 2000 may further include a channel matrix determination circuit 2006 configured to determine a channel matrix for the first antenna 2002 and the second antenna 2004 and the plurality of send antennas. The radio communication device 2000 may further include a mode switching circuit 2008 configured to switch an operation mode of the first antenna 2002 based on the determined channel matrix. The first antenna 2002, the second antenna 2004, the channel determination circuit 2006, and the mode switching circuit 2008 may be coupled with each other, for example via a connection 2010, for example an optical connection or an electrical connection, such as for example a cable or a computer bus or via any other suitable electrical connection to exchange electrical signals.

The first antenna 2002 may include or may be an adaptive antenna array.

The first antenna 2002 may include or may be a single antenna.

The plurality of operation modes of the first antenna 2002 may include or may be a plurality of operation modes of different reception patterns.

The mode switching circuit 2008 may further be configured to switch an operation mode of the first antenna 2002 to increase the rank of the channel matrix.

The mode switching circuit 2008 may further be configured to switch an operation mode of the first antenna 2002 to decrease the rank of the channel matrix.

The second antenna 2004 may further be configured to operate in a plurality of operation modes. The mode switching circuit 2008 may further be configured to switch an operation mode of the second antenna 2004 based on the determined channel matrix.

The mode switching circuit 2008 may further be configured to determine whether an operation mode of the first antenna 2002 or an operation mode of the second antenna 804 is to be switched based on the determined channel matrix.

The mode switching circuit 2008 may further be configured to determine whether an operation mode of the first antenna 2002 or an operation mode of the second antenna 2004 is to be switched based on the influence of the first antenna 2002 and the second antenna 2004 on the channel matrix.

Figure 21:
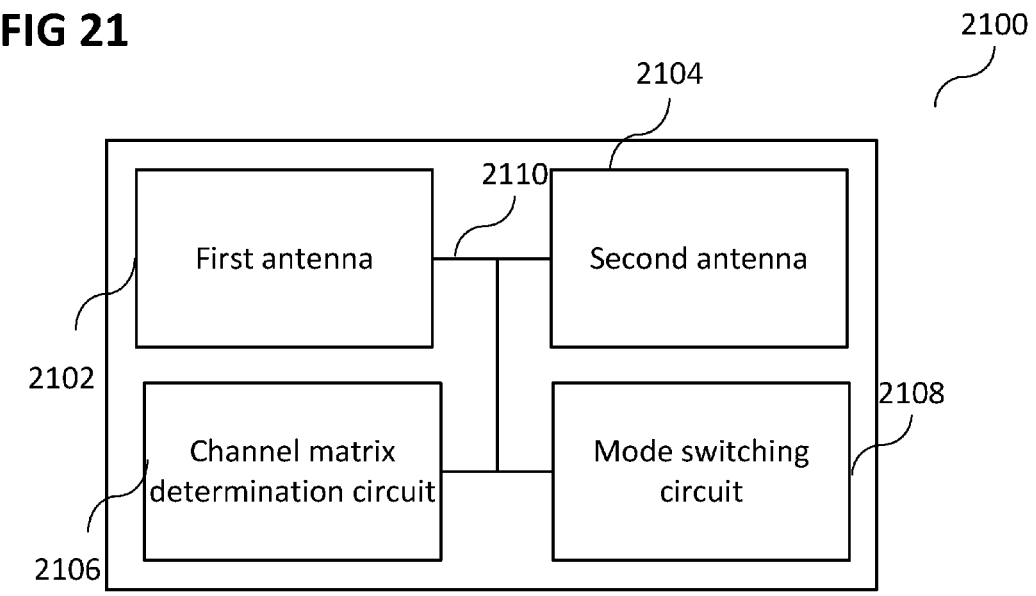
FIG. 21 shows a dual-transmit antenna radio communication device with a channel matrix determination circuit.

FIG. 21 shows a radio communication device 2100. The radio communication device 2100 may include a first antenna 2102 (or first antenna circuit 2102) configured to operate in a plurality of operation modes and configured to transmit signals to a plurality of send antennas. The radio communication device 2100 may further include a second antenna 2104 (or second antenna circuit 2104) configured to transmit signals to the plurality of send antennas. The radio communication device 2100 may further include a channel matrix determination circuit 2106 configured to determine a channel matrix for the first antenna 2102 and the second antenna 2104 and the plurality of send antennas. The radio communication device 2100 may further include a mode switching circuit 2108 configured to switch an operation mode of the first antenna based on the determined channel matrix. The first antenna 2102, the second antenna 2104, the channel determination circuit 2106, and the mode switching circuit 908 may be coupled with each other, for example via a connection 2110, for example an optical connection or an electrical connection, such as for example a cable or a computer bus or via any other suitable electrical connection to exchange electrical signals.

The first antenna 2102 may include or may be an adaptive antenna array.

The first antenna 2102 may include or may be a single antenna.

The plurality of operation modes of the first antenna 2102 may include or may be a plurality of operation modes of different transmission patterns.

The mode switching circuit 2108 may further be configured to switch an operation mode of the first antenna 2102 so that the rank of the channel matrix increases.

The mode switching circuit 2108 may further be configured to switch an operation mode of the first antenna 2102 so that the rank of the channel matrix decreases.

The second antenna 2104 may further be configured to operate in a plurality of operation modes. The mode switching circuit 2108 may further be configured to switch an operation mode of the second antenna 2104 based on the determined channel matrix.

The mode switching circuit 2108 may further be configured to determine whether an operation mode of the first antenna 2102 or an operation mode of the second antenna 2104 is to be switched based on the determined channel matrix.

The mode switching circuit 2108 may further be configured to determine whether an operation mode of the first antenna 2102 or an operation mode of the second antenna 2104 is to be switched based on the influence of the first antenna 2102 and the second antenna 2104 on the channel matrix.

Figure 22:
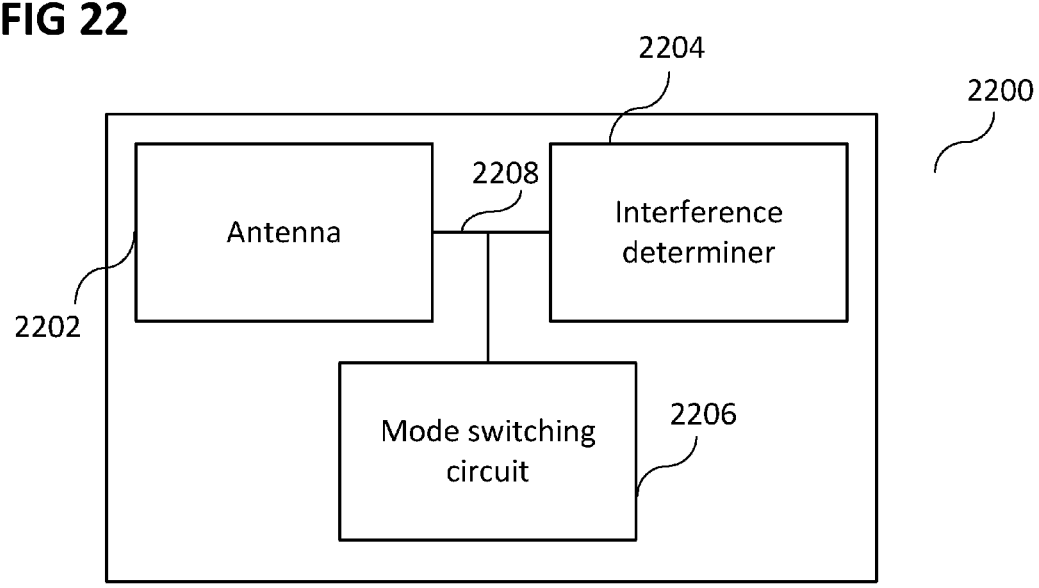
FIG. 22 shows a radio communication device with an interface determiner.

FIG. 22 shows a radio communication device 2200. The radio communication device 2200 may include an antenna 2202 (or antenna circuit 2202) configured to operate in a plurality of operation modes. The radio communication device 2200 may further include an interference determiner 2204 (or interference determination circuit 2204) configured to determine interference of data received or sent by the antenna 2202 with another radio communication device. The radio communication device 2200 may further include a mode switching circuit 2206 configured to switch an operation mode of the antenna 2202 based on the determined interference. The antenna 2202, the interference determiner 2204, and the mode switching circuit 2206 may be coupled with each other, for example via a connection 2208, for example an optical connection or an electrical connection, such as for example a cable or a computer bus or via any other suitable electrical connection to exchange electrical signals.

The antenna 2202 may include or may be an adaptive antenna array.

The antenna 2202 may include or may be a single antenna.

The plurality of operation modes of the antenna 2202 may include or may be a plurality of operation modes of different reception patterns or transmission patterns.

The mode switching circuit 2206 may further be configured to switch an operation mode of the antenna 2202 to decrease the interference.

Figure 23:
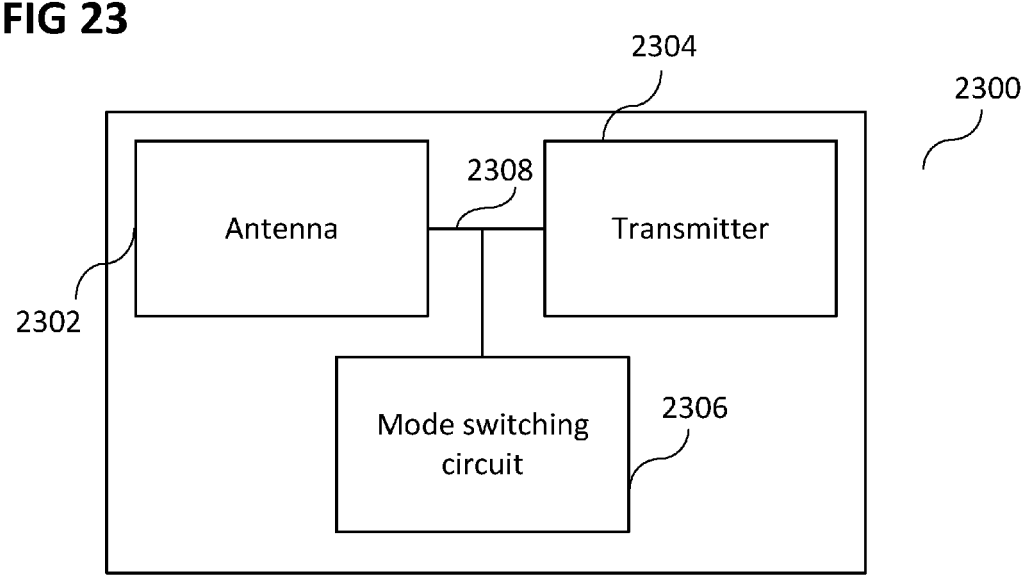
FIG. 23 shows a radio communication device wherein a mode switching circuit operates based on an output of a transmitter.

FIG. 23 shows a radio communication device 2300. The radio communication device 2300 may include an antenna 2302 (or an antenna circuit 2302) configured to operate in a plurality of operation modes. The radio communication device 2300 may further include a transmitter 2304 (or a transmitter circuit 2304) configured to transmit data using the antenna 2302. The radio communication device 2300 may further include a mode switching circuit 2306 configured to switch an operation mode of the antenna 2302 at least if the transmitter 2304 fulfills a predetermined transmitter criterion. The antenna 2302, the transmitter 2304, and the mode switching circuit 2306 may be coupled with each other, for example via a connection 2308, for example an optical connection or an electrical connection, such as for example a cable or a computer bus or via any other suitable electrical connection to exchange electrical signals.

The antenna 2302 may include or may be an adaptive antenna array.

The antenna 2302 may include or may be a single antenna.

The plurality of operation modes of the antenna 2302 may include or may be a plurality of operation modes of different reception patterns.

The predetermined transmitter criterion may include at least one criterion of the following criteria: transmission power consumption; throughput of the transmitter; grant of the transmitter; ACK/NACK (acknowledgement/negative acknowledgement) rate for a HARQ (Hybrid Automatic Repeat Request) process, and information provided by a mobile radio base station in communication with the radio communication device with respect to whether the transmitter is to increase or to decrease transmission energy.

Figure 24:
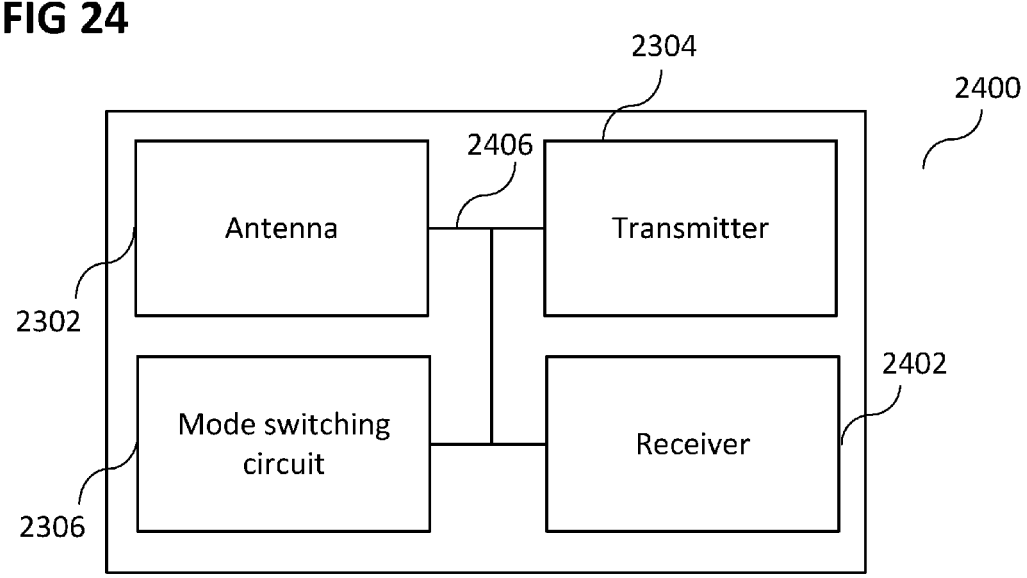
FIG. 24 shows a radio communication device wherein a mode switching circuit operates based on an output of a transmitter with a receiver.

FIG. 24 shows a radio communication device 2400. The radio communication device 2400 may, similar to the radio communication device 2300 of FIG. 23, include an antenna 2302 (or an antenna circuit 2302) configured to operate in a plurality of operation modes. The radio communication device 2400 may, similar to the radio communication device 2300 of FIG. 23, further include a transmitter 2304 (or a transmitter circuit 2304) configured to transmit data using the antenna 2302. The radio communication device 2400 may, similar to the radio communication device 2300 of FIG. 23, further include a mode switching circuit 2306 configured to switch an operation mode of the antenna 2302 at least if the transmitter 2304 fulfills a predetermined transmitter criterion. The radio communication device 2400 may further include a receiver 2402 (or a receiver circuit 2402), like described in more detail below. The antenna 2302, the transmitter 2304, the mode switching circuit 2306, and the receiver 2402 may be coupled with each other, for example via a connection 2404, for example an optical connection or an electrical connection, such as for example a cable or a computer bus or via any other suitable electrical connection to exchange electrical signals.

The receiver 2402 may be configured to receive data using the antenna 2302. The mode switching circuit 2306 may further be configured to switch an operation mode of the antenna 2302 if the receiver 2302 fulfills a predetermined receiver criterion.

Figure 25:
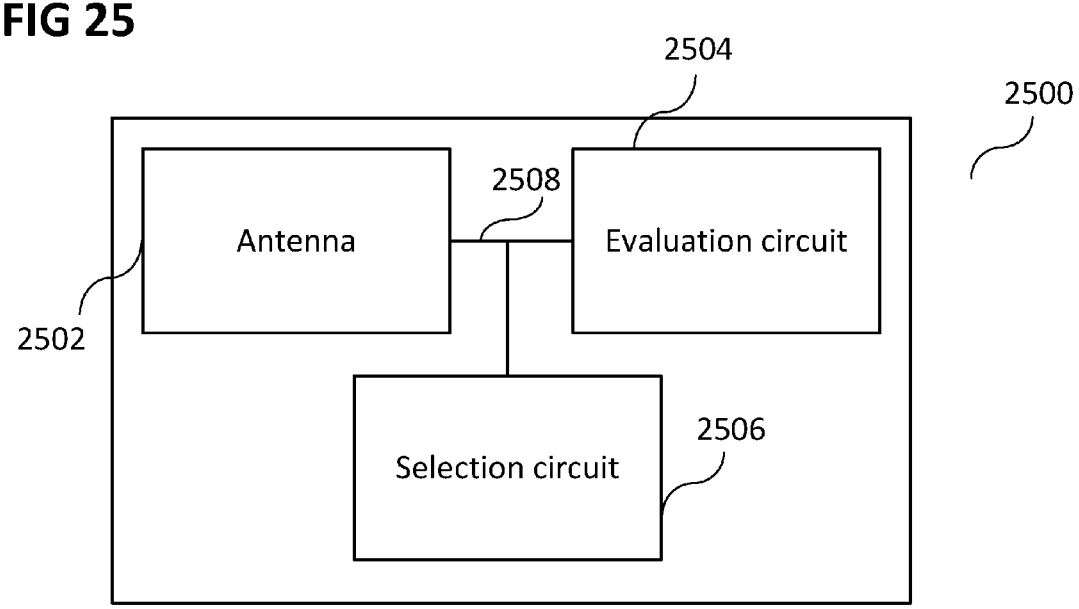
FIG. 25 shows a radio communication device with a circuit configured to evaluate a plurality of operation modes.

FIG. 25 shows a radio communication device 2500. The radio communication device 2500 may include an antenna 2502 (or an antenna circuit 2502) configured to operate in a plurality of operation modes. The radio communication device 2500 may further include an evaluation circuit 25304 configured to evaluate a plurality of operation modes of the antenna 2502 in a plurality of cells. The radio communication device 2500 may further include a selection circuit 2506 configured to select a cell and an operation mode of the antenna 2502 for operation of the radio communication device 2500. The antenna 2502, the evaluation circuit 2504, and the selection circuit 2506 may be coupled with each other, for example via a connection 25308, for example an optical connection or an electrical connection, such as for example a cable or a computer bus or via any other suitable electrical connection to exchange electrical signals.

The antenna 2502 may include or may be an adaptive antenna array.

The antenna 2502 may include or may be a single antenna.

The plurality of operation modes of the antenna 2502 may include or may be a plurality of operation modes of different reception patterns or transmission patterns.

The evaluation circuit 2504 may further be configured to first evaluate the plurality of operation modes of the antenna 2502 in a first cell and to thereafter evaluate the plurality of operation modes of the antenna 2502 in a second cell.

The evaluation circuit 2504 may further be configured to first evaluate a first operation mode of the antenna 2502 in the plurality of cells and to thereafter evaluate a second operation mode of the antenna 2502 in the plurality of cells.

The selection circuit 2504 may further be configured to preferably select a cell of a presently used network.

Figure 26:
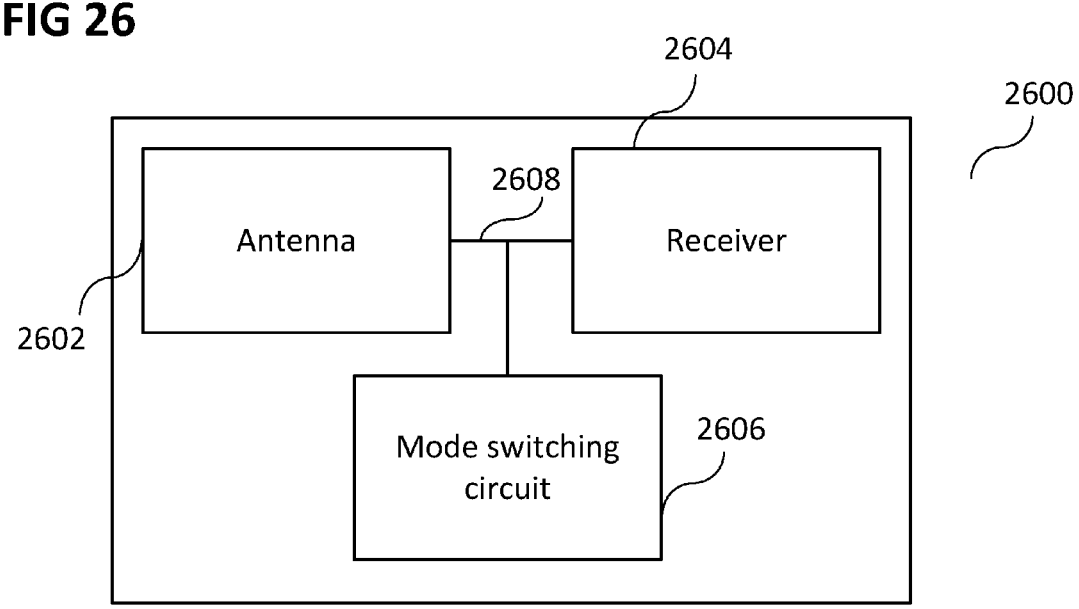
FIG. 26 shows a radio communication device with a paging indicator receiver.

FIG. 26 shows a radio communication device 2600. The radio communication device 2600 may include an antenna 2602 (or an antenna circuit 2602) configured to operate in a plurality of operation modes. The radio communication device 2600 may further include a receiver 2604 (or a receiver circuit 2604) configured to receive a paging indicator. The radio communication device 2600 may further include a mode switching circuit 2606 configured to switch an operation mode of the antenna based on the received paging indicator. The antenna 2602, the receiver 2604, and the mode switching circuit 2606 may be coupled with each other, for example via a connection 2608, for example an optical connection or an electrical connection, such as for example a cable or a computer bus or via any other suitable electrical connection to exchange electrical signals.

The antenna 2602 may include or may be an adaptive antenna array.

The antenna 2602 may include or may be a single antenna.

The plurality of operation modes of the antenna 2602 may include or may be a plurality of operation modes of different reception patterns.

Figure 27:
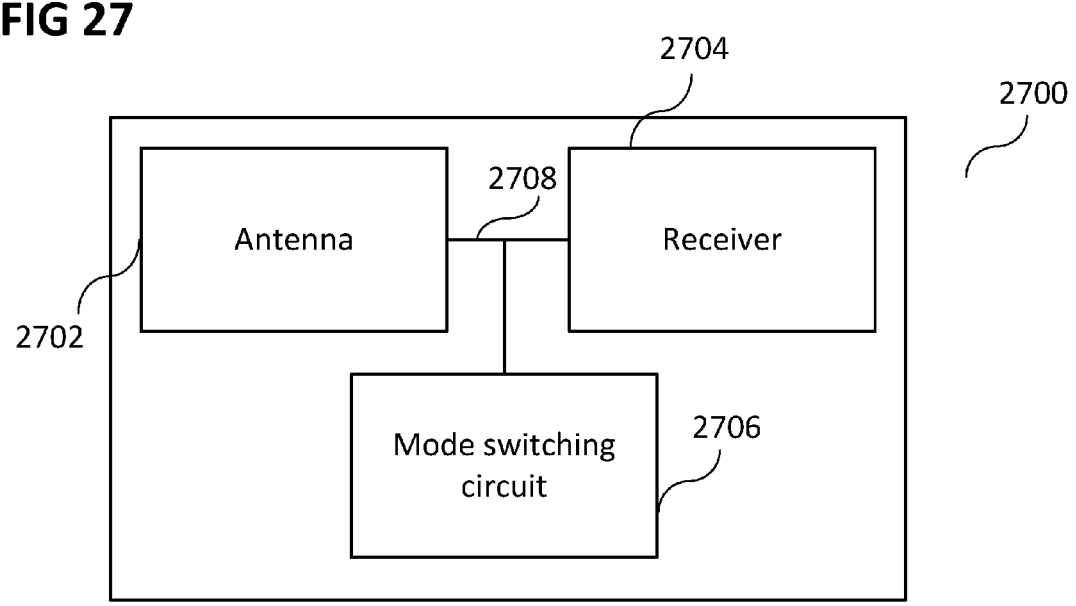
FIG. 27 shows a radio communication device configured to perform a switching of an operation mode in a reception gap.

FIG. 27 shows a radio communication device 2700. The radio communication device 2700 may include an antenna 2702 (or an antenna circuit 2702) configured to operate in a plurality of operation modes. The radio communication device 2700 may further include a receiver 2704 (or a receiver circuit 2704) configured to receive data using the antenna 2702. The radio communication device 2700 may further include a mode switching circuit 2706 configured to switch an operation mode of the antenna 2702 in a reception gap of the receiver 2704. The antenna 2702, the receiver 2704, and the mode switching circuit 2706 may be coupled with each other, for example via a connection 2708, for example an optical connection or an electrical connection, such as for example a cable or a computer bus or via any other suitable electrical connection to exchange electrical signals.

The antenna 2702 may include or may be an adaptive antenna array.

The antenna 2702 may include or may be a single antenna.

The plurality of operation modes of the antenna 2702 may include or may be a plurality of operation modes of different reception patterns.

Figure 28:
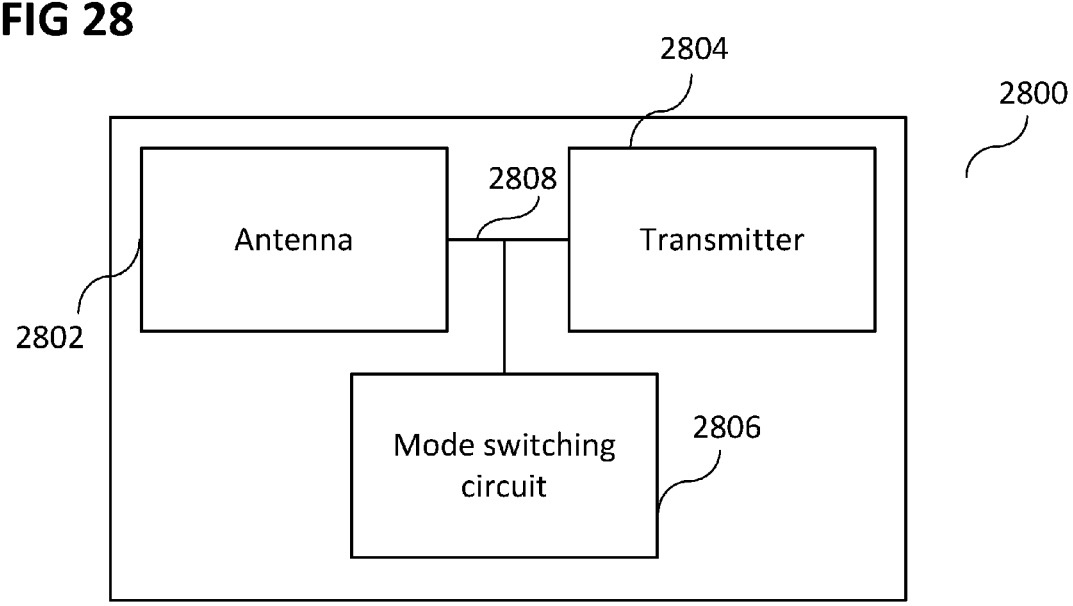
FIG. 28 shows a radio communication device configured to perform a switching of an operation mode in a transmission gap.

FIG. 28 shows a radio communication device 1600. The radio communication device 2800 may include an antenna 2802 configured to operate in a plurality of operation modes. The radio communication device 2800 may further include a transmitter 2804 configured to transmit data using the antenna 2802. The radio communication device 2800 may further include a mode switching circuit 2806 configured to switch an operation mode of the antenna 2802 in a transmission gap of the transmitter 2804. The antenna 2802, the transmitter 2804, and the mode switching circuit 2806 may be coupled with each other, for example via a connection 2808, for example an optical connection or an electrical connection, such as for example a cable or a computer bus or via any other suitable electrical connection to exchange electrical signals.

The antenna 2802 may include or may be an adaptive antenna array.

The antenna 2802 may include or may be a single antenna.

The plurality of operation modes of the antenna 2802 may include or may be a plurality of operation modes of different transmission patterns.

Figure 29:
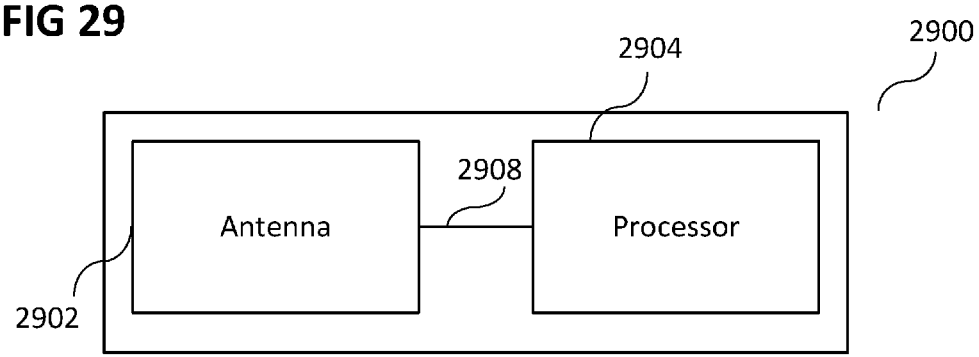
FIG. 29 shows a radio communication device with a processor.

FIG. 29 shows a radio communication device 2900. The radio communication device 2900 may include an antenna 2902 (or an antenna circuit 2902) configured to operate in a plurality of operation modes. The radio communication device 2900 may further include a processor 2904. The antenna 2902 and the processor 2904 may be coupled with each other, for example via a connection 2908, for example an optical connection or an electrical connection, such as for example a cable or a computer bus or via any other suitable electrical connection to exchange electrical signals.

The processor 2904 may further be configured to receive a first channel signal and a second channel signal using the antenna 2902. The processor 2904 may further be configured to switch an operation mode of the antenna 2902 if the first channel signal fulfills a first channel specific criterion or configured to switch an operation mode of the antenna 2902 if the second channel signal fulfills a second channel specific criterion.

The antenna 2902 may include or may be an adaptive antenna array.

The antenna 2902 may include or may be a single antenna.

The plurality of operation modes of the antenna 2902 may include a plurality of operation modes of different reception patterns.

The first channel signal may be or may include a signal of a dedicated power controlled channel.

The dedicated power controlled channel may be used for voice calls.

The dedicated power controlled channel may include or may be a Dedicated Physical Channel (DPCH).

The second channel signal may include or may be a signal of a shared channel.

The shared channel may be used for data connections.

The shared channel may be a High-Speed Downlink Packet Access (HSDPA).

The processor 2904 may further be configured to switch an operation mode of the antenna 2902 independent of the first channel signal if the second channel signal fulfills the second channel specific criterion.

The processor 2904 may further be configured to switch an operation mode of the antenna 2902 from a presently used operation mode to another operation mode independent of the first channel signal if the second channel signal fulfills the second channel specific criterion, when a reception quality of the first channel signal is above a pre-determined threshold, and to switch an operation mode of the antenna 1702 from a presently used operation mode to another operation mode, when reception quality of the first channel signal is below a pre-determined threshold.

The first channel specific criterion may include or may be at least one criterion of the following criteria: a Channel Quality Indicator; a Received Signal Strength Indication; a Received Signal Code Power; a carrier-to-noise ratio; an out-of-sync criterion; number of Cyclic Redundancy Check errors; a power UP request of a transmission power control mechanism; an average of power UP requests of a transmission power control mechanism; a power DOWN request of a transmission power control mechanism; an average of power DOWN requests of a transmission power control mechanism; and a Dedicated Physical Channel signal-to-noise ratio.

The second channel specific criterion may include or may be at least one criterion of the following criteria: a Channel Quality Indicator; a Received Signal Strength Indication; a Received Signal Code Power; a carrier-to-noise ratio; an out-of-sync criterion; and number of Cyclic Redundancy Check errors.

The processor 2904 may further be configured to transmit a first channel signal and a second channel signal using the antenna 2902. The processor 2904 may further be configured to switch an operation mode of the antenna 2902 if the first channel signal fulfills a first channel specific criterion or configured to switch an operation mode of the antenna 2902 if the second channel signal fulfills a second channel specific criterion.

The antenna 2902 may include or may be an adaptive antenna array.

The antenna 2902 may include or may be a single antenna.

The plurality of operation modes of the antenna 2902 may include or may be a plurality of operation modes of different transmitting patterns.

The first channel signal may include or may be a signal of a dedicated power controlled channel.

The dedicated power controlled channel may be used for voice calls.

The dedicated power controlled channel may be a Dedicated Physical Channel (DPCH).

The second channel signal may be or may include a signal of a shared channel.

The shared channel may be used for data connections.

The shared channel may be a High-Speed Downlink Packet Access (HSDPA).

The processor 2904 may further be configured to switch an operation mode of the antenna 2902 independent of the first channel signal if the second channel signal fulfills the second channel specific criterion.

The processor 2904 may further be configured to switch an operation mode of the antenna 2902 from a presently used operation mode to another operation mode independent of the first channel signal if the second channel signal fulfills the second channel specific criterion, when a reception quality of the first channel signal is above a pre-determined threshold, and to switch an operation mode of the antenna 2902 from a presently used operation mode to another operation mode, when a reception quality of the first channel signal is below a pre-determined threshold.

The first channel specific criterion may include or may be at least one criterion of the following criteria: a Channel Quality Indicator; a Received Signal Strength Indication; a Received Signal Code Power; a carrier-to-noise ratio; an out-of-sync criterion; number of Cyclic Redundancy Check errors; a power UP request of a transmission power control mechanism; an average of power UP requests of a transmission power control mechanism; a power DOWN request of a transmission power control mechanism; an average of power DOWN requests of a transmission power control mechanism; and a Dedicated Physical Channel signal-to-noise ratio.

The second channel specific criterion may include or may be at least one criterion of the following criteria: a Channel Quality Indicator; a Received Signal Strength Indication; a Received Signal Code Power; a carrier-to-noise ratio; an out-of-sync criterion; and number of Cyclic Redundancy Check errors.

The processor 2904 may further be configured to switch an operation mode of the antenna 2902. The processor 2904 may further be configured to prevent switching of the operation mode of the antenna 2902.

The antenna 2902 may include or may be an adaptive antenna array.

The antenna 2902 may include or may be a single antenna.

The plurality of operation modes of the antenna 2902 may include or may be a plurality of operation modes of different reception patterns.

The processor 2904 may further be configured to determine a quality of reception of data using the antenna 2902.

The processor 2904 may further be configured to prevent switching of the operation mode of the antenna 2902 based on the determined quality of reception.

The processor 2904 may further be configured to determine a quality of transmission of data using the antenna 2902.

The processor 2904 may further be configured to prevent switching of the operation mode of the antenna 2902 based on the determined quality of transmission.

The processor 2904 may further be configured to determine a system state of the radio communication device 2900.

The processor 2904 may further be configured to prevent switching of the operation mode of the antenna 2902 based on the determined system state.

The radio communication device 2900 may, besides the antenna 2902, which may also be referred to as a first antenna, include a second antenna (not shown).

The processor 2904 may further be configured to select a diversity mode as a diversity-off mode in which one (for example only one) of the first antenna 2902 and the second antenna is operating and to select the diversity mode as a diversity-on mode in which both the first antenna 2902 and the second antenna are operating. The processor 2904 may further be configured to switch an operation mode of the first antenna 2902 based on the selected diversity mode.

The first antenna 2902 may include or may be an adaptive antenna array.

The first antenna 2902 may include or may be a single antenna.

The plurality of operation modes of the first antenna 2902 may include or may be a plurality of operation modes of different reception patterns.

The processor 2904 may further be configured to prepare for selecting the diversity mode as the diversity-on mode when the processor 2904 switches an operation mode of the first antenna 2902.

The processor 2904 may further be configured to select the diversity mode as the diversity-on mode when the processor 2904 switches an operation mode of the first antenna 2902.

The second antenna may be configured to operate in a plurality of operation modes. The processor 2904 may further be configured to switch an operation mode of the second antenna.

The processor 2904 may further be configured to switch an operation mode of the second antenna based on the operation mode of the first antenna 2902.

The processor 2904 may further be configured to determine a usage scenario of the radio communication device 2900. The processor 2904 may further be configured to switch an operation mode of the first antenna 2902 based on the determined usage scenario.

The first antenna 2902 may be configured to operate in a plurality of operation modes and configured to receive signals from a plurality of send antennas. The radio communication device 2900 may further include a second antenna (not shown) configured to receive signals from the plurality of send antennas. The processor 2904 may further be configured to determine a channel matrix for the first antenna 2902 and the second antenna and the plurality of send antennas. The processor 2904 may further be configured to switch an operation mode of the first antenna 2902 based on the determined channel matrix.

The first antenna 2902 may include or may be an adaptive antenna array.

The first antenna 2902 may include or may be a single antenna.

The plurality of operation modes of the first antenna 2902 may include or may be a plurality of operation modes of different reception patterns.

The processor 2904 may further be configured to switch an operation mode of the first antenna 2902 to increase the rank of the channel matrix.

The processor 2904 may further be configured to switch an operation mode of the first antenna 2902 to decrease the rank of the channel matrix.

The second antenna may further be configured to operate in a plurality of operation modes. The processor 2904 may further be configured to switch an operation mode of the second antenna based on the determined channel matrix.

The processor 2904 may further be configured to determine whether an operation mode of the first antenna 2902 or an operation mode of the second antenna is to be switched based on the determined channel matrix.

The processor 2904 may further be configured to determine whether an operation mode of the first antenna 2902 or an operation mode of the second antenna is to be switched based on the influence of the first antenna 2902 and the second antenna on the channel matrix.

The first antenna 2902 may be configured to operate in a plurality of operation modes and configured to transmit signals to a plurality of send antennas. The radio communication device 2900 may further include a second antenna (not shown) configured to transmit signals to the plurality of send antennas. The processor 2904 may further be configured to determine a channel matrix for the first antenna 2902 and the second antenna and the plurality of send antennas. The processor 2904 may further be configured to switch an operation mode of the first antenna based on the determined channel matrix.

The first antenna 2902 may include or may be an adaptive antenna array.

The first antenna 2902 may include or may be a single antenna.

The plurality of operation modes of the first antenna 2902 may include or may be a plurality of operation modes of different transmission patterns.

The processor 2904 may further be configured to switch an operation mode of the first antenna 2902 so that the rank of the channel matrix increases.

The processor 2904 may further be configured to switch an operation mode of the first antenna 2902 so that the rank of the channel matrix decreases.

The second antenna may further be configured to operate in a plurality of operation modes. The processor 2904 may further be configured to switch an operation mode of the second antenna based on the determined channel matrix.

The processor 2904 may further be configured to determine whether an operation mode of the first antenna 2902 or an operation mode of the second antenna is to be switched based on the determined channel matrix.

The processor 2904 may further be configured to determine whether an operation mode of the first antenna 2902 or an operation mode of the second antenna is to be switched based on the influence of the first antenna 2902 and the second antenna on the channel matrix.

The processor 2904 may further be configured to determine interference of data received or sent by the antenna 2902 with another radio communication device. The processor 2904 may further be configured to switch an operation mode of the antenna 2902 based on the determined interference.

The antenna 2902 may include or may be an adaptive antenna array.

The antenna 2902 may include or may be a single antenna.

The plurality of operation modes of the antenna 2902 may include or may be a plurality of operation modes of different reception patterns or transmission patterns.

The processor 2904 may further be configured to switch an operation mode of the antenna 2902 to decrease the interference.

The processor 2904 may further be configured to transmit data using the antenna 2902. The processor 2904 may further be configured to switch an operation mode of the antenna 2902 at least if the processor 2904 fulfills a predetermined transmitter criterion.

The antenna 2902 may include or may be an adaptive antenna array.

The antenna 2902 may include or may be a single antenna.

The plurality of operation modes of the antenna 2902 may include or may be a plurality of operation modes of different reception patterns.

The predetermined transmitter criterion may include at least one criterion of the following criteria: transmission power consumption; throughput of the transmitter; grant of the transmitter; ACK/NACK rate for a HARQ process, and information provided by a mobile radio base station in communication with the radio communication device with respect to whether the transmitter is to increase or to decrease transmission energy.

The processor 2904 may further be configured to receive data using the antenna 2902. The processor 2904 may further be configured to switch an operation mode of the antenna 2902 if the processor 2904 fulfills a predetermined receiver criterion.

The processor 2904 may further be configured to evaluate a plurality of operation modes of the antenna 2902 in a plurality of cells. The processor 2904 may further be configured to select a cell and an operation mode of the antenna 2902 for operation of the radio communication device 2900.

The antenna 2902 may include or may be an adaptive antenna array.

The antenna 2902 may include or may be a single antenna.

The plurality of operation modes of the antenna 2902 may include or may be a plurality of operation modes of different reception patterns or transmission patterns.

The processor 2904 may further be configured to first evaluate the plurality of operation modes of the antenna 2902 in a first cell and to thereafter evaluate the plurality of operation modes of the antenna 2902 in a second cell.

The processor 2904 may further be configured to first evaluate a first operation mode of the antenna 2902 in the plurality of cells and to thereafter evaluate a second operation mode of the antenna 2902 in the plurality of cells.

The processor 2904 may further be configured to preferably select a cell of a presently used network.

The processor 2904 may further be configured to receive a paging indicator. The processor 2904 may further be configured to switch an operation mode of the antenna based on the received paging indicator.

The antenna 2902 may include or may be an adaptive antenna array.

The antenna 2902 may include or may be a single antenna.

The plurality of operation modes of the antenna 2902 may include or may be a plurality of operation modes of different reception patterns.

The processor 2904 may further be configured to receive data using the antenna 2902. The processor 2904 may further be configured to switch an operation mode of the antenna 2902 in a reception gap of the processor 2904.

The antenna 2902 may include or may be an adaptive antenna array.

The antenna 2902 may include or may be a single antenna.

The plurality of operation modes of the antenna 2902 may include or may be a plurality of operation modes of different reception patterns.

The processor 2904 may further be configured to transmit data using the antenna 2902. The processor 2904 may further be configured to switch an operation mode of the antenna 2902 in a transmission gap of the processor 2904.

The antenna 2902 may include or may be an adaptive antenna array.

The antenna 2902 may include or may be a single antenna.

The plurality of operation modes of the antenna 2902 may include or may be a plurality of operation modes of different transmission patterns.

Figure 30:
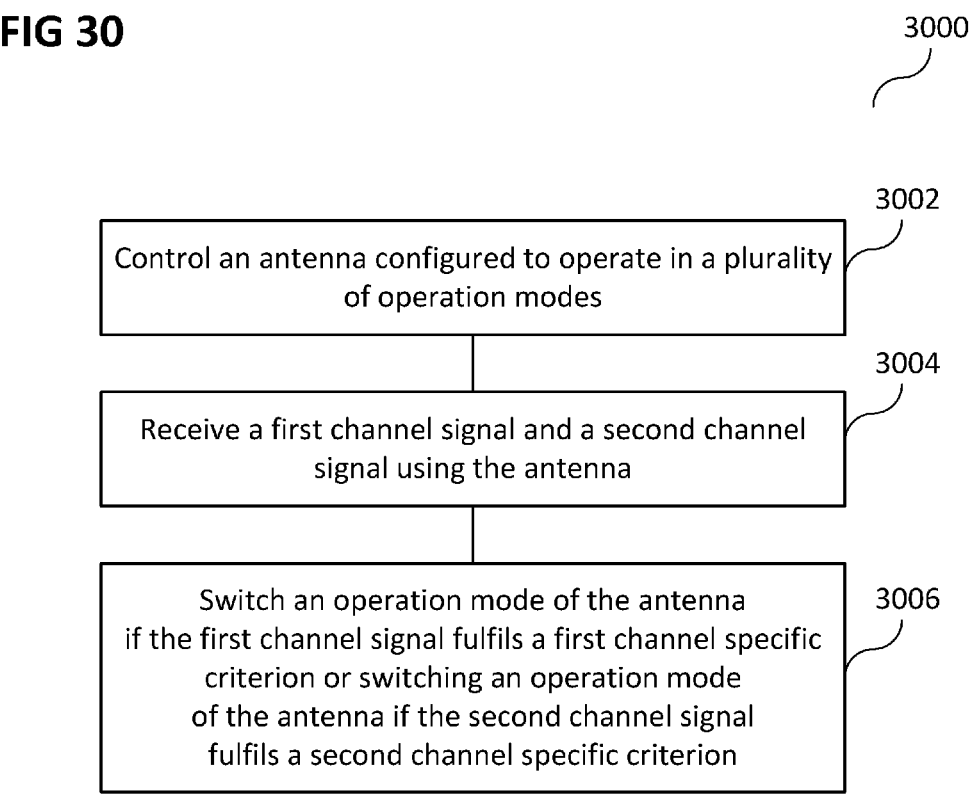
FIG. 30 shows a flow diagram illustrating a method for a radio communication device which may switch an operation mode based on a received first channel signal or based on a received second channel signal.

FIG. 30 shows a flow diagram 3000 illustrating a method for a radio communication device. In 3002, the radio communication device may control an antenna configured to operate in a plurality of operation modes. In 3004, a receiver may receive a first channel signal and a second channel signal using the antenna. In 3006, a mode switching circuit may switch an operation mode of the antenna if the first channel signal fulfills a first channel specific criterion or the mode switching circuit may switch an operation mode of the antenna if the second channel signal fulfills a second channel specific criterion.

The antenna may include or may be an adaptive antenna array.

The antenna may include or may be a single antenna.

The plurality of operation modes of the antenna may include or may be a plurality of operation modes of different reception patterns.

The first channel signal may include or may be a signal of a dedicated power controlled channel.

The dedicated power controlled channel may be used for voice calls.

The dedicated power controlled channel may be a Dedicated Physical Channel.

The second channel signal may include or may be a signal of a shared channel.

The shared channel may be used for data connections.

The shared channel may include or may be a High-Speed Downlink Packet Access.

The mode switching circuit may switch an operation mode of the antenna independent of the first channel signal if the second channel signal fulfills the second channel specific criterion.

The mode switching circuit may switch an operation mode of the antenna from a presently used operation mode to another operation mode independent of the first channel signal if the second channel signal fulfills the second channel specific criterion, when a reception quality of the first channel signal is above a pre-determined threshold, and an operation mode of the antenna may be switched from a presently used operation mode to another operation mode, when a reception quality of the first channel signal is below a pre-determined threshold.

The first channel specific criterion may include or may be at least one criterion of the following criteria: a Channel Quality Indicator; a Received Signal Strength Indication; a Received Signal Code Power; a carrier-to-noise ratio; an out-of-sync criterion; number of Cyclic Redundancy Check errors; a power UP request of a transmission power control mechanism; an average of power UP requests of a transmission power control mechanism; a power DOWN request of a transmission power control mechanism; an average of power DOWN requests of a transmission power control mechanism; and a Dedicated Physical Channel signal-to-noise ratio.

The second channel specific criterion may include or may be at least one criterion of the following criteria: a Channel Quality Indicator; a Received Signal Strength Indication; a Received Signal Code Power; a carrier-to-noise ratio; an out-of-sync criterion; and number of Cyclic Redundancy Check errors.

Figure 31:
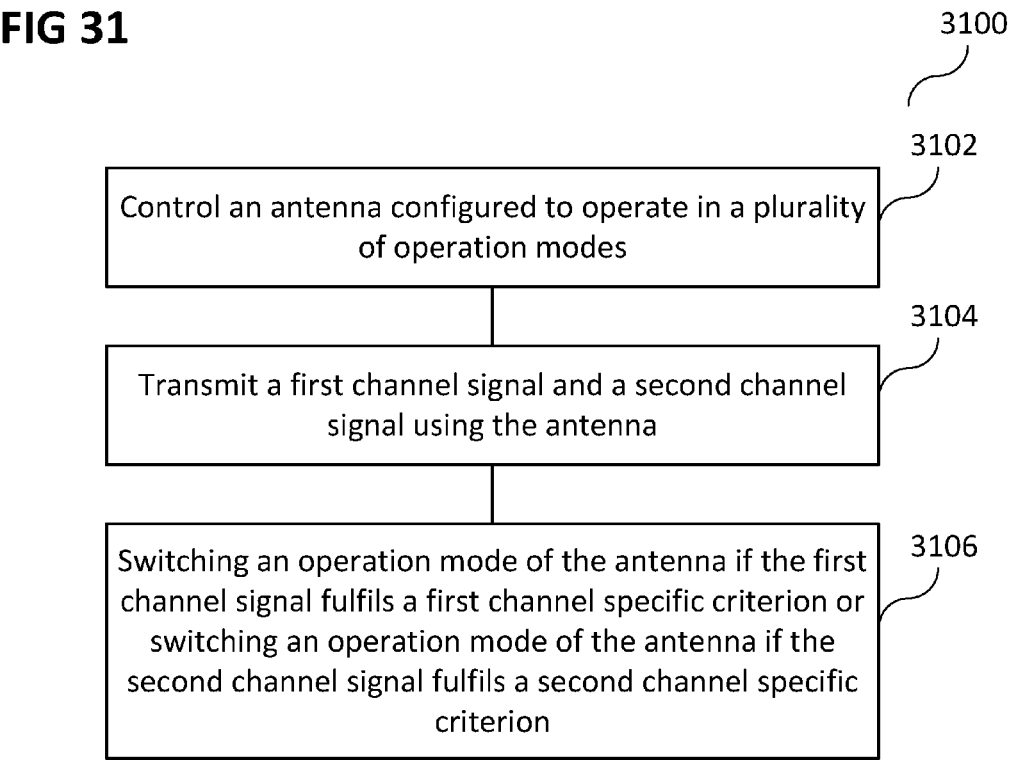
FIG. 31 shows a flow diagram illustrating a method for a radio communication device which may switch an operation mode based on a sent first channel signal or based on a sent second channel signal.

FIG. 31 shows a flow diagram 3100 illustrating a method for a radio communication device. In 3102, the radio communication device may control an antenna configured to operate in a plurality of operation modes. In 3104, a transmitter may transmit a first channel signal and a second channel signal using the antenna. In 3106, a mode switching circuit may switch an operation mode of the antenna if the first channel signal fulfills a first channel specific criterion or the mode switching circuit may switch an operation mode of the antenna may be switched if the second channel signal fulfills a second channel specific criterion.

The antenna may include or may be an adaptive antenna array.

The antenna may include or may be a single antenna.

The plurality of operation modes of the antenna may include or may be a plurality of operation modes of different transmitting patterns.

The first channel signal may include or may be a signal of a dedicated power controlled channel.

The dedicated power controlled channel may be used for voice calls.

The dedicated power controlled channel may include or may be a Dedicated Physical Channel.

The second channel signal may include or may be a signal of a shared channel.

The shared channel may be used for data connections.

The shared channel may include or may be a High-Speed Downlink Packet Access.

The mode switching circuit may switch an operation mode of the antenna independent of the first channel signal if the second channel signal fulfills the second channel specific criterion.

The mode switching circuit may switch an operation mode of the antenna from a presently used operation mode to another operation mode independent of the first channel signal if the second channel signal fulfills the second channel specific criterion, when a reception quality of the first channel signal is above a pre-determined threshold, and the mode switching circuit may switch an operation mode of the antenna from a presently used operation mode to another operation mode, when a reception quality of the first channel signal is below a pre-determined threshold.

The first channel specific criterion may include or may be at least one criterion of the following criteria: a Channel Quality Indicator; a Received Signal Strength Indication; a Received Signal Code Power; a carrier-to-noise ratio; an out-of-sync criterion; number of Cyclic Redundancy Check errors; a power UP request of a transmission power control mechanism; an average of power UP requests of a transmission power control mechanism; a power DOWN request of a transmission power control mechanism; an average of power DOWN requests of a transmission power control mechanism; and a Dedicated Physical Channel signal-to-noise ratio.

The second channel specific criterion may include or may be at least one criterion of the following criteria: a Channel Quality Indicator; a Received Signal Strength Indication; a Received Signal Code Power; a carrier-to-noise ratio; an out-of-sync criterion; and number of Cyclic Redundancy Check errors.

Figure 32:
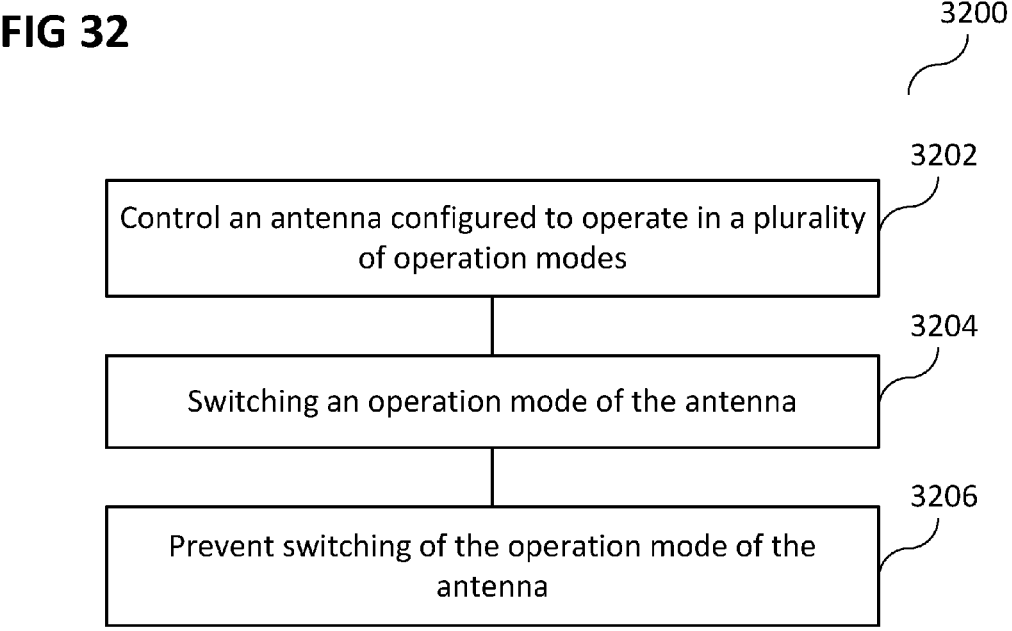
FIG. 32 shows a flow diagram illustrating a method for a radio communication device which may prevent operation mode switching.

FIG. 32 shows a flow diagram 3200 illustrating a method for a radio communication device. In 3202, the radio communication device may control an antenna configured to operate in a plurality of operation modes. In 3204, a mode switching circuit may switch an operation mode of the antenna. In 3206, a mode switching blocking circuit may prevent switching of the operation mode of the antenna.

The antenna may include or may be an adaptive antenna array.

The antenna may include or may be a single antenna.

The plurality of operation modes of the antenna may include or may be a plurality of operation modes of different reception patterns.

Furthermore, a quality determination circuit may determine a quality of reception of data using the antenna.

The mode switching blocking circuit may prevent switching of the operation mode of the antenna based on the determined quality of reception.

Furthermore, the quality determination circuit may determine a quality of transmission of data using the antenna.

The mode switching blocking circuit may prevent switching of the operation mode of the antenna based on the determined quality of transmission.

A system state determination circuit may determine a system state of the radio communication device.

The mode switching blocking circuit may prevent switching of the operation mode of the antenna based on the determined system state.

FIG. 33 shows a flow diagram 3300 illustrating a method for a radio communication device. In 3302, a radio communication device may control a first antenna configured to operate in a plurality of operation modes. In 3304, the radio communication device may control a second antenna. In 3306, a diversity mode selection circuit may select a diversity mode as a diversity-off mode in which one (for example only one) of the first antenna and the second antenna is operating and the diversity mode selection circuit may select the diversity mode as a diversity-on mode in which both the first antenna and the second antenna are operating. In 2108, a mode switching circuit may switch an operation mode of the first antenna based on the selected diversity mode.

The antenna may include or may be an adaptive antenna array.

The antenna may include or may be a single antenna.

The plurality of operation modes of the first antenna may include or may be a plurality of operation modes of different reception patterns.

The radio communication device may prepare for selecting the diversity mode as the diversity-on mode when the mode switching circuit switches an operation mode of the first antenna.

The diversity mode selection circuit may select the diversity mode as the diversity-on mode when the mode switching circuit switches an operation mode of the first antenna.

The second antenna may be configured to operate in a plurality of operation modes, and an operation mode of the second antenna may be switched.

The mode switching circuit may switch an operation mode of the second antenna based on the operation mode of the first antenna.

A determination circuit may determine a usage scenario of the radio communication device. The mode switching circuit may switch an operation mode of the first antenna based on the determined usage scenario.

FIG. 34 shows a flow diagram 3400 illustrating a method for a radio communication device. In 3402, the radio communication device may control a first antenna configured to operate in a plurality of operation modes and configured to receive signals from a plurality of send antennas. In 3404, the radio communication device may control a second antenna configured to receive signals from the plurality of send antennas. In 3406, a channel matrix determination circuit may determine a channel matrix for the first antenna and the second antenna and the plurality of send antennas. In 3408, a mode switching circuit may switch an operation mode of the first antenna based on the determined channel matrix.

The first antenna may include or may be an adaptive antenna array.

The first antenna may include or may be a single antenna.

The plurality of operation modes of the first antenna may include or may be a plurality of operation modes of different reception patterns.

The mode switching circuit may switch an operation mode of the first antenna to increase the rank of the channel matrix.

The mode switching circuit may switch an operation mode of the first antenna to decrease the rank of the channel matrix.

The second antenna may further be configured to operate in a plurality of operation modes. An operation mode of the second antenna may be switched based on the determined channel matrix.

A determination circuit may determine whether an operation mode of the first antenna or an operation mode of the second antenna is to be switched based on the determined channel matrix.

The determination circuit may determine whether an operation mode of the first antenna or an operation mode of the second antenna is to be switched based on the influence of the first antenna and the second antenna on the channel matrix.

Figure 35:
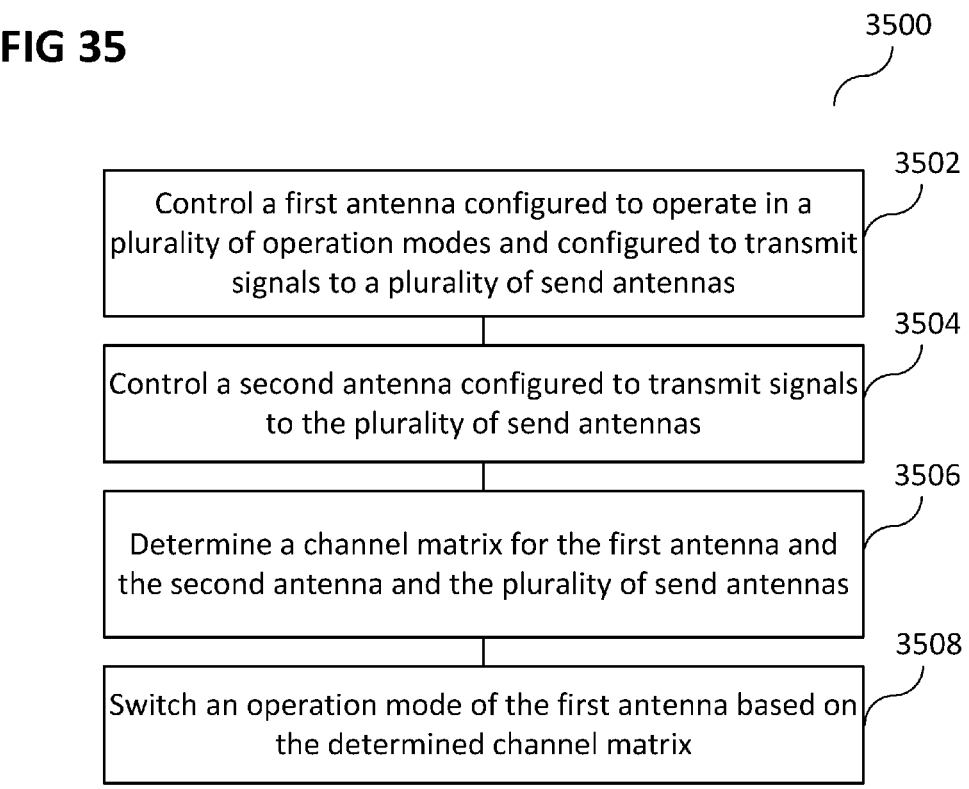
FIG. 35 shows a flow diagram illustrating a method for a dual-transmit antenna radio communication device with a channel matrix determination circuit.

FIG. 35 shows a flow diagram 3500 illustrating a method for a radio communication device. In 3502, the radio communication device may control a first antenna configured to operate in a plurality of operation modes and configured to transmit signals to a plurality of send antennas. In 3504, the radio communication device may control a second antenna configured to transmit signals to the plurality of send antennas. In 3506, a channel matrix determination circuit may determine a channel matrix for the first antenna and the second antenna and the plurality of send antennas. In 3508, a mode switching circuit may switch an operation mode of the first antenna based on the determined channel matrix.

The first antenna may include or may be an adaptive antenna array.

The first antenna may include or may be a single antenna.

The plurality of operation modes of the first antenna may include or may be a plurality of operation modes of different transmission patterns.

The mode switching circuit may switch an operation mode of the first antenna so that the rank of the channel matrix increases.

The mode switching circuit may switch an operation mode of the first antenna so that the rank of the channel matrix decreases.

The second antenna may further be configured to operate in a plurality of operation modes. The mode switching circuit may switch an operation mode of the second antenna based on the determined channel matrix.

A determination circuit may determine whether an operation mode of the first antenna or an operation mode of the second antenna is to be switched based on the determined channel matrix.

The determination circuit may determine whether an operation mode of the first antenna or an operation mode of the second antenna is to be switched based on the influence of the first antenna and the second antenna on the channel matrix.

Figure 36:
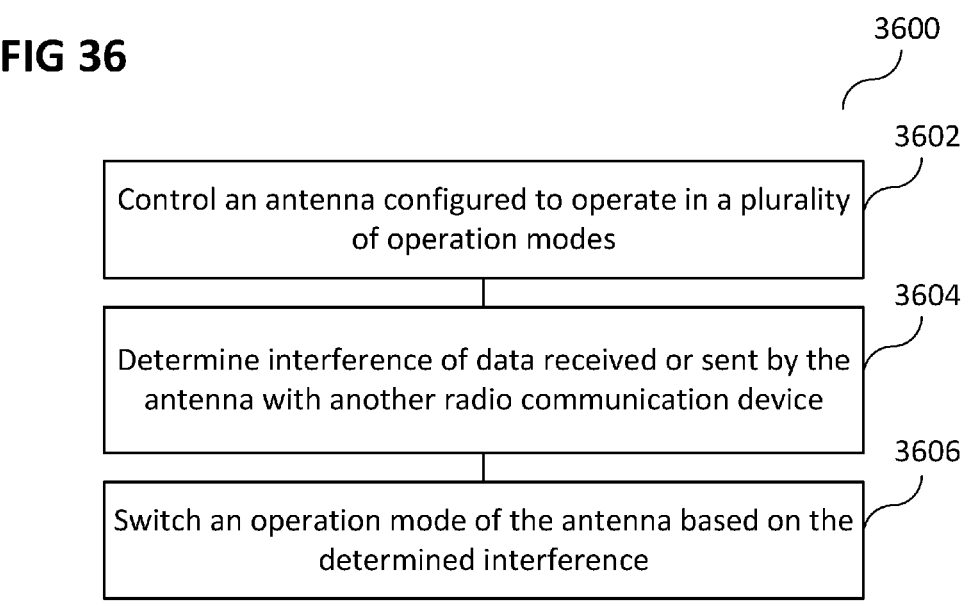
FIG. 36 shows a flow diagram illustrating a method for a radio communication device with an interface determiner.

FIG. 36 shows a flow diagram 3600 illustrating a method for a radio communication device. In 3602, the radio communication device may control an antenna configured to operate in a plurality of operation modes. In 3604, an interference determiner may determine interference of data received or sent by the antenna with another radio communication device. In 3606, a mode switching circuit may switch an operation mode of the antenna based on the determined interference.

The antenna may include or may be an adaptive antenna array.

The antenna may include or may be a single antenna.

The plurality of operation modes of the antenna may include or may be a plurality of operation modes of different reception patterns or transmission patterns.

The mode switching circuit may switch an operation mode of the antenna switched so that the interference is decreased.

Figure 37:
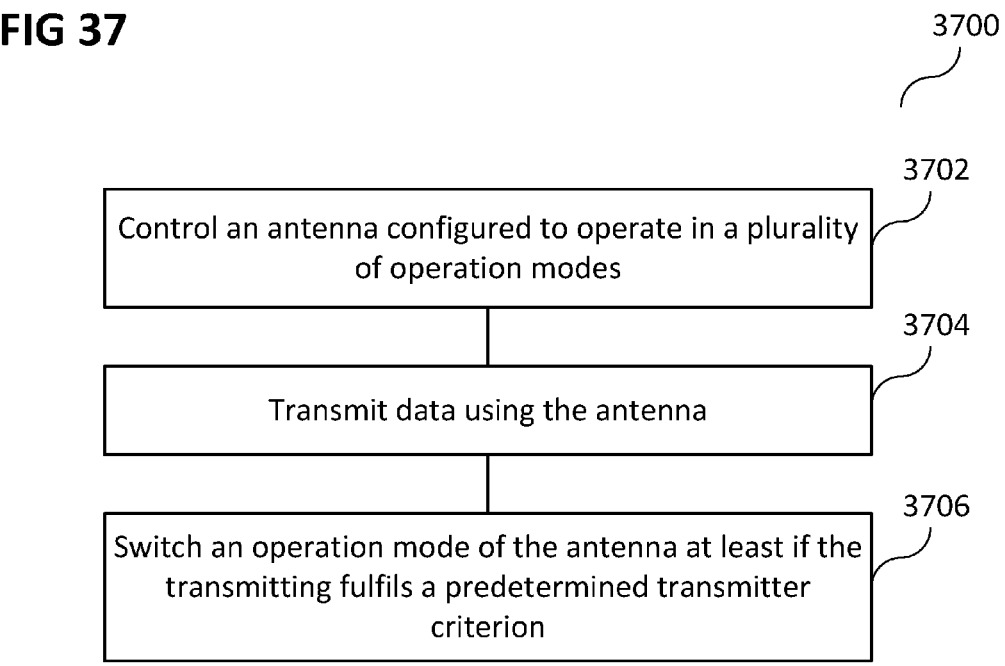
FIG. 37 shows a flow diagram illustrating a method for a radio communication device wherein a mode switching circuit operates based on an output of a transmitter.

FIG. 37 shows a flow diagram 3700 illustrating a method for a radio communication device. In 3702, the radio communication device may control an antenna configured to operate in a plurality of operation modes. In 37504, a transmitter may transmit data using the antenna. In 3706, a mode switching circuit may switch an operation mode of the antenna at least if the transmitting fulfills a predetermined transmitter criterion.

The antenna may include or may be an adaptive antenna array.

The antenna may include or may be a single antenna.

The plurality of operation modes of the antenna may include or may be a plurality of operation modes of different reception patterns.

The predetermined transmitter criterion may include or may be at least one criterion of the following criteria: transmission power consumption; throughput of the transmitter; grant of the transmitter; ACK/NACK rate for a HARQ process, and information provided by a mobile radio base station in communication with the radio communication device with respect to whether the transmitter is to increase or to decrease transmission energy.

A receiver may receive data using the antenna. The mode switching circuit may switch an operation mode of the antenna at least if the receiving fulfills a predetermined receiver criterion.

Figure 38:
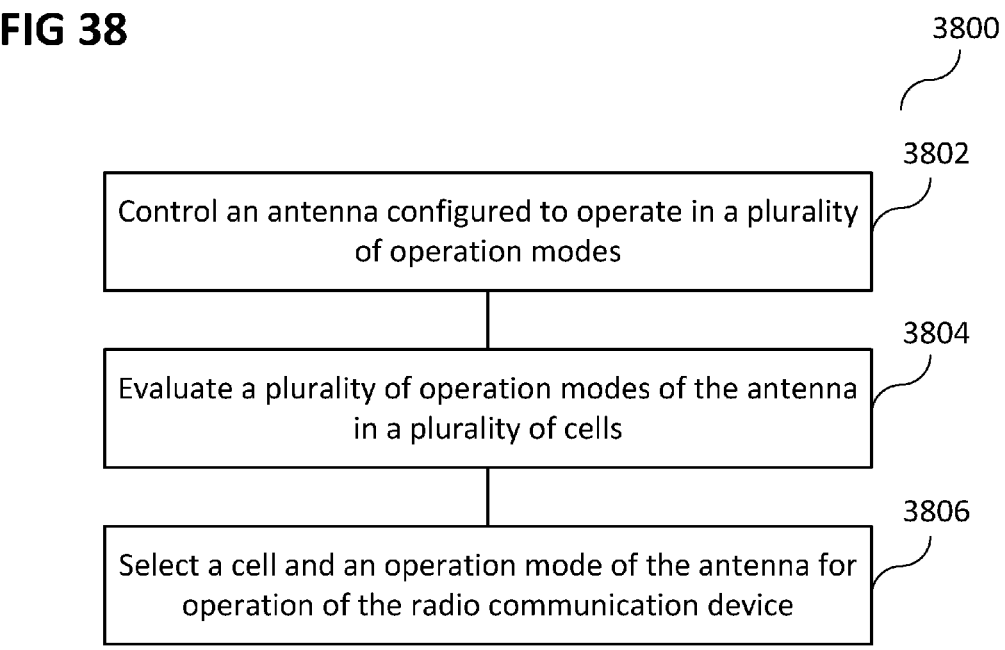
FIG. 38 shows a flow diagram illustrating a method for a radio communication device with a circuit configured to evaluate a plurality of operation modes.

FIG. 38 shows a flow diagram 3800 illustrating a method for a radio communication device. In 3802, the radio communication device may control an antenna configured to operate in a plurality of operation modes. In 3804, an evaluation circuit may evaluate a plurality of operation modes of the antenna in a plurality of cells. In 3806, a cell selection circuit may select a cell and an operation mode of the antenna for operation of the radio communication device.

The antenna may include or may be an adaptive antenna array.

The antenna may include or may be a single antenna.

The plurality of operation modes of the antenna may include or may be a plurality of operation modes of different reception patterns or transmission patterns.

The evaluation circuit may evaluate the plurality of operation modes of the antenna first in a first cell and thereafter may evaluate the plurality of operation modes of the antenna in a second cell.

The evaluation circuit may evaluate a first operation mode of the antenna first in the plurality of cells and thereafter may evaluate a second operation mode of the antenna in the plurality of cells.

The evaluation circuit may preferably select a cell of a presently used network.

FIG. 397 shows a flow diagram 3900 illustrating a method for a radio communication device. In 3902, the radio communication device may control an antenna configured to operate in a plurality of operation modes. In 3904, a receiver may receive a paging indicator. In 3906, a mode switching circuit may switch an operation mode of the antenna based on the received paging indicator.

The antenna may include or may be an adaptive antenna array.

The antenna may include or may be a single antenna.

The plurality of operation modes of the antenna may include or may be a plurality of operation modes of different reception patterns.

FIG. 40 shows a flow diagram 4000 illustrating a method for a radio communication device. In 4002, the radio communication device may control an antenna configured to operate in a plurality of operation modes. In 4004, a receiver may receive data using the antenna. In 4006, a mode switching circuit may switch an operation mode of the antenna in a reception gap.

The antenna may include or may be an adaptive antenna array.

The antenna may include or may be a single antenna.

The plurality of operation modes of the antenna may include or may be a plurality of operation modes of different reception patterns.

Figure 41:
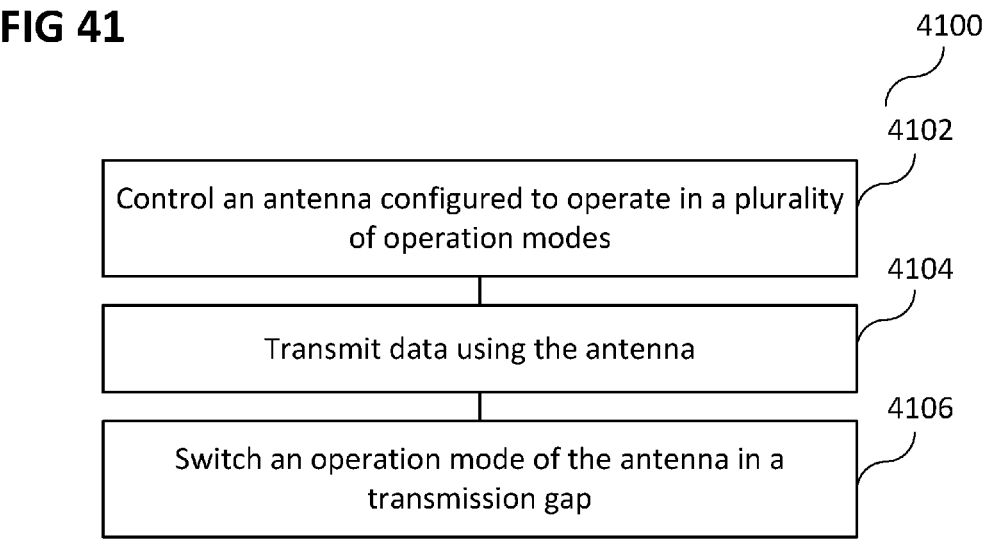
FIG. 41 shows a flow diagram illustrating a method for a radio communication device configured to perform a switching of an operation mode in a transmission gap.

FIG. 41 shows a flow diagram 4100 illustrating a method for a radio communication device. In 4102, the radio communication device may control an antenna configured to operate in a plurality of operation modes. In 4104, a transmitter may transmit data using the antenna. In 4106, a mode switching circuit may switch an operation mode of the antenna in a transmission gap.

The antenna may include or may be an adaptive antenna array.

The antenna may include or may be a single antenna.

The plurality of operation modes of the antenna may include or may be a plurality of operation modes of different transmission patterns.

Any one of the radio communication devices described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((High PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
   a movement characteristics determination circuit configured to determine a movement characteristics of the radio communication device;
   a beam pattern determination circuit configured to determine an optimal beam pattern based on the determined movement characteristics;
   an antenna controller configured to control an adaptive antenna array; wherein the antenna controller is further configured to change a first beam pattern to the optimal beam pattern when the first beam pattern is not the same as the optimal beam pattern; and wherein the optimal beam pattern comprises at least one of:
   a narrow beam pattern comprising a narrow beam at least partially overlapping a wide beam;
   a wide beam pattern comprising a wide beam overlapping a narrow beam; and
   combinations thereof; and
   a first antenna configured to provide the narrow beam pattern; and
   a second antenna configured to provide the wide beam pattern.

2. The radio communication device of claim 1, wherein the adaptive antenna array comprises a steerable antenna.

3. The radio communication device of claim 1, wherein the movement characteristics determination circuit is further configured to determine a movement characteristics of the radio communication device with respect to a second radio communication device.

4. The radio communication device of claim 1,
   wherein the optimal beam pattern is at least one of a narrow beam pattern, a wide beam pattern, or an omnidirectional coverage pattern; and wherein the first beam pattern is at least one of a narrow beam pattern, a wide beam pattern, or an omnidirectional coverage pattern.

5. The radio communication device of claim 1,
wherein the movement characteristics determination circuit comprises at least one of a speed of the radio communication device, information indicating whether the orientation of the radio communication device is changed, information indicating whether the location of the radio communication device is changed, and combinations thereof.

6. The radio communication device of claim 1, further comprising:
a communication conditions determination circuit configured to determine at least one communication condition under which the radio communication device operates; and
the beam pattern determination circuit further configured to determine the optimal beam pattern based on the at least one determined communication condition.

7. The radio communication device of claim 1,
the antenna controller configured to control the adaptive antenna array to operate using at least one of a wide beam pattern or an omnidirectional coverage pattern upon start of a communication.

8. The radio communication device of claim 1, further comprising:
the adaptive antenna array.

9. The radio communication device of claim 1, further comprising:
the adaptive antenna array comprising a first antenna and a second antenna;
the beam pattern determination circuit configured to determine the beam pattern from a plurality of beam patterns; the plurality of beam patterns comprising at least one of a narrow beam pattern, a wide beam pattern, or an omnidirectional coverage pattern;
the first antenna configured to provide a narrow beam pattern; and
the second antenna configured to provide at least one of a wide beam pattern, or an omnidirectional coverage pattern.

10. A base station radio communication device comprising:
a movement characteristics determination circuit configured to determine a movement characteristics of the base station radio communication device with respect to a user equipment device;
a beam pattern determination circuit configured to determine an optimal beam pattern based on the determined movement characteristics; and
an antenna controller configured to control an adaptive antenna array; wherein the antenna controller is further configured to change a first beam pattern to the optimal beam pattern when the first beam pattern is not the same as the optimal beam pattern; and wherein the optimal beam pattern comprises at least one of:
a narrow beam pattern comprising a narrow beam at least partially overlapping a wide beam;
a wide beam pattern comprising a wide beam overlapping a narrow beam; and
combinations thereof; and
a first antenna configured to provide the narrow beam pattern; and
a second antenna configured to provide the wide beam pattern.

11. The base station radio communication device of claim 10, wherein the adaptive antenna array comprises a steerable antenna.

12. The base station radio communication device of claim 10,
wherein the optimal beam pattern is at least one of a narrow beam pattern, a wide beam pattern, or an omnidirectional coverage pattern; and wherein the first beam pattern is at least one of a narrow beam pattern, a wide beam pattern, or an omnidirectional coverage pattern.

13. The base station radio communication device of claim 10,
wherein the movement characteristics determination circuit comprises at least one of a speed of the radio communication device, information indicating whether the orientation of the radio communication device is changed, information indicating whether the location of the radio communication device is changed, and combinations thereof.

14. The base station radio communication device of claim 10, further comprising:
a communication conditions determination circuit configured to determine at least one communication condition under which the radio communication device operates; and
the beam pattern determination circuit further configured to determine the optimal beam pattern based on the at least one determined communication condition.

15. The base station radio communication device of claim 10,
the antenna controller configured to control the adaptive antenna array to operate using at least one of a wide beam pattern or an omnidirectional coverage pattern upon start of a communication.

16. The base station radio communication device of claim 10, further comprising:
the adaptive antenna array.

17. A method for controlling a radio communication device, the method comprising:
determining a movement characteristics of the radio communication device with a movement characteristics determination circuit;
determining an optimal beam pattern based on the determined movement characteristics with a beam pattern determination circuit; and
controlling an adaptive antenna array to operate using the determined beam pattern with an antenna controller; wherein the antenna controller is further configured to change a first beam pattern to the optimal beam pattern when the first beam pattern is not the same as the optimal beam pattern; and wherein the optimal beam pattern comprises at least one of:
a narrow beam pattern comprising a narrow beam at least partially overlapping a wide beam;
a wide beam pattern comprising a wide beam overlapping a narrow beam; and
combinations thereof; and
a narrow beam pattern comprising a narrow beam at least partially overlapping a wide beam;
a wide beam pattern comprising a wide beam overlapping a narrow beam; and
combinations thereof; and
provide the narrow beam pattern with a first antenna; and
providing the wide beam pattern with a second antenna.

18. The method of claim 17, wherein the adaptive antenna array comprises a steerable antenna.

19. The method of claim 17, wherein the movement characteristics determination circuit is further configured to determine a movement characteristics of the radio communication device with respect to a second radio communication device.

20. The method of claim 17,
wherein the optimal beam pattern is at least one of a narrow beam pattern, a wide beam pattern, or an omnidirectional coverage pattern; and wherein the first beam pattern is at least one of at least one of a narrow beam pattern, a wide beam pattern, or an omnidirectional coverage pattern.

* * * * *